US012692327B2

(12) United States Patent
Yang et al.

(10) Patent No.: US 12,692,327 B2
(45) Date of Patent: Jul. 28, 2026

(54) METALLOCENE CATALYSTS FOR PRODUCING VINYL-TERMINATED POLYALPHAOLEFINS AND METHODS ASSOCIATED THEREWITH

(71) Applicant: ExxonMobil Chemical Patents Inc., Baytown, TX (US)

(72) Inventors: Jian Yang, Houston, TX (US); Hua Zhou, Missouri City, TX (US); Jo Ann M. Canich, Houston, TX (US); Jennifer L. Rapp, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 654 days.

(21) Appl. No.: 18/000,417

(22) PCT Filed: May 27, 2021

(86) PCT No.: PCT/US2021/034607

§ 371 (c)(1),
(2) Date: Dec. 1, 2022

(87) PCT Pub. No.: WO2021/257264

PCT Pub. Date: Dec. 23, 2021

(65) Prior Publication Data

US 2023/0212330 A1 Jul. 6, 2023

Related U.S. Application Data

(60) Provisional application No. 63/039,563, filed on Jun. 16, 2020.

(51) Int. Cl.
*C07F 17/00* (2006.01)
*C08F 2/06* (2006.01)
(Continued)

(52) U.S. Cl.
CPC .................. *C08F 4/76* (2013.01); *C08F 2/06* (2013.01); *C08F 110/14* (2013.01);
(Continued)

(58) Field of Classification Search
None
See application file for complete search history.

(56) References Cited

U.S. PATENT DOCUMENTS 4,658,078 A 4/1987 Slaugh et al. ................ 585/512
5,087,788 A 2/1992 Wu ................................ 585/512
(Continued)

FOREIGN PATENT DOCUMENTS

EP 0 573 120 11/1998 .............. C08F 10/00
WO WO1994/007928 4/1994 .............. C08F 10/02
(Continued)

OTHER PUBLICATIONS

Brant, P. et al. (2016) "Termination Events in Sterically Hindered Metallocene-Catalyzed Olefin Oligomerizations: Vinyl Chain Ends in Oligooctenes," *Organometallics*, v.35(17), pp. 2836-2839.
(Continued)

*Primary Examiner* — Yun Qian
(74) *Attorney, Agent, or Firm* — Vorys, Sater, Seymour and Pease LLP

(57) ABSTRACT

This invention relates to a method comprising contacting C3-C32 alpha olefin with catalyst system comprising activator and catalyst of the formula wherein: M is Hf or Zr; T is a bridging group; each X is independently a leaving group; R1 and R2 are independently hydrogen, or a Ci-Gto optionally substituted hydrocarbyl group, halide, or siloxyl group; R3, R4, R5 and R6 are independently a Ci-Gto optionally substituted hydrocarbyl, halocarbyl, silylcarbyl, aminocarbyl, or siloxyl group; and A is an aliphatic, aromatic or
(Continued)

heteroaromatic ring, optionally bearing one or more additional fused rings which may be aliphatic, aromatic or heteroaromatic; obtaining a plurality of vinyl-terminated polyalphaolefins (PAOs) having at least 30 mol % vinyl terminated PAO's.

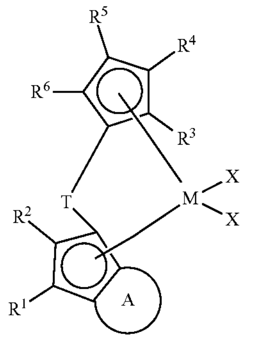

(I)

19 Claims, 3 Drawing Sheets

(51) Int. Cl.
*C08F 4/76* (2006.01)
*C08F 110/14* (2006.01)

(52) U.S. Cl.
CPC ...... *C08F 2410/01* (2013.01); *C08F 2420/08* (2021.01); *C08F 2420/12* (2021.01)

(56) References Cited

U.S. PATENT DOCUMENTS 5,153,157 A 10/1992 Hlatky et al. ................. 502/117
5,447,895 A 9/1995 Marks et al. ................. 502/117
5,453,410 A 9/1995 Kolthammer et al. ........ 502/155
6,211,105 B1 4/2001 Holtcamp ...................... 502/103
8,283,428 B2 10/2012 Brant et al. .................... 526/170
8,318,998 B2 11/2012 Crowther et al. ............ 585/253
8,372,930 B2 2/2013 Brant et al. .................... 526/351
8,399,724 B2 3/2013 Crowther et al. .............. 585/10
8,513,478 B2 8/2013 Wu et al. ....................... 585/523
8,658,556 B2 2/2014 Stewart ......................... 502/202
8,841,394 B2 9/2014 Crowther et al. ............ 526/160
9,643,900 B2 5/2017 Arriola et al. ............ C07C 2/34
10,280,240 B2 5/2019 Hagadorn et al. .... C08F 110/06
11,041,031 B2 6/2021 Faler et al. ............. C08F 10/02
11,084,894 B2 8/2021 Yang et al. ........... C08F 210/16
11,117,908 B2 9/2021 Faler et al. ............. C07F 5/027
11,414,436 B2 8/2022 Faler et al. ............. C07F 5/027
2018/0282359 A1* 10/2018 Crowther ................ C07F 17/00
2019/0119427 A1 4/2019 Chae et al. ........... C08F 236/06
2022/0315680 A1 10/2022 Lambic et al. ....... C08F 210/06

FOREIGN PATENT DOCUMENTS

WO WO1995/014044 5/1995 ................ C08F 4/02
WO WO2004/026921 4/2004 .............. C08F 10/06
WO WO2004/046214 6/2004 ............ C08F 210/06
WO WO2013/126187 8/2013 .............. C08F 10/06
WO WO2014/169017 10/2014 ............ C08F 4/6592
WO WO2016/168479 10/2016 ............ C08F 210/16
WO WO2017/026605 2/2017 ................ C07F 7/02
WO WO2018/182982 10/2018 ............ C08F 110/14
WO WO2018/182984 10/2018 .............. C08F 17/00
WO WO2019/093630 5/2019 .............. C08F 10/06
WO WO-2019099250 A1 * 5/2019 ............ C08F 110/02
WO WO2019/157169 8/2019 ............ C08F 4/6592
WO WO2020/184887 9/2020 .............. C07F 17/00
WO WO2020/184888 9/2020 .............. C07F 17/00
WO WO2020/251264 12/2020 ............ C08F 210/02

OTHER PUBLICATIONS

Girolami, G. (1994) "A Simple "Back of the Envelope" Method for Estimating the Densities and Molecular Volumes of Liquids and Solids," *Journal of Chemical Education*, v.71(11), Nov. 1994, pp. 962-964.

* cited by examiner benz[*f*]indenyl benz[*e*]indenyl 3a,5,6,7,8,9a-hexahydro-1*H*-benz[*f*]indenyl 3a,6,7,8,9,9b-hexahydro-1*H*-benz[*e*]indenyl 1,5,6,7-tetrahydro-*s*-indacenyl 1,6,7,8-tetrahydro-*as*-indacenyl

METALLOCENE CATALYSTS FOR PRODUCING VINYL-TERMINATED POLYALPHAOLEFINS AND METHODS ASSOCIATED THEREWITH

CROSS REFERENCE TO RELATED APPLICATION

This application is a national stage filing of Patent Cooperation Treaty Application No. PCT/US2021/034607 filed May 27, 2021, which claims the benefit of and priority to U.S. Provisional Application No. 63/039,563 filed Jun. 16, 2020, the disclosure of U.S. Provisional Application No. 63/039,563 is incorporated herein by reference.

This application is related to U.S. Ser. No. 16/270,085, filed Feb. 7, 2019, which claims priority to and the benefit of U.S. Ser. No. 62/629,200, filed Feb. 12, 2018 and U.S. Ser. No. 62/732,311, filed Sep. 17, 2018.

FIELD

The present disclosure relates to metallocene catalysts for generating polyalphaolefins.

BACKGROUND

A number of catalysts have been developed for synthesizing polymers and oligomers of olefins. The choice of catalyst may allow tailoring of various polymer/oligomer properties, such as molecular weight, branching, tacticity, crystallinity, melt index, and similar features. Both metallocene and non-metallocene transition metal complexes have been used for catalyzing olefin polymerization, depending upon the particular properties being targeted. Activators such as alumoxanes and non-coordinating anion activators are commonly used as co-catalysts in conjunction with both types of transition metal complexes.

Alpha olefins are one type of olefin commonly employed in olefin polymerization reactions. Alpha olefins are readily produced commercially by oligomerizing ethylene in the presence of a suitable catalyst. Other commercial techniques for producing alpha olefins include byproduct isolation from the Fischer-Tropsch reaction.

There has been recent interest in modifying the architecture of polyolefins (i.e., olefin polymers and oligomers) to target properties that are unmet with current products. One approach for modifying the properties of polyolefins is the choice of olefinic monomer(s) undergoing polymerization or oligomerization. For example, there have been several attempts to produce longer chain (i.e., $C_{4+}$) olefins, called "macromonomers" or "macromers," having variable amounts of vinyl, vinylidene, and/or vinylene chain termination for reaction with smaller olefins, such as ethylene or propylene, to impart controlled long-chain branching into olefin polymers and oligomers. To date, vinyl-terminated macromonomers have been the most widely and easily used. As non-limiting examples, vinyl-terminated oligomers may find utility as macromonomers for the synthesis of poly (macromonomer) block copolymers, and as additives. Advantageously, the vinyl group of these vinyl-terminated oligomers may provide a synthetic handle for further functionalization.

A high yield of vinyl-terminated polyalphaolefins may be produced when ethylene or propylene is the predominant olefin monomer undergoing polymerization. When higher olefins (e.g., $C_{4+}$) are present, it can be considerably more difficult to introduce a high percentage of vinyl chain ends, particularly without ethylene or propylene being present as a co-monomer. U.S. Pat. No. 9,643,900, for example, discloses that ethylene oligomerization may generate up to an 86.4% yield of vinyl-terminated oligomers, but 1-hexene, in contrast, produces only 35.9% vinyl-terminated oligomers. U.S. Pat. No. 8,372,930 teaches a slightly higher yield of vinyl-terminated oligomers (40%-60%) when oligomerizing 1-decene in the presence of a propylene co-monomer.

Additional references of interest include US 2019/0248936; US 2019/0248936; US 2019/0119427; WO 2019/093630; U.S. Pat. No. 10,280,240; and US 2022/0315680.

Accordingly, there is need for catalysts and methods that may generate high yields of vinyl-terminated olefin oligomers when using $C_{4+}$ olefin monomers, particularly $C_{4+}$ alpha olefins.

SUMMARY

Provided herein are methods comprising contacting a catalyst system with an olefinic feed comprising a $C_3$-$C_{32}$ alpha olefin under polymerization reaction conditions, wherein the catalyst system comprises at least one activator and a metallocene compound represented by Formula (1):

Formula (1)

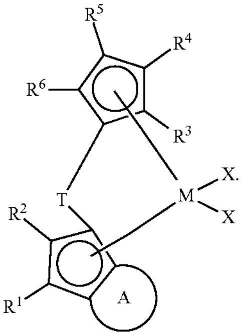

In Formula (1), M is a group 4 transition metal; T is a bridging group; each X is independently a leaving group, or two Xs are joined and bound to the metal atom to form a metallocycle ring, or two Xs are joined to form a chelating ligand, a diene ligand, or an alkylidene; $R^1$ and $R^2$ are independently hydrogen, or a $C_1$-$C_{40}$ optionally substituted hydrocarbyl, halocarbyl, silylcarbyl, aminocarbyl, germylcarbyl, oxyhydrocarbyl, halide, or siloxyl group; $R^3$, $R^4$, $R^5$ and $R^6$ are independently a $C_1$-$C_{40}$ optionally substituted hydrocarbyl, halocarbyl, silylcarbyl, aminocarbyl, or siloxyl group; and A is an aliphatic, aromatic or heteroaromatic ring, optionally bearing one or more additional fused rings; and obtaining a plurality of vinyl-terminated polyalphaolefins (PAOs) having at least 30 mol % vinyl terminated PAOs, optionally provided that when $R^3$, $R^4$, $R^5$ and $R^6$ are Me and the cyclopentadiene and A form an indenyl group, $R^1$ is not Me, Et or nPr or the six membered ring of the indenyl group is substituted, and when $R^3$, $R^4$, $R^5$ and $R^6$ are Me and the cyclopentadiene and A form a benz[e]indenyl ligand, the benz[e]indenyl ligand is substituted.

Also provided herein are compositions comprising a plurality of polyalphaolefins (PAOs) formed from at least one $C_3$-$C_{32}$ (alternately $C_4$-$C_{32}$, alternately $C_6$-$C_{30}$) alpha olefin, the plurality of PAOs comprising at least about 62 mol % vinyl chain ends if the PAOs lack a $C_3$ alpha olefin and at least about 80 mol % vinyl chain ends if the PAOs comprise a $C_3$ alpha olefin; wherein the plurality of PAOs optionally comprise one or more of PAOs having a trisubstituted vinylene group, PAOs having a disubstituted vinylene group, and PAOs having a vinylidene group.

Also provided herein are transition metal complexes comprising a metallocene compound represented by Formula (1):

Formula (1)

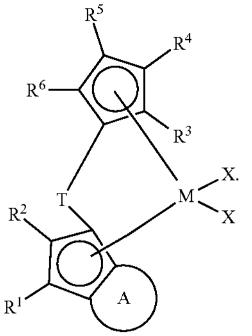

In Formula (1), M is a group 4 transition metal; T is a bridging group; each X is independently a leaving group, or two Xs are joined and bound to the metal atom to form a metallocycle ring, or two Xs are joined to form a chelating ligand, a diene ligand, or an alkylidene; $R^1$ and $R^2$ are independently hydrogen, or a $C_1$-$C_{40}$ optionally substituted hydrocarbyl (such as optionally substituted halocarbyl, silylcarbyl, aminocarbyl, germylcarbyl, oxyhydrocarbyl), halide, or siloxyl group; $R^3$, $R^4$, $R^5$ and $R^6$ are independently a $C_1$-$C_{40}$ optionally substituted hydrocarbyl, halocarbyl, silylcarbyl, aminocarbyl, or siloxyl group; and A is an aliphatic, aromatic or heteroaromatic ring, optionally bearing one or more additional fused rings optionally provided that when $R^3$, $R^4$, $R^5$ and $R^6$ are Me and the cyclopentadiene and A form an indenyl group, $R^1$ is not Me, Et, nPr, Bu or neopentyl, or the six membered ring of the indenyl group is substituted, and when $R^3$, $R^4$, $R^5$ and $R^6$ are Me and the cyclopentadiene and A form a benz[e]indenyl ligand, the benz[e]indenyl ligand is substituted.

Also provided herein are catalyst systems comprising (including the result of the combination of) at least one activator and a metallocene compound represented by Formula (1):

Formula (1)

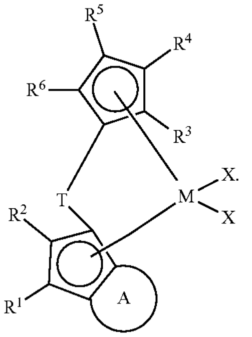

In Formula (1), M is a group 4 transition metal; T is a bridging group; each X is independently a leaving group, or two Xs are joined and bound to the metal atom to form a metallocycle ring, or two Xs are joined to form a chelating ligand, a diene ligand, or an alkylidene; $R^1$ and $R^2$ are independently hydrogen, or a $C_1$-$C_{40}$ optionally substituted hydrocarbyl (such as optionally substituted halocarbyl, silylcarbyl, aminocarbyl, germylcarbyl, oxyhydrocarbyl), halide, or siloxyl group; $R^3$, $R^4$, $R^5$ and $R^6$ are independently a $C_1$-$C_{40}$ optionally substituted hydrocarbyl, halocarbyl, silylcarbyl, aminocarbyl, or siloxyl group; and A is an aliphatic, aromatic or heteroaromatic ring, optionally bearing one or more additional fused rings optionally provided that when $R^3$, $R^4$, $R^5$ and $R^6$ are Me and the cyclopentadiene and A form an indenyl group, $R^1$ is not Me, Et, nPr, Bu or neopentyl, or the six membered ring of the indenyl group is substituted, and when $R^3$, $R^4$, $R^5$ and $R^6$ are Me and the cyclopentadiene and A form a benz[e]indenyl ligand, the benz[e]indenyl ligand is substituted.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one skilled in the art and having the benefit of this disclosure.

DETAILED DESCRIPTION

Figure 1:
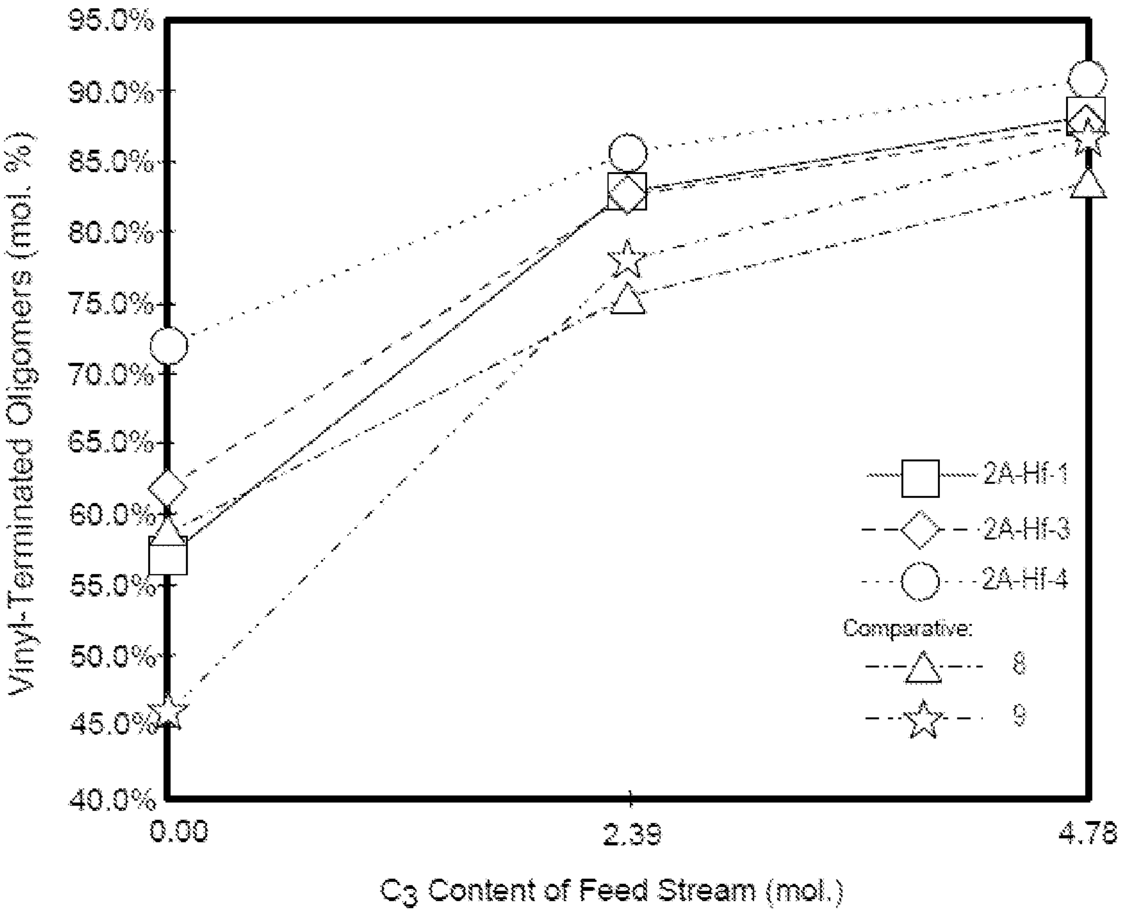
FIG. 1: shows a graph of the percentage of vinyl-terminated polyalphaolefin oligomers generated from a feed stream comprising varying concentrations of propylene in the presence of the catalyst systems described herein.

The present disclosure relates to metallocene catalysts for generating polyalphaolefins (PAOs), and, more particularly, metallocene catalysts and oligomerization methods for generating high yields of vinyl-terminated PAOs.

In conventional syntheses, yields of vinyl-terminated PAOs greater than about 60% are typically achievable only when using $C_{3-}$ (e.g., propylene, ethylene) monomers. Surprisingly, the catalyst systems and methods disclosed herein may allow high yields of vinyl-terminated PAOs to be generated when using $C_{4+}$ (e.g., 1-decene and other alpha olefin) monomers. The catalyst systems disclosed herein include a metallocene complex (compound) of a Group 4 transition metal, in which a fused cyclopentadienyl ring is further fused to a carbocyclic or heterocyclic ring. Previous Group 4 metallocene complexes, in contrast, have tended to afford PAOs having higher amounts of vinylidene termination, as disclosed in U.S. Pat. Nos. 4,658,078; 5,087,788; and 8,513,478. Further and surprisingly, the catalyst systems disclosed herein may afford high yields of vinyl-terminated PAOs even in the absence of propylene, unlike prior PAO syntheses.

Catalyst systems suitable for generating vinyl-terminated PAOs comprise at least one bridged Group 4 metallocene compound, as described further herein, in combination with at least one activator, wherein the activator promotes formation of a reactive species effective for conducting olefin oligomerization. Suitable activators may include, but are not limited to, alkyl aluminum compounds, alumoxanes, boranes, or borates, with some examples of the latter compounds being non-coordinating anion activators. Activators such as alumoxanes and non-coordinating borate anions may be preferred. Any Group 4 transition metal (e.g., Ti, Zr, and Hf) may be present in the metallocene compounds disclosed herein, with Hf and Zr being preferred.

All numerical values within the detailed description and the claims herein are modified by "about" or "approximately" with respect to the indicated value, and take into account experimental error and variations that would be expected by a person having ordinary skill in the art. Unless otherwise indicated, room temperature is about 23° C.

As used in the present disclosure and claims, the singular forms "a," "an," and "the" include plural forms unless the context clearly dictates otherwise.

For the purposes of the present disclosure, the new numbering scheme for groups of the Periodic Table is used. In said numbering scheme, the groups (columns) are numbered sequentially from left to right from 1 through 18, excluding the f-block elements (lanthanides and actinides). Under this scheme, the term "transition metal" refers to any atom from groups 3-12 of the Periodic Table, inclusive of the lanthanides and actinide elements. Ti, Zr, and Hf are group 4 transition metals, for example.

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, and Mz) are in units of g/mol ($g \cdot mol^{-1}$).

For purposes of this disclosure, when a polymer, copolymer, or oligomer is referred to as comprising an olefin, the olefin present in such polymer, copolymer or oligomer is the polymerized form of the olefin. For example, when a copolymer is said to have an "propylene" content of 0 wt % to 5 wt %, it is to be understood that the mer unit in the copolymer is derived from the monomer propylene in the polymerization reaction and said derived units are present at 0 wt % (i.e., absent) to 5 wt %, based upon the weight of the copolymer. As used herein, "polymer" and oligomer" (and grammatical variations thereof) are used interchangeably to refer to a molecule having two or more of the same or different mer units. As used herein, "polymerize" (and grammatical variations thereof, e.g., polymerization) are used interchangeably to refer to a process of generating a molecule having two or more of the same or different mer units from two or more of the same or different monomers. A "homopolymer" or "homo-oligomer" is a polymer or oligomer having mer units that are the same. A "copolymer" or co-oligomer is a polymer or oligomer having two or more mer units that are different from each other. A "terpolymer" or "ter-oligomer" is a polymer or ter-oligomer having three mer units that are different from each other. "Different," as used to refer to mer units, indicates that the mer units differ from each other by at least one atom or are different isomerically. Accordingly, the definition of copolymer, as used herein, includes terpolymers and the like. A "decene polymer" or "decene copolymer" is a polymer or copolymer comprising at least 50 mol % decene-derived units. An oligomer is a polymer having a low molecular weight, such as an Mn of 21,000 g/mol or less (preferably 10,000 g/mol or less, preferably 5,000 g/mol or less, preferably 3,000 g/mol or less), and/or a low number of mer units, such as 100 mer units or less (preferably 75 mer units or less, preferably 50 mer units of less, preferably 25 mer units or less).

The terms "group," "radical," and "substituent" may be used interchangeably herein.

The term "hydrocarbon" refers to a class of compounds having hydrogen bound to carbon, and encompasses saturated hydrocarbon compounds, unsaturated hydrocarbon compounds, and mixtures of hydrocarbon compounds (saturated and/or unsaturated), including mixtures of hydrocarbon compounds having different numbers of carbon atoms. The term "$C_n$" refers to hydrocarbon(s) or a hydrocarbyl group having n carbon atom(s) per molecule or group, wherein n is a positive integer. Such hydrocarbon compounds may be one or more of linear, branched, cyclic, acyclic, saturated, unsaturated, aliphatic, or aromatic. As used herein, a cyclic hydrocarbon may be referred to as "carbocyclic," which includes saturated, unsaturated, and partially unsaturated carbocyclic compounds as well as aromatic carbocyclic compounds. The term "heterocyclic" refers to a carbocyclic ring containing at least one ring heteroatom.

The terms "hydrocarbyl radical," "hydrocarbyl group," or "hydrocarbyl" may be used interchangeably and are defined to mean a group consisting of hydrogen and carbon atoms only and bearing at least one unfilled valence position when removed from a parent compound. Preferred hydrocarbyls are $C_1$-$C_{100}$ radicals that may be linear or branched. Examples of such radicals include, but are not limited to, alkyl groups such as methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like. The term "hydrocarbyl group having 1 to about 100 carbon atoms" refers to a moiety selected from a linear or branched $C_1$-$C_{100}$ alkyl.

The term "optionally substituted" means that a hydrocarbon or hydrocarbyl group may be unsubstituted or substituted. For example, the term "optionally substituted hydrocarbyl" refers to replacement of at least one hydrogen atom or carbon atom in a hydrocarbyl group with a heteroatom or heteroatom functional group. Unless otherwise specified, any of the hydrocarbyl groups herein may be optionally substituted. The term "optionally substituted" means that a group may be unsubstituted or substituted. For example, the term "optionally substituted hydrocarbyl" refers to replacement of at least one hydrogen atom or carbon atom in a hydrocarbyl group with a heteroatom or heteroatom-containing group. Unless otherwise specified, any of the hydrocarbyl groups herein may be optionally substituted.

Silylcarbyl radicals (also referred to as silylcarbyls, silylcarbyl groups, or silylcarbyl substituents) are radicals in which one or more hydrocarbyl hydrogen atoms have been substituted with at least one $SiR^*_3$ containing group or where at least one $—Si(R^*)_2—$ has been inserted within the hydrocarbyl radical where R* is independently a hydrocarbyl or halocarbyl radical, and two or more R* may join together to form a substituted or unsubstituted saturated, partially unsaturated or aromatic cyclic or polycyclic ring structure. Silylcarbyl radicals may be bonded via a silicon atom or a carbon atom.

Substituted silylcarbyl radicals are silylcarbyl radicals in which at least one hydrogen atom has been substituted with at least one functional group such as $NR^*_2$, $OR^*$, $SeR^*$, $TeR^*$, $PR^*_2$, $AsR^*_2$, $SbR^*_2$, $SR^*$, $BR^*_2$, $GeR^*_3$, $SnR^*_3$, $PbR_3$ and the like or where at least one non-hydrocarbon atom or group has been inserted within the silylcarbyl radical, such as —O—, —S—, —Se—, —Te—, $—N(R^*)—$, =N—, $—P(R^*)—$, =P—, $—As(R^*)—$, =As—, $—Sb(R^*)—$, =Sb—, $—B(R^*)—$, =B—, $—Ge(R^*)_2—$, $—Sn(R^*)_2—$, $—Pb(R^*)_2—$ and the like, where R* is independently a hydrocarbyl or halocarbyl radical, and two or more R* may join together to form a substituted or unsubstituted saturated, partially unsaturated or aromatic cyclic or polycyclic ring structure.

Halocarbyl radicals (also referred to as halocarbyls, halocarbyl groups or halocarbyl substituents) are radicals in which one or more hydrocarbyl hydrogen atoms have been substituted with at least one halogen (e.g., F, Cl, Br, I) or halogen-containing group (e.g., $CF_3$). Substituted halocarbyl radicals are radicals in which at least one halocarbyl hydrogen or halogen atom has been substituted with at least one functional group such as $NR*_2$, OR*, SeR*, TeR*, $PR*_2$, $AsR*_2$, $SbR*_2$, SR*, $BR*_2$, $SiR*_3$, $GeR*_3$, $SnR*_3$, $PbR*_3$, and the like or where at least one non-carbon atom or group has been inserted within the halocarbyl radical such as —O—, —S—, —Se—, —Te—, —N(R*)—, =N—, —P(R*)—, =P—, —As(R*)—, =As—, —Sb(R*)—, =Sb—, —B(R*)—, =B—, $—Si(R*)_2—$, $—Ge(R*)_2—$, $—Sn(R*)_2—$, $—Pb(R*)_2—$ and the like, where R* is independently a hydrocarbyl or halocarbyl radical provided that at least one halogen atom remains on the original halocarbyl radical. Additionally, two or more R* may join together to form a substituted or unsubstituted saturated, partially unsaturated or aromatic cyclic or polycyclic ring structure.

Germylcarbyl radicals (also referred to as germylcarbyls, germylcarbyl groups or germylcarbyl substituents) are radicals in which one or more hydrocarbyl hydrogen atoms have been substituted with at least one $GeR*_3$ containing group or where at least one $—Ge(R*)_2—$ has been inserted within the hydrocarbyl radical where R* is independently a hydrocarbyl or halocarbyl radical, and two or more R* may join together to form a substituted or unsubstituted saturated, partially unsaturated or aromatic cyclic or polycyclic ring structure. Germylcarbyl radicals may be bonded via a germanium atom or a carbon atom.

Substituted germylcarbyl radicals are germylcarbyl radicals in which at least one hydrogen atom has been substituted with at least one functional group such as $NR*_2$, OR*, SeR*, TeR*, $PR*_2$, $AsR*_2$, $SbR*_2$, SR*, $BR*_2$, $SiR*_3$, SnR*3, $PbR_3$ and the like or where at least one non-hydrocarbon atom or group has been inserted within the germylcarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, $—Si(R*)_2—$, $—Sn(R*)_2—$, $—Pb(R*)_2—$ and the like, where R* is independently a hydrocarbyl or halocarbyl radical, and two or more R* may join together to form a substituted or unsubstituted saturated, partially unsaturated or aromatic cyclic or polycyclic ring structure.

Aminocarbyl radicals (also referred to as aminocarbyls, aminocarbyl groups, or aminocarbyl substituents) are radicals in which one or more hydrocarbyl hydrogen atoms have been substituted with at least one $NR*_2$ containing group or where at least one —N(R*)— has been inserted within the hydrocarbyl radical where R* is independently a hydrocarbyl or halocarbyl radical, and two or more R* (if present) may join together to form a substituted or unsubstituted saturated, partially unsaturated or aromatic cyclic or polycyclic ring structure. Aminocarbyl radicals may be bonded via a nitrogen atom or a carbon atom.

Oxyhydrocarbyl radicals (also referred to as oxyhydrocarbyls, oxyhydrocarbyl groups, or oxyhydrocarbyl substituents) are radicals in which one or more hydrocarbyl hydrogen atoms have been substituted with at least one OR* containing group or where at least one —O— has been inserted within the hydrocarbyl radical where R* (if present) is independently hydrogen or, a hydrocarbyl or halocarbyl radical. Oxyhydrocarbyl radicals may be bonded via an oxygen atom or a carbon atom.

Siloxylcarbyl radicals (also referred to as siloxylcarbyls, siloxylcarbyl groups, or siloxylcarbyl substituents) are radicals in which one or more hydrocarbyl hydrogen atoms have been substituted with at least one $Si(OR*)_xR*_{3-x}$ containing group or where at least one $—[Si(OR*)_yR*_{2-y}]—$ has been inserted within the hydrocarbyl radical where x is 1, 2 or 3, y is 1 or 2, R* is independently a hydrocarbyl or halocarbyl radical, and two or more R* may join together to form a substituted or unsubstituted saturated, partially unsaturated or aromatic cyclic or polycyclic ring structure. Siloxylcarbyl radicals may be bonded via a silicon atom or a carbon atom. Siloxylcarbyl radicals may be bonded via a silicon atom or a carbon atom.

The terms "linear" or "linear hydrocarbon" refer to a hydrocarbon or hydrocarbyl group having a continuous carbon chain without side chain branching.

The terms "branched" or "branched hydrocarbon" refer to a hydrocarbon or hydrocarbyl group having a linear carbon chain or a closed carbon ring, in which a hydrocarbyl side chain extends from the linear carbon chain or the closed carbon ring.

The terms "saturated" or "saturated hydrocarbon" refer to a hydrocarbon or hydrocarbyl group in which all carbon atoms are bonded to four other atoms, with the exception of an unfilled valence position being present upon carbon in a hydrocarbyl group.

The terms "unsaturated" or "unsaturated hydrocarbon" refer to a hydrocarbon or hydrocarbyl group in which one or more carbon atoms are bonded to less than four other atoms, exclusive of an open valence position upon carbon being present. That is, the term "unsaturated" refers to a hydrocarbon or hydrocarbyl group bearing one or more double and/or triple bonds, with the double and/or triple bonds being between two carbon atoms and/or between a carbon atom and a heteroatom.

The term "alkyl" refers to a hydrocarbyl group having no unsaturated carbon-carbon bonds, and which may be optionally substituted.

The term "independently," when referenced to selection of multiple items from within a given group, means that the selected choice for a first item does not necessarily influence the choice of any second or subsequent item. That is, independent selection of multiple items within a given group means that the individual items may be the same or different from one another.

Examples of saturated hydrocarbyl groups include, but are not limited to, methyl, ethyl, n-propyl, isopropyl, n-butyl, isobutyl, sec-butyl, tert-butyl, pentyl, iso-amyl (isopentyl), neopentyl, hexyl, octyl, cyclopropyl, cyclobutyl, cyclopentyl, cyclohexyl, cyclooctyl, and the like, including their substituted analogues. Examples of unsaturated hydrocarbyl groups include, but are not limited to, ethenyl, propenyl, allyl, butadienyl, cyclopropenyl, cyclobutenyl, cyclopentenyl, cyclohexenyl, cyclooctenyl and the like, including their substituted analogues.

The terms "alkene" and "olefin" are used synonymously herein. Similarly, the terms "alkenic" and "olefinic" are used synonymously herein. Unless otherwise noted, all possible geometric isomers are encompassed by these terms.

The term "alpha olefin" refers to an olefin having a terminal carbon-to-carbon double bond in the structure thereof ($R''HC=CH_2$, where R" is hydrogen or a hydrocarbyl group; preferably R" is an alkyl group). Non-limiting examples of alpha olefins include, for instance, ethylene, propylene, 1-butene, 1-pentene, 1-hexene, 1-heptene, 1-octene, 1-nonene, 1-decene, 1-undecene 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 4-methyl-1-pentene, 3-methyl-1-pentene, 5-methyl-1-nonene, 3,5,5-trimethyl-1-hexene, vinylcyclohexane, and vinylnorbornane. Any of these alpha olefins may be used to form polyalphaolefins in the disclosure herein.

In the present disclosure, ethylene shall be considered an alpha olefin.

The carbon-carbon double bond in an alkene may be in various structural or geometric isomer forms, which may include vinylidenes, vinyls, disubstituted vinylenes and trisubstituted vinylenes.

The term "vinyl" refers to an olefin represented by the following formula

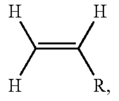

wherein R is a hydrocarbyl group, preferably a saturated hydrocarbyl group such as an alkyl group.

The term "vinylidene" refers to an olefin represented by the following formula

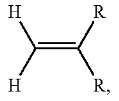

wherein each R is an independently selected hydrocarbyl group, preferably a saturated hydrocarbyl group such as an alkyl group. Vinylidenes are 1,1-disubstituted vinylene groups.

The term "disubstituted vinylene" refers to an olefin represented by the following formula

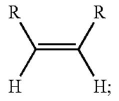

an olefin represented by the following formula

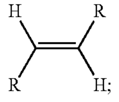

a mixture thereof in any proportion, wherein each R is an independently selected hydrocarbyl group, preferably a saturated hydrocarbyl group such as an alkyl group. The term "disubstituted vinylene" is not inclusive of the term "vinylidene." That is, disubstituted vinylenes represent only 1,2-disubstituted vinylene groups and do not include vinylidene groups.

The term "trisubstituted vinylene" refers to an olefin represented by the following formula

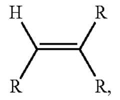

wherein each R is an independently selected hydrocarbyl group, preferably a saturated hydrocarbyl group such as an alkyl group. Alternatively, two R groups on adjacent carbon atoms may together form a non-aromatic ring structure, with a third R group remaining as a pendant hydrocarbyl group.

The term "catalyst system" refers to the combination of a transition metal complex, such as a metallocene compound, and at least one activator, or an activated reaction product thereof. When used to describe such a combination before activation, the term "catalyst system" refers to the unactivated transition metal complex (precatalyst) together with the at least one activator (co-catalyst). When used to describe such a combination after activation, the term "catalyst system" refers to the activated complex and the at least one activator or other charge-balancing moiety. The transition metal complex may be neutral as in a precatalyst, or a charged species with a counter ion as in an activated catalyst system. For the purposes of this invention and the claims thereto, when catalyst systems are described as comprising neutral stable forms of the components, it is well understood by one of ordinary skill in the art that the ionic form of the component is the form that reacts with one or more monomers to produce a polymer (such as an oligomer). A polymerization catalyst system is a catalyst system that can polymerize one or more monomers to form a polymer (such as an oligomer) containing the one or more monomers. An oligomerization reaction is a type of polymerization reaction wherein product produced is typically of lower molecular weight. The terms polymerize and oligomerize are often used interchangeably. The terms polymerization reaction and oligomerization reaction are often used interchangeably. Typically, oligomer can have a number average molecular weight (Mn) of 5000 g/mol or less, such as 5,000 to 300 g/mol, or 5,000 to 400 g/mol.

For nomenclature purposes, the following numbering schemes are used for indenyl. It should be noted that indenyl can be considered a cyclopentadienyl with a fused benzene ring. The structure below is drawn and named as an anion.

Indenyl

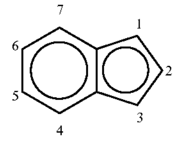

Figure 3:
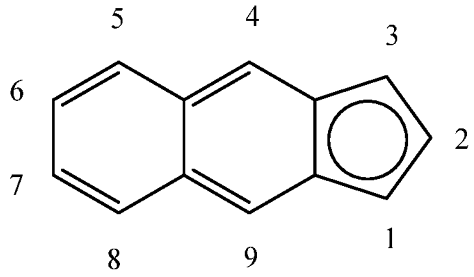
FIG. 3: illustrates numbering for indacenyl and benzindenyl compounds.
Figure 3:
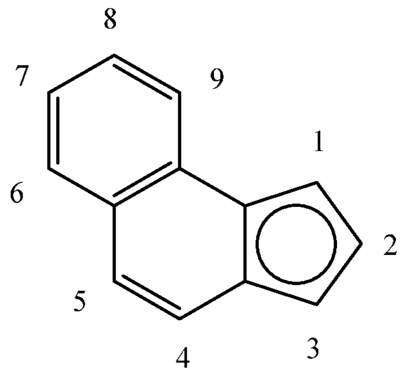
Figure 3:
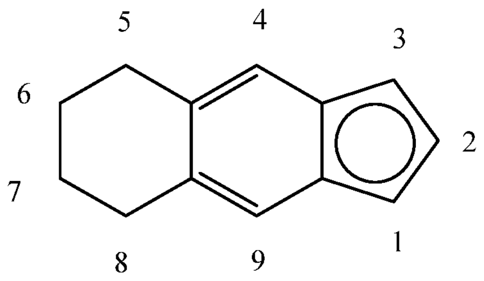
Figure 3:
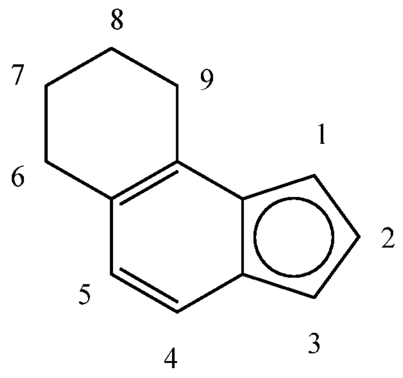
Figure 3:
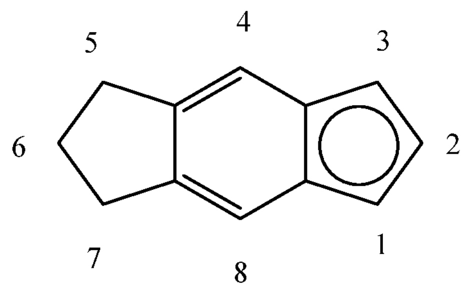
Figure 3:
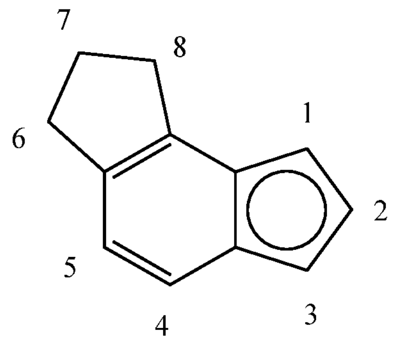

The ring structures shown in FIG. 3 are indacenyls and benzindenyls, which are substituted indenyl anions where the substitution at the 5 and 6 positions of the indenyl forms a ring structure. FIG. 3 also indicates carbon numbering on these substituted indenyls, and sets forth the name of each example indenyl compound shown therein. The bridging group binds at the 1 position.

The following abbreviations may be used through this specification: Cp is cyclopentadiene or cyclopentadienyl; Me is methyl, Ph is phenyl, Et is ethyl, Pr is propyl, i-Pr is isopropyl, n-Pr is normal propyl, Bu is butyl, i-Bu is isobutyl, Ph is phenyl, and t-Bu is tertiary butyl.

Catalyst Compounds

The bridged Group 4 metallocene compounds of the present disclosure may be represented by Formula (1) below.

Formula (1)

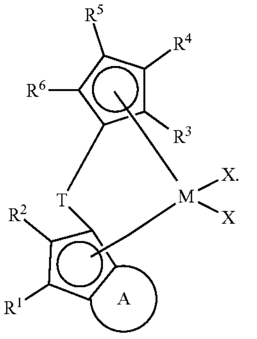

In Formula (1), M is a Group 4 transition metal; T is a bridging group; each X is independently a leaving group (e.g., a $C_1$ to $C_{20}$ alkyl group, an aryl group, a hydride, an amide, an alkoxide, a sulfide, a phosphide, a halide, an amine, a phosphine, an ether, or any combination thereof, preferably a halide, an aryl group or a $C_1$ to $C_{20}$ alkyl group, and still more preferably a $C_1$-$C_5$ alkyl group, a halide, or an aryl group), which may be the same or different, optionally, the two X groups may be joined and bound to the metal atom (M) to form a metallocycle ring, or two X groups may be joined to form a chelating ligand, a diene ligand, or an alkylidene; $R^1$ and $R^2$ are independently hydrogen or a $C_1$-$C_{40}$ optionally substituted hydrocarbyl, such as optionally substituted halocarbyl, silylcarbyl, aminocarbyl, germylcarbyl, oxyhydrocarbyl, halide, or siloxyl group; $R^3$, $R^4$, $R^5$, and $R^6$ are independently a $C_1$-$C_{40}$ optionally substituted hydrocarbyl, halocarbyl, silylcarbyl, aminocarbyl, or siloxyl group; ring A is a fused carbocyclic or heterocyclic ring, preferably an aliphatic, aromatic or heteroaromatic ring, optionally bearing one or more additional fused rings optionally provided that when $R^3$, $R^4$, $R^5$ and $R^6$ are Me and the cyclopentadiene and A form an indenyl group, $R^1$ is not Me, Et or nPr (alternately $R^1$ is not Me, Et or nPr, Bu or neopentyl) or the 6 membered aromatic ring of the indenyl group is substituted, and when $R^3$, $R^4$, $R^5$ and $R^6$ are Me and the cyclopentadiene and A form a benz[e]indenyl ligand, the benz[e]indenyl ligand is substituted.

Alternately, when $R^3$, $R^4$, $R^5$ and $R^6$ are Me and the cyclopentadiene and A form an s-indacenyl ligand, the ligand is not substituted at the 4 position with Ph, MePh, tBuPh, PhPh, alternately the ligand is not substituted at the 4 position with phenyl or substituted phenyl, alternately the ligand is not substituted at the 4 position.

Suitable Group 4 transition metals M may include any Group 4 transition metal, preferably hafnium (Hf) or zirconium (Zr). In some embodiments of the invention, hafnium is preferred.

In embodiments of the invention, ring A and the cyclopentadiene form an indenyl ligand, a benzindenyl ligand or an indacenyl ligand, such as benz[e]indenyl, benz[f]indenyl, tetrahydor-as-indacenyl, or tetrahydro-s-indacenyl. In embodiments of the invention, ring A and the cyclopentadiene do not form an indenyl ligand, a benzindenyl ligand or an indacenyl ligand, such as benz[e]indenyl, benz[f]indenyl, tetrahydro-as-indacenyl, or tetrahydro-s-indacenyl. In embodiments of the invention, ring A and the cyclopentadiene do not form a benz[e]indenyl ligand and/or a benz[f] indenyl ligand. In embodiments of the invention, ring A and the cyclopentadiene do not form an indenyl ligand.

Alternately, in any embodiment described herein, $R^1$ is not a $C_1$ to $C_4$ hydrocarbyl (alternately $R^1$ is not a $C_1$ to $C_5$ hydrocarbyl, alternately $R^1$ is not a $C_1$ to $C_6$ hydrocarbyl, alternately $R_1$ is a $C_6$ to $C_{40}$ hydrocarbyl). Alternately $R_1$ is not a linear hydrocarbyl, such as a $C_1$ to $C_6$ linear hydrocarbyl or a $C_1$ to $C_{12}$ linear hydrocarbyl. Alternately $R^1$ is a branched $C_3$ to $C_{40}$ hydrocarbyl, such as a branched $C_4$ to $C_{20}$ hydrocarbyl such as a branched $C_6$ to $C_{12}$ hydrocarbyl. Alternately $R^1$ is isopropyl, t-butyl, sec-butyl, neopentyl, neohexyl, 3,5,5-trimethylpentyl and the like. Alternately $R^1$ is isopropyl, t-butyl, sec-butyl, neohexyl, 3,5,5-trimethylpentyl and the like. R may also be a silylcarbyl such as trimethylsilylmethyl.

More particular examples of bridged metallocene compounds suitable for use in the present disclosure are represented by Formula (1A) below.

Formula (1A)

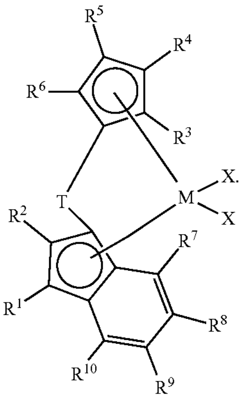

In Formula (1A), M is a Group 4 transition metal, preferably Zr or Hf, T is a bridging group, each X is a leaving group (e.g., a $C_1$ to $C_{20}$ alkyl group, an aryl group, a hydride, an amide, an alkoxide, a sulfide, a phosphide, a halide, an amine, a phosphine, an ether, or any combination thereof, preferably a halide or a $C_1$ to $C_{20}$ alkyl group, and still more preferably a halide, an aryl group, or a $C_1$-$C_5$ alkyl group), which may be the same or different, optionally, the two X groups may be joined and bound to the metal atom (M) to form a metallocycle ring, or two X groups may be joined to form a chelating ligand, a diene ligand, or an alkylidene; $R^1$ and $R^2$ are independently hydrogen or a $C_1$-$C_{40}$ optionally substituted hydrocarbyl, such as optionally substituted halocarbyl, silylcarbyl, aminocarbyl, germylcarbyl, oxyhydrocarbyl, halide, or siloxyl group; $R^3$, $R^4$, $R^5$, and $R^6$ are independently a $C_1$-$C_{40}$ optionally substituted hydrocarbyl, such as an optionally substituted halocarbyl, silylcarbyl, aminocarbyl, or siloxyl group; $R^7$, $R^8$, $R^9$, and $R^{11}$ are independently hydrogen or a $C_1$-$C_{40}$ optionally substituted hydrocarbyl, halocarbyl, silylcarbyl, aminocarbyl, germylcarbyl, oxyhydrocarbyl, halide, or siloxyl group, optionally, $R^7$ and $R^8$, or $R^8$ and $R^9$, or $R^9$ and $R^{10}$ are joined together to form a fused carbocyclic ring, provided that when $R^3$, $R^4$, $R^5$ and $R^6$ are Me, $R^1$ is not methyl, ethyl or n-propyl (alternately $R^1$ is not Me, Et or nPr, Bu or neopentyl) and or at least one of $R^2$, $R^7$, $R^8$, $R^9$, and $R^{10}$ is not H.

Alternately, when $R^3$, $R^4$, $R^5$ and $R^6$ are Me, at least 1, 2, 3, or 4 of $R^2$, $R^7$, $R^8$, $R^9$, and $R^{10}$ is not H.

Alternately, in any embodiment described herein, $R^1$ is not a $C_1$ to $C_4$ hydrocarbyl (alternately $R^1$ is not a $C_1$ to $C_5$ hydrocarbyl, alternately $R^1$ is not a $C_1$ to $C_6$ hydrocarbyl, alternately $R^1$ is a $C_6$ to $C_{40}$ hydrocarbyl). Alternately $R^1$ is not a linear hydrocarbyl, such as a $C_1$ to $C_6$ linear hydrocarbyl or a $C_1$ to $C_{12}$ linear hydrocarbyl. Alternately $R^1$ is a branched $C_3$ to $C_{40}$ hydrocarbyl, such as a branched $C_4$ to $C_{20}$ hydrocarbyl such as a branched $C_6$ to $C_{12}$ hydrocarbyl. Alternately $R^1$ is isopropyl, t-butyl, sec-butyl, neopentyl, neohexyl, 3,5,5-trimethylpentyl and the like. Alternately $R^1$ is isopropyl, t-butyl, sec-butyl, neohexyl, 3,5,5-trimethylpentyl and the like.

More particular examples of bridged metallocene compounds suitable for use in the present disclosure are represented by Formula (1B) or (1C):

(1B)

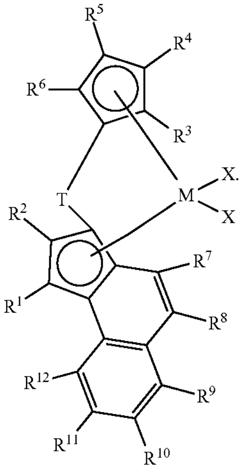

(1C)

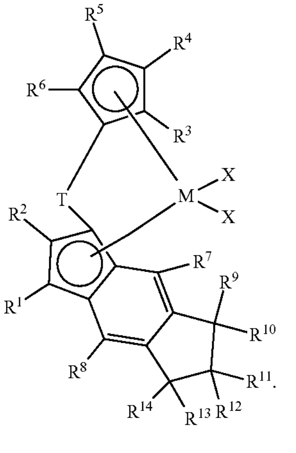

wherein $R^1$, $R^2$, $R^3$, $R^4$, $R^5$, $R^6$, M, T, and X are as defined in Formula (1), and $R^7$, $R^8$, $R^9$, $R^{10}$, $R^{11}$, $R^{12}$, $R^{13}$, and $R^{14}$ are independently hydrogen or a $C_1$-$C_{40}$ optionally substituted hydrocarbyl group (such as halocarbyl, silylcarbyl, aminocarbyl, germylcarbyl, oxyhydrocarbyl), halide, or siloxyl group, where in Formula (1B) at least one of $R^2$, $R^7$, $R^8$, $R^9$, $R^{10}$, $R^{11}$ and $R^{12}$ is not H.

Alternately, when $R^3$, $R^4$, $R^5$ and $R^6$ are Me in Formula (1B), at least 1, 2, 3, 4, 5, or 6 of $R^2$, $R^7$, $R^8$, $R^9$, $R^{10}$, $R^{11}$ and $R^{12}$ is not H.

Alternately, in any embodiment described herein, $R^1$ is not a $C_1$ to $C_4$ hydrocarbyl (alternately $R^1$ is not a $C_1$ to $C_5$ hydrocarbyl, alternately $R^1$ is not a $C_1$ to $C_6$ hydrocarbyl, alternately $R^1$ is a $C_6$ to $C_{40}$ hydrocarbyl). Alternately $R^1$ is not a linear hydrocarbyl, such as a $C_1$ to $C_6$ linear hydrocarbyl or a $C_1$ to $C_{12}$ linear hydrocarbyl. Alternately $R^1$ is a branched $C_3$ to $C_{40}$ hydrocarbyl, such as a branched $C_4$ to $C_{20}$ hydrocarbyl such as a branched $C_6$ to $C_{12}$ hydrocarbyl. Alternately $R^1$ is isopropyl, t-butyl, sec-butyl, neopentyl, neohexyl, 3,5,5-trimethylpentyl and the like. Alternately $R^1$ is isopropyl, t-butyl, sec-butyl, neohexyl, 3,5,5-trimethylpentyl and the like.

In more specific examples, bridged metallocene compounds suitable for use in the present disclosure include those represented by Formula (2), Formula (3), or Formula (4) below.

Formula (2)

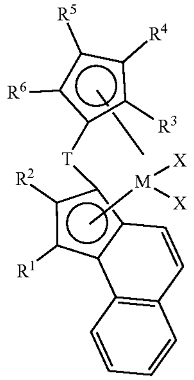

Formula (3)

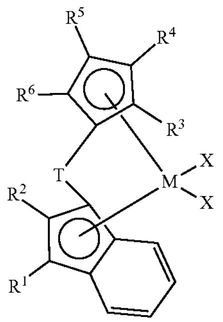

Formula (4)

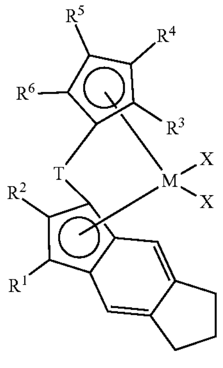

In Formulas (2), (3), and (4), $R^1$, $R^2$, $R^3$, $R^4$, $R^5$, $R^6$, T, M and X are defined as above for Formula (1) and optionally when $R^3$, $R^4$, $R^5$ and $R^6$ are Me, $R^1$ is not methyl, ethyl or n-propyl (alternately, $R^1$ is not Me, Et or nPr, Bu or neopentyl). Preferably, $R^2$ is hydrogen in Formulas (2), (3), and (4). Alternately, in any embodiment of Formula (2), (3), and (4) described herein, $R^1$ is not a $C_1$ to $C_4$ hydrocarbyl (alternately $R^1$ is not a $C_1$ to $C_5$ hydrocarbyl, alternately $R^1$ is not a $C_1$ to $C_6$hydrocarbyl, alternately $R^1$ is a $C_6$ to $C_{40}$ hydrocarbyl). Alternately $R^1$ is not a linear hydrocarbyl, such as a $C_1$ to $C_6$ linear hydrocarbyl or a $C_1$ to $C_{12}$ linear hydrocarbyl. Alternately $R^1$ is a branched $C_3$ to $C_{40}$ hydrocarbyl, such as a branched $C_4$ to $C_{20}$ hydrocarbyl such as a branched $C_6$ to $C_{12}$ hydrocarbyl. Alternately $R^1$ is isopropyl, t-butyl, sec-butyl, neopentyl, neohexyl, 3,5,5-trimethylpentyl and the like. Alternately $R^1$ is isopropyl, t-butyl, sec-butyl, neohexyl, 3,5,5-trimethylpentyl and the like.

Examples of suitable bridging groups T useful in any of the formulas herein (such as Formulas (1), (1A), (1B), (1C), (2), (3), and (4)) include $R'_2C$, $R'_2Si$, $R'_2Ge$, $R'_2CCR'_2$, $R'_2CCR'_2CR'_2$, $R'_2CCR'_2CR'_2CR'_2$, $R'C{=}CR'$, $R'C{=}CR'CR'_2$, $R'_2CCR'{=}CR'CR'_2$, $R'C{=}CR'CR'{=}CR'$, $R'C{=}CR'CR'_2CR'_2$, $R'_2CSiR'_2$, $R'_2SiSiR'_2$, $R_2CSiR'_2CR'_2$, $R'_2SiCR'_2SiR'_2$, $R'C{=}CR'SiR'_2$, $R'_2CGeR'_2$, $R'_2GeGeR'_2$, $R'_2CGeR'_2CR'_2$, $R'_2GeCR'_2GeR'_2$, $R'_2SiGeR'_2$, $R'C{=}CR'GeR'_2$, $R'B$, $R'_2C{-}BR'$, $R'_2C{-}BR'{-}CR'_2$, $R'_2C{-}O{-}CR'_2$, $R'_2CR'_2C{-}O{-}CR'_2CR'_2$, $R'_2C{-}O{-}CR'_2CR'_2$, $R'_2C{-}O{-}CR'{=}CR'$, $R'_2C{-}S{-}CR'_2$, $R'_2CR'_2C{-}S{-}CR'_2CR'_2$, $R'_2C{-}S{-}CR'_2CR'_2$, $R'_2C{-}S{-}CR'{=}CR'$, $R'_2C{-}Se{-}CR'_2$, $R'_2CR'_2C{-}Se{-}CR'_2CR'_2$, $R'_2C{-}Se{-}CR_2CR'_2$, $R'_2C{-}Se{-}CR'{=}CR'$, $R'_2C{-}N{=}CR'$, $R'_2C{-}NR'{-}CR'_2$, $R'_2C{-}NR'{-}CR'_2CR'_2$, $R'_2C{-}NR'{-}CR'{=}CR'$, $R'_2CR'_2C{-}NR'{-}CR'_2CR'_2$, $R'_2C{-}P{=}CR'$, and $R'_2C{-}PR'{-}CR'_2$, where R' is hydrogen or a $C_1$-$C_{20}$ hydrocarbyl, substituted hydrocarbyl, halocarbyl, substituted halocarbyl, silylcarbyl or germylcarbyl substituent. Optionally, two or more adjacent R' may join to form a substituted or unsubstituted, saturated, partially unsaturated or aromatic, cyclic or polycyclic substituent. Particularly suitable examples of bridging groups T include, $R'_2Si$ (R' is preferably methyl) and $CR'_2CR'_2$ (R' is preferably H), where R' is hydrogen or a $C_1$-$C_{20}$ hydrocarbyl, substituted hydrocarbyl, halocarbyl, substituted halocarbyl, silylcarbyl or germylcarbyl substituent, optionally, two or more adjacent R' may join to form a substituted or unsubstituted, saturated, partially unsaturated or aromatic, cyclic or polycyclic substituent.

When two occurrences of R' are located upon the same atom in bridging group T, the two occurrences of R' may be represented by $R^a$ and $R^b$, wherein $R^a$ and $R^b$ are independently hydrogen or an optionally substituted hydrocarbyl (such as $C_1$ to $C_{20}$ hydrocarbyl), halocarbyl, silylcarbyl, or germylcarbyl group, and $R^a$ and $R^b$ are optionally bonded together to form a ring structure. In any embodiment of the present disclosure T may be $(CR^aR^b)_x$, $SiR^aR^b$ or $GeR^aR^b$, wherein x is 1 or 2 and $R^a$ and $R^b$ are as defined as above. Preferably, bridging group T is $SiR^aR^b$, and preferably, bridging group T is $SiMe_2$.

Examples of suitable group 4 metals useful in any of the formulas herein (such as Formulas (1), (1A), (1B), (1C), (2), (3), and (4)) include Hf, Zr and Ti, preferably Hf and Zr, preferably Hf.

Examples of suitable X groups useful in any of the formulas herein (such as Formulas (1), (1A), (1B), (1C), (2), (3), and (4)) include hydrocarbyl radicals having from 1 to 20 carbon atoms, aryls, hydrides, amides, alkoxides, sulfides, phosphides, halides, dienes, amines, phosphines, ethers, and a combination thereof, (two X's may form a part of a fused ring or a ring system). Preferably each X is independently selected from halides, aryls, and $C_1$ to $C_5$ alkyl groups. For instance, each X may be a chloro, bromo, phenyl, methyl, ethyl, propyl, butyl or pentyl group. In specific embodiments, each X is a methyl group.

Examples of suitable $R^1$ and $R^2$ groups useful in any of the formulas herein (such as Formulas (1), (1A), (1B), (1C), (2), (3), and (4)) include optionally substituted $C_1$ to $C_{20}$ hydrocarbyl groups, such as optionally substituted $C_2$ to $C_{20}$ hydrocarbyl groups, such as optionally substituted $C_3$ to $C_{20}$ hydrocarbyl groups such as optionally substituted $C_4$ to $C_{12}$ hydrocarbyl groups. Preferably, each $R^1$ and $R^2$ is independently selected from the following: H; $CH_3$; $CH_2CH_3$; $CH_2CH_2CH_3$; $CH_2(CH_2)_2CH_3$; $CH_2(CH_2)_{3-30}CH_3$; $CH_2C(CH_3)_3$; $CH{=}CH_2$; $CH(CH_3)_2$; $CH_2CH(CH_3)_2$; $CH_2CH_2CH(CH_3)_2$; $C(CH_3)_2CH(CH_3)_2$; $CH(C(CH_3)_3)CH(CH_3)_2$; $C(CH_3)_3$; $CH_2C(CH_3)_3$ $CH_2Si(CH_3)_3$; $CH_2Ph$; $C_3H_5$, $C_4H_7$; $C_8H_9$; $C_6H_7$; $C_7H_{13}$; $C_8H_{15}$; $C_9H_{17}$; $CH_2CH{=}CH_2$; $CH_2CH_2CH{=}CH_2$; $CH_2CH_2(CF_2)_7CF_3$; $CF_3$; $N(CH_3)_2$; $N(C_2H_5)_2$; and $OC(CH_3)_3$. In some embodiments, each $R^1$ and $R^2$ is independently selected from hydrogen, or $C_1$-$C_{20}$ alkyl (preferably hydrogen, methyl, ethyl, propyl, butyl, pentyl, heptyl, hexyl, octyl, nonyl, decyl, undecyl, dodecyl, trimethylsilylmethyl or an isomer thereof).

Examples of suitable $R^3$, $R^4$, $R^5$, and $R^6$ groups useful in any of the formulas herein (such as Formulas (1), (1A), (1B), (1C), (2), (3), and (4)) include optionally substituted $C_1$ to $C_{20}$ hydrocarbyl groups, such as optionally substituted $C_2$ to $C_{20}$ hydrocarbyl groups, such as optionally substituted $C_3$ to $C_{20}$ hydrocarbyl groups such as optionally substituted $C_4$ to $C_{12}$ hydrocarbyl groups. Preferably, each $R^3$, $R^4$, $R^5$, and $R^6$ is independently selected from the following: H; $CH_3$; $CH_2CH_3$; $CH_2CH_2CH_3$; $CH_2(CH_2)_2CH_3$; $CH_2(CH_2)_{3-30}CH_3$; $CH_2C(CH_3)_3$; $CH{=}CH_2$; $CH(CH_3)_2$; $CH_2CH(CH_3)_2$; $CH_2CH_2CH(CH_3)_2$; $C(CH_3)_2CH(CH_3)_2$; $CH(C(CH_3)_3)CH(CH_3)_2$; $C(CH_3)_3$; $CH_2C(CH_3)_3$ $CH_2Si(CH_3)_3$; $CH_2Ph$; $C_3H_5$, $C_4H_7$; $C_8H_9$; $C_6H_7$; $C_7H_{13}$; $C_8H_{15}$; $C_9H_{17}$; $CH_2CH{=}CH_2$; $CH_2CH_2CH{=}CH_2$; $CH_2CH_2(CF_2)_7CF_3$; $CF_3$; $N(CH_3)_2$; $N(C_2H_5)_2$; and $OC(CH_3)_3$. In some embodiments, each $R^3$, $R^4$, $R^5$, and $R^6$ is independently selected from hydrogen, or $C_1$-$C_{10}$ alkyl (preferably hydrogen, methyl, ethyl, propyl, butyl, pentyl, heptyl, hexyl, octyl, nonyl, decyl or an isomer thereof).

Examples of suitable $R^7$, $R^8$, $R^9$, $R^{10}$, $R^{11}$, $R^{12}$, $R^{13}$, and/or $R^{14}$ groups useful in any of the formulas herein (such as Formula (1), (1A), (1B), (1C), (2), (3), and (4)) include optionally substituted $C_1$ to $C_{20}$ hydrocarbyl groups, such as optionally substituted $C_2$ to $C_{20}$ hydrocarbyl groups, such as optionally substituted $C_3$ to $C_{20}$ hydrocarbyl groups such as optionally substituted $C_4$ to $C_{12}$ hydrocarbyl groups. Preferably, each $R^7$, $R^8$, $R^9$, $R^{10}$, $R^{11}$, $R^{12}$, $R^{13}$, and $R^{14}$ is independently selected from the following: H; $CH_3$; $CH_2CH_3$; $CH_2CH_2CH_3$; $CH_2(CH_2)_2CH_3$; $CH_2(CH_2)_{3-30}CH_3$; $CH_2C(CH_3)_3$; $CH{=}CH_2$; $CH(CH_3)_2$; $CH_2CH(CH_3)_2$; $CH_2CH_2CH(CH_3)_2$; $C(CH_3)_2CH(CH_3)_2$; $CH(C(CH_3)_3)CH(CH_3)_2$; $C(CH_3)_3$; $CH_2C(CH_3)_3$ $CH_2Si(CH_3)_3$; $CH_2Ph$; $C_3H_5$, $C_4H_7$; $C_8H_9$; $C_6H_{11}$; $C_7H_{13}$; $C_8H_{15}$; $C_9H_{17}$; $CH_2CH{=}CH_2$; $CH_2CH_2CH{=}CH_2$; $CH_2CH_2(CF_2)_7CF_3$; $CF_3$; $N(CH_3)_2$; $N(C_2H_5)_2$; and $OC(CH_3)_3$. In some embodiments, each $R^7$, $R^8$, $R^9$, $R^{10}$, $R^{11}$, $R^{12}$, $R^{13}$, and/or $R^{14}$ is independently selected from hydrogen, or $C_1$-$C_{10}$ alkyl (preferably hydrogen, methyl, ethyl, propyl, butyl, pentyl, heptyl, hexyl, octyl, nonyl, decyl or an isomer thereof).

In still more specific examples, bridged metallocene complexes suitable for use in the present disclosure may include those represented by Formulas 2A, 3A and 4A below.

Formula (2A)

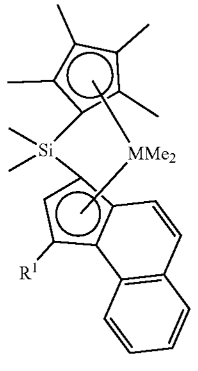

Formula (3A)

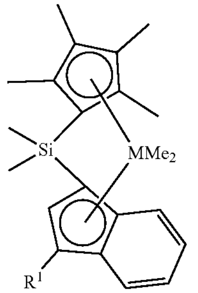

Formula (4A)

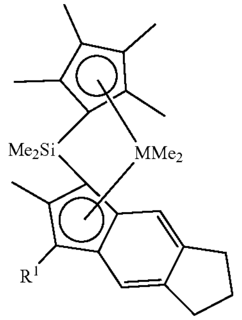

M is a Group 4 metal, preferably Hf or Zr; in Formula (3A), $R^1$ is $CH_2$i-Pr, $CH_2$t-Bu, or $CH_2SiMe_3$; in Formula (2A), $R^1$ is not hydrogen (and is preferably methyl, n-propyl, $CH_2$i-Pr, $CH_2$t-Bu, or $CH_2SiMe_3$); and in Formula (4A), $R^1$ is methyl, n-propyl, $CH_2$i-Pr, $CH_2$t-Bu, or $CH_2SiMe_3$. Alternately, in any embodiment of Formula (2A), (3A) or (4A). As described herein, $R^1$ is not a $C_1$ to $C_4$ hydrocarbyl (alternately $R^1$ is not a $C_1$ to $C_5$ hydrocarbyl, alternately $R^1$ is not a $C_1$ to $C_6$ hydrocarbyl, alternately $R^1$ is a $C_6$ to $C_{40}$ hydrocarbyl). Alternately $R^1$ is not a linear hydrocarbyl, such as a $C_1$ to $C_6$ linear hydrocarbyl or a $C_1$ to $C_{12}$ linear hydrocarbyl. Alternately $R^1$ is a branched $C_3$ to $C_{40}$ hydrocarbyl, such as a branched $C_4$ to $C_{20}$ hydrocarbyl such as a branched $C_6$ to $C_{12}$ hydrocarbyl. Alternately $R^1$ is isopropyl, t-butyl, sec-butyl, neopentyl, neohexyl, 3,5,5-trimethylpentyl and the like.

In still more specific examples, M in Formula (2A) is hafnium and $R^1$ is methyl (2A-Hf-1), n-Pr (2A-Hf-3), $CH_2$i-Pr (2A-Hf-3), $CH_2$t-Bu (2A-Hf-4), or $CH_2SiMe_3$ (2A-Hf-5). In another specific example, M in Formula (2A) is zirconium and $R^1$ is $CH_2$i-Pr (2A-Zr-3). In still another specific example, M in Formula (3A) is hafnium and $R^1$ is $CH_2$i-Pr (3A-Hf-3) or $CH_2$t-Bu (3A-Hf-4). In yet another specific example, M in Formula (4A) is hafnium and $R_1$ is $CH_2$i-Pr (4A-Hf-3).

In any embodiment of the present disclosure, suitable transition metal complexes may include, for example: dimethylsilyl tetramethylcyclopentadienyl (3-methylbenz[e]indenyl)M(R)$_2$; dimethylsilyl tetramethylcyclopentadienyl (3-ethylbenz[e]indenyl)M(R)$_2$; dimethylsilyl tetramethylcyclopentadienyl (3-propylbenz[e]indenyl)M(R)$_2$; dimethylsilyl tetramethylcyclopentadienyl (3-butylbenz[e]indenyl)M (R)$_2$; dimethylsilyl tetramethylcyclopentadienyl (3-pentylpropylbenz[e]indenyl)M(R)$_2$; dimethylsilyl tetramethylcyclopentadienyl (3-hexylpropylbenz[e]indenyl) M(R)$_2$; dimethylsilyl tetramethylcyclopentadienyl (3-isobutylbenz[e]indenyl)M(R)$_2$; dimethylsilyl tetramethylcyclopentadienyl (3-neopentylbenz[e]indenyl)M(R)$_2$; dimethylsilyl (tetramethylcyclopentadienyl) (1-trimethylsilylmethylbenz[e]indenyl)M(R)$_2$; dimethylsilyl tetramethylcyclopentadienyl (3-methylindenyl)M(R)$_2$; dimethylsilyl tetramethylcyclopentadienyl (3-ethylindenyl)M(R)$_2$; dimethylsilyl tetramethylcyclopentadienyl (3-propylindenyl)M (R)$_2$; dimethylsilyl tetramethylcyclopentadienyl (3-butylindenyl)M(R)$_2$; dimethylsilyl tetramethylcyclopentadienyl (3-pentylpropylindenyl)M(R)$_2$; dimethylsilyl tetramethylcyclopentadienyl (3-hexylpropylindenyl)M(R)$_2$; dimethylsilyl tetramethylcyclopentadienyl (3-isobutylindenyl)M(R) $_2$; dimethylsilyl tetramethylcyclopentadienyl (3-neopentylindenyl)M(R)$_2$; dimethylsilyl (tetramethylcyclopentadienyl) (1-trimethylsilylmethylindenyl)M(R)$_2$; dimethylsilyl tetramethylcyclopentadienyl (3-methyl-1,5,6,7-tetrahydro-s-indacenyl)M(R)$_2$; dimethylsilyl tetramethylcyclopentadienyl (3-ethyl-1,5,6,7-tetrahydro-s-indacenyl)M (R)$_2$; dimethylsilyl tetramethylcyclopentadienyl (3-propyl-1,5,6,7-tetrahydro-s-indacenyl)M(R)$_2$; dimethylsilyl tetramethylcyclopentadienyl (3-butyl-1,5,6,7-tetrahydro-s-indacenyl)M(R)$_2$; dimethylsilyl tetramethylcyclopentadienyl (3-pentyl-1,5,6,7-tetrahydro-s-indacenyl)M(R)$_2$; dimethylsilyl tetramethylcyclopentadienyl (3-hexyl-1,5,6,7-tetrahydro-s-indacenyl)M(R)$_2$; dimethylsilyl tetramethylcyclopentadienyl (3-isobutyl-1,5,6,7-tetrahydro-s-indacenyl)M(R)$_2$; dimethylsilyl tetramethylcyclopentadienyl (3-neopentyl-1,5,6,7-tetrahydro-s-indacenyl)M(R)$_2$; and dimethylsilyl(tetramethylcyclopentadienyl)(1-trimethylsilylmethyl-1,5,6,7-tetrahydro-s-indacenyl)M(R)$_2$; wherein M is Zr or Hf, and each R is independently selected from halide, aryl, silylcarbyl, and $C_1$ to $C_{10}$ alkyl groups. For instance, each R may be a chloro, bromo, phenyl, methyl, ethyl, propyl, butyl, pentyl, hexyl, heptyl, octyl, nonyl, decyl, undecyl, dodecyl, trimethylsilylmethyl group or an isomer thereof. In specific embodiments, each R is a methyl group.

Catalyst Synthesis

Scheme 1 below shows a general synthetic route through which the bridged metallocene compounds of the present disclosure may be prepared using multi-step syntheses. Scheme 1 is illustrated with an indenyl group, but also is applicable to benz[e]indenyl, tetrahydro-s-indacenyl, and the like. In Scheme 1, reaction step (i) is a deprotonation via a metal salt of alkyl anion (e.g., n-butyllithium) to form an indenide. Reaction step (ii) is a reaction of indenide with an appropriate $CpSiMe_2Cl$ precursor (e.g., $Me_4CpSiMe_2Cl$). Reaction step (iii) is a double deprotonation via an alkyl anion (e.g., n-butyllithium) to form a dianion. Reaction step (iv) is reaction of the dianion with a metal halide (e.g., $HfCl_4$). Reaction step (v) is an alkylation of a dichloride compound to a dialkyl compound using an appropriate alkylating reagent (e.g., methylmagnesium iodide as shown).

Scheme 1

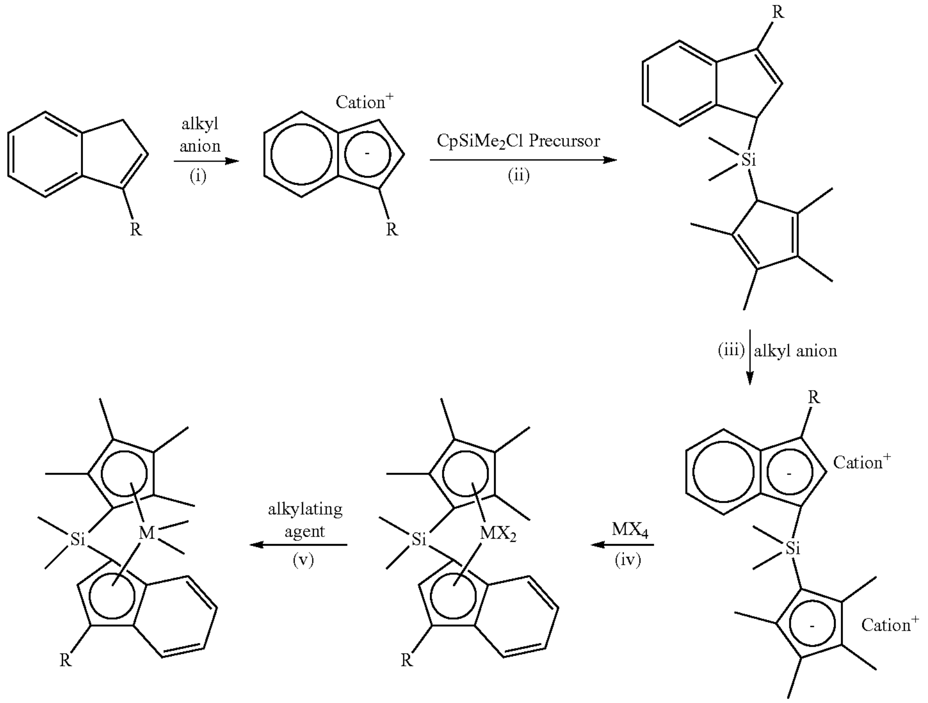

The present disclosure also provides catalyst systems comprising at least one of the bridged metallocene compounds described hereinabove. More specifically, the catalyst systems of the present disclosure comprise at least one activator and a bridged metallocene compound represented by Formula (1), wherein the variables in Formula (1) are specified in more detail above. Any of the more specific bridged metallocene compounds having structures represented by Formulas (1A), (2), (2A), (3), (3A), (4) and/or (4A) may also be used in the catalyst systems disclosed herein. Without being bound by any theory or mechanism, the at least one activator may react with the bridged metallocene compound to promote loss of a ligand to open a coordination site at which polymerization of an olefin may occur. In particular, the at least one activator is believed to remove at least one of the leaving groups to form a catalytically active species.

Activators

In any embodiment of the present disclosure, suitable activators for the bridged metallocene compounds may comprise an alumoxane. Suitable alumoxanes are not considered especially limited, if they allow a polymerization reaction to occur upon contacting a polymerizable monomer, such as one or more alpha olefins, as described herein. Methylalumoxane (MAO) or modified methylalumoxane (MMA) may be an especially suitable alumoxane for use in combination with the bridged metallocene compounds disclosed herein.

When the activator is an alumoxane, the ratio of alumoxanes to bridged metallocene compound (per metal catalytic site) (Al:M) may be from about 1:1 to about 500:1, which includes from about 1:1 to about 500:1 (Al:M), from about 1:1 to about 200:1 (Al:M), from about 1:1 to about 100:1 (Al:M), or from about 1:1 to about 50:1 (Al:M).

Ionizing/Non Coordinating Anion Activators

The term "non-coordinating anion" (NCA) means an anion which either does not coordinate to a cation or which is only weakly coordinated to a cation thereby remaining sufficiently labile to be displaced, typically by a neutral Lewis base. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. Any metal or metalloid that can form a compatible, weakly coordinating complex may be used or contained in the non-coordinating anion. Suitable metals include, but are not limited to, aluminum, gold, and platinum. Suitable metalloids include, but are not limited to, boron, aluminum, phosphorus, and silicon.

It is within the scope of this invention to use an ionizing activator, neutral or ionic. It is also within the scope of this invention to use neutral or ionic activators alone or in combination with alumoxane or modified alumoxane activators.

In embodiments of the invention, the activator is represented by the Formula (III):

$$(Z)_d^+(A^{d-}) \quad \text{(III)}$$

wherein Z is (L-H) or a reducible Lewis Acid, L is an neutral Lewis base; H is hydrogen; $(L\text{-}H)^+$ is a Bronsted acid; $A^{d-}$ is a non-coordinating anion having the charge d−; and d is an integer from 1 to 3 (such as 1, 2 or 3). Optionally, Z is ($Ar_3C^+$), where Ar is aryl or aryl substituted with a heteroatom, a $C_1$ to $C_{40}$ hydrocarbyl, or a substituted $C_1$ to $C_{40}$ hydrocarbyl. The anion component $A^{d-}$ includes those having the formula $[M^{k+}Q_n]^{d-}$ wherein k is 1, 2, or 3; n is 1, 2, 3, 4, 5, or 6 (preferably 1, 2, 3, or 4); n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 40 carbon atoms (optionally with the proviso that in not more than 1 occurrence is Q a halide). Preferably, each Q is a fluorinated hydrocarbyl group having 1 to 40 (such as 1 to 30, such as 1 to 20) carbon atoms, more preferably each Q is a fluorinated aryl group, such as a perfluorinated aryl group and most preferably each Q is a pentafluoryl aryl group or perfluoronaphthalenyl group. Examples of suitable $A^{d-}$ also include diboron compounds as disclosed in U.S. Pat. No. 5,447,895, which is fully incorporated herein by reference.

When Z is the activating cation (L-H), it can be a Bronsted acid, capable of donating a proton to the transition metal catalytic precursor resulting in a transition metal cation, including ammoniums, oxoniums, phosphoniums, sulfoniums, and mixtures thereof, such as ammoniums of methylamine, aniline, dimethylamine, diethylamine, N-methylaniline, N-methyl-4-nonadecyl-N-octadecylaniline, N-methyl-4-octadecyl-N-octadecylaniline, diphenylamine, trimethylamine, triethylamine, N,N-dimethylaniline, methyldiphenylamine, pyridine, p-bromo N,N-dimethylaniline, p-nitro-N,N-dimethylaniline, dioctadecylmethylamine, phosphoniums from triethylphosphine, triphenylphosphine, and diphenylphosphine, oxoniums from ethers such as dimethyl ether, diethyl ether, tetrahydrofuran and dioxane, sulfoniums from thioethers, such as diethyl thioethers, tetrahydrothiophene, and mixtures thereof.

In particularly useful embodiments of the invention, the activator is soluble in non-aromatic-hydrocarbon solvents, such as aliphatic solvents.

In one or more embodiments, a 20 wt % mixture of the activator compound in n-hexane, isohexane, cyclohexane, methylcyclohexane, or a combination thereof, forms a clear homogeneous solution at 25° C., preferably a 30 wt % mixture of the activator compound in n-hexane, isohexane, cyclohexane, methylcyclohexane, or a combination thereof, forms a clear homogeneous solution at 25° C.

In embodiments of the invention, the activators described herein have a solubility of more than 10 mM (or more than 20 mM, or more than 50 mM) at 25° C. (stirred 2 hours) in methylcyclohexane.

In embodiments of the invention, the activators described herein have a solubility of more than 1 mM (or more than 10 mM, or more than 20 mM) at 25° C. (stirred 2 hours) in isohexane.

In embodiments of the invention, the activators described herein have a solubility of more than 10 mM (or more than 20 mM, or more than 50 mM) at 25° C. (stirred 2 hours) in methylcyclohexane and a solubility of more than 1 mM (or more than 10 mM, or more than 20 mM) at 25° C. (stirred 2 hours) in isohexane.

In a preferred embodiment, the activator is a non-aromatic-hydrocarbon soluble activator compound.

Non-aromatic-hydrocarbon soluble activator compounds useful herein include those represented by the Formula (V):

$$[R^{1'}R^{2'}R^{3'}EH]_{d+}[Mt^{k+}Q_n]^{d-} \quad (V)$$

wherein:

E is nitrogen or phosphorous;

d is 1, 2 or 3; k is 1, 2, or 3; n is 1, 2, 3, 4, 5, or 6; n−k=d (preferably d is 1, 2 or 3; k is 3; n is 4, 5, or 6);

$R^{1'}$, $R^{2'}$, and $R^{3'}$ are independently a $C_1$ to $C_{50}$ hydrocarbyl group optionally substituted with one or more alkoxy groups, silyl groups, a halogen atoms, or halogen containing groups, wherein $R^{1'}$, $R^{2'}$, and $R^{3'}$ together comprise 15 or more carbon atoms;

Mt is an element selected from group 13 of the Periodic Table of the Elements, such as B or Al; and each Q is independently a hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical.

Non-aromatic-hydrocarbon soluble activator compounds useful herein include those represented by the Formula (VI):

$$[R^{1'}R^{2'}R^{3'}EH]^+[BR^{4'}R^{5'}R^{6'}R^{7'}]^- \quad (VI)$$

wherein: E is nitrogen or phosphorous; $R^{1'}$ is a methyl group; $R^{2'}$ and $R^{3'}$ are independently is $C_4$-$C_{50}$ hydrocarbyl group optionally substituted with one or more alkoxy groups, silyl groups, a halogen atoms, or halogen containing groups wherein $R^{2'}$ and $R^{3'}$ together comprise 14 or more carbon atoms; B is boron; and $R^{4'}$, $R^{5'}$, $R^{6'}$, and $R^{7'}$ are independently hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical.

Non-aromatic-hydrocarbon soluble activator compounds useful herein include those represented by the Formula (VII) or Formula (VIII):

(VII)

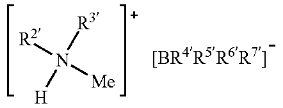

and (VIII)

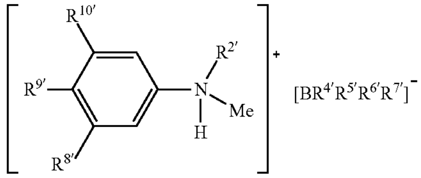

wherein:

N is nitrogen;

$R^{2'}$ and $R^{3'}$ are independently is $C_6$-$C_{40}$ hydrocarbyl group optionally substituted with one or more alkoxy groups, silyl groups, a halogen atoms, or halogen containing groups wherein $R^{2'}$ and $R^{3'}$ (if present) together comprise 14 or more carbon atoms;

$R^{8'}$, $R^{9'}$, and $R^{10'}$ are independently a $C_4$-$C_{30}$ hydrocarbyl or substituted $C_4$-$C_{30}$ hydrocarbyl group;

B is boron;

and $R^{4'}$, $R^{5'}$, $R^{6'}$, and $R^{7'}$ are independently hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical.

Optionally, in any of Formulas (V), (VI), (VII), or (VIII) herein, $R^{4'}$, $R^{5'}$, $R^{6'}$, and $R^{7'}$ are pentafluorophenyl.

Optionally, in any of Formulas (V), (VI), (VII), or (VIII) herein, $R^{4'}$, $R^{5'}$, $R^{6'}$, and $R^{7'}$ are pentafluoronaphthalenyl.

Optionally, in any embodiment of Formula (VIII) herein, $R^{8'}$ and $R^{10'}$ are hydrogen atoms and $R^{9'}$ is a $C_4$-$C_{30}$ hydrocarbyl group which is optionally substituted with one or more alkoxy groups, silyl groups, a halogen atoms, or halogen containing groups.

Optionally, in any embodiment of Formula (VIII) herein, $R^{9'}$ is a $C_8$-$C_{22}$ hydrocarbyl group which is optionally substituted with one or more alkoxy groups, silyl groups, a halogen atoms, or halogen containing groups.

Optionally, in any embodiment of Formula (VII) or (VIII) herein, $R^{2'}$ and $R^{3'}$ are independently a $C_{12}$-$C_{22}$ hydrocarbyl group.

Optionally, $R^{1'}$, $R^{2'}$ and $R^{3'}$ together comprise 15 or more carbon atoms (such as 18 or more carbon atoms, such as 20 or more carbon atoms, such as 22 or more carbon atoms, such as 25 or more carbon atoms, such as 30 or more carbon atoms, such as 35 or more carbon atoms, such as 38 or more carbon atoms, such as 40 or more carbon atoms, such as 15 to 100 carbon atoms, such as 25 to 75 carbon atoms).

Optionally, $R^{2'}$ and $R^{3'}$ together comprise 15 or more carbon atoms (such as 18 or more carbon atoms, such as 20 or more carbon atoms, such as 22 or more carbon atoms, such as 25 or more carbon atoms, such as 30 or more carbon atoms, such as 35 or more carbon atoms, such as 38 or more carbon atoms, such as 40 or more carbon atoms, such as 15 to 100 carbon atoms, such as 25 to 75 carbon atoms).

Optionally, $R^{8'}$, $R^{9'}$, and $R^{10'}$ together comprise 15 or more carbon atoms (such as 18 or more carbon atoms, such as 20 or more carbon atoms, such as 22 or more carbon atoms, such as 25 or more carbon atoms, such as 30 or more carbon atoms, such as 35 or more carbon atoms, such as 38 or more carbon atoms, such as 40 or more carbon atoms, such as 15 to 100 carbon atoms, such as 25 to 75 carbon atoms).

Optionally, when Q is a fluorophenyl group, then $R^{2'}$ is not a $C_1$-$C_{40}$ linear alkyl group (alternately $R^{2'}$ is not an optionally substituted $C_1$-$C_{40}$ linear alkyl group).

Optionally, each of $R^{4'}$, $R^{5'}$, $R^{6'}$, and $R^{7'}$ is an aryl group (such as phenyl or naphthalenyl), wherein at least one of $R^{4'}$, $R^{5'}$, $R^{6'}$, and $R^{7'}$ is substituted with at least one fluorine atom, preferably each of $R^{4'}$, $R^{5'}$, $R^{6'}$, and $R^{7'}$ is a perfluoroaryl group (such as perfluorophenyl or perfluoronaphthalenyl).

Optionally, each Q is an aryl group (such as phenyl or naphthalenyl), wherein at least one Q is substituted with at least one fluorine atom, preferably each Q is a perfluoroaryl group (such as perfluorophenyl or perfluoronaphthalenyl).

Optionally, $R^{1'}$ is a methyl group; $R^{2'}$ is $C_6$-$C_{50}$ aryl group; and $R^{3'}$ is independently $C_1$-$C_{40}$ linear alkyl or $C_5$-$C_{50}$-aryl group.

Optionally, each of $R^{2'}$ and $R^{3'}$ is independently unsubstituted or substituted with at least one of halide, $C_1$-$C_{35}$ alkyl, $C_5$-$C_{15}$ aryl, $C_6$-$C_{35}$ arylalkyl, $C_6$-$C_{35}$ alkylaryl, wherein $R^2$, and $R^3$ together comprise 20 or more carbon atoms.

Optionally, each Q is independently a hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical, provided that when Q is a fluorophenyl group, then $R^{2'}$ is not a $C_1$-$C_{40}$ linear alkyl group, preferably $R^{2'}$ is not an optionally substituted $C_1$-$C_{40}$ linear alkyl group (alternately when Q is a substituted phenyl group, then $R^{2'}$ is not a $C_1$-$C_{40}$ linear alkyl group, preferably $R^{2'}$ is not an optionally substituted $C_1$-$C_{40}$ linear alkyl group). Optionally, when Q is a fluorophenyl group (alternately when Q is a substituted phenyl group), then $R^{2'}$ is a meta- and/or para-substituted phenyl group, where the meta and para substituents are, independently, an optionally substituted $C_1$ to $C_{40}$ hydrocarbyl group (such as a $C_6$ to $C_{40}$ aryl group or linear alkyl group, a $C_{12}$ to $C_{30}$ aryl group or linear alkyl group, or a $C_{10}$ to $C_{20}$ aryl group or linear alkyl group), an optionally substituted alkoxy group, or an optionally substituted silyl group. Optionally, each Q is a fluorinated hydrocarbyl group having 1 to 30 carbon atoms, more preferably each Q is a fluorinated aryl (such as phenyl or naphthalenyl) group, and most preferably each Q is a perflourinated aryl (such as phenyl or naphthalenyl) group. Examples of suitable $[Mt^{k+}Q_n]^{d-}$ also include diboron compounds as disclosed in U.S. Pat. No. 5,447,895, which is fully incorporated herein by reference. Optionally, at least one Q is not substituted phenyl. Optionally all Q are not substituted phenyl. Optionally at least one Q is not perfluorophenyl. Optionally all Q are not perfluorophenyl.

In some embodiments of the invention, $R^{1'}$ is not methyl, $R^{2'}$ is not $C_{18}$ alkyl and $R^{3'}$ is not $C_{18}$ alkyl, alternately $R^{1'}$ is not methyl, $R^{2'}$ is not $C_{18}$ alkyl and $R^{3'}$ is not $C_{18}$ alkyl and at least one Q is not substituted phenyl, optionally all Q are not substituted phenyl.

Useful cation components in Formulas (III) and (V) to (VIII) include those represented by the formula:

10

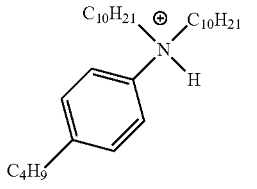

11

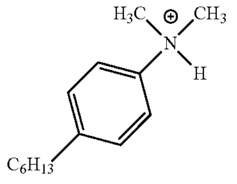

12

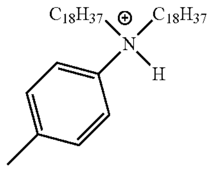

13

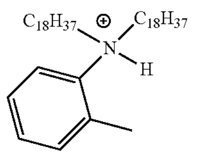

14

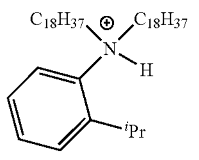

-continued
15
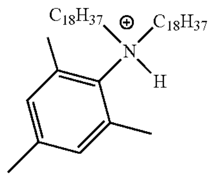
16
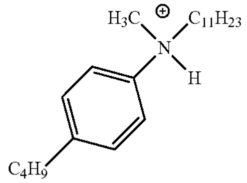
17
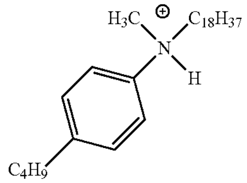
18
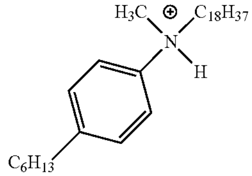
19
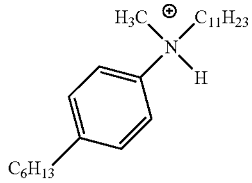
20
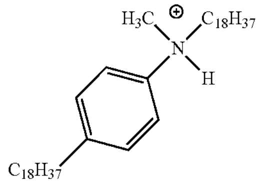
21
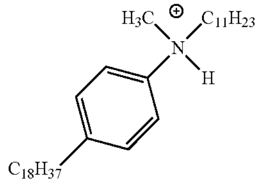
22
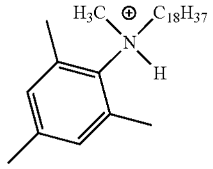
-continued
23
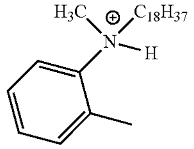
24
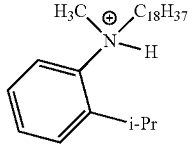
25
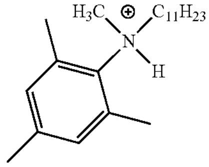
26
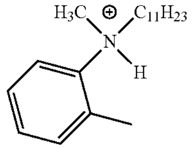
27
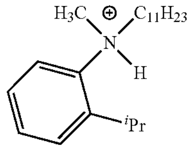
29
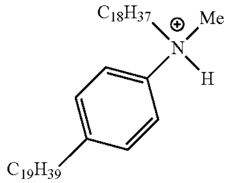
28
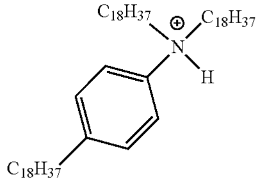
30
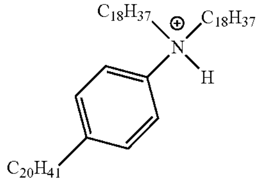
31
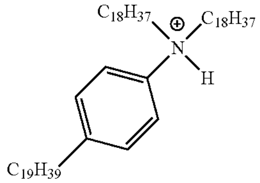

-continued

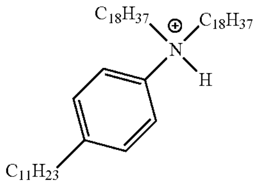

32

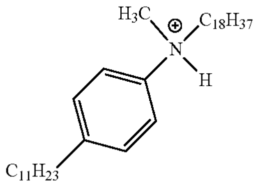

33

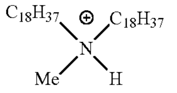

34

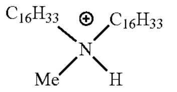

35

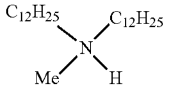

36

Useful cation components in Formulas (III) and (V) to (VIII) include those represented by the formulas:

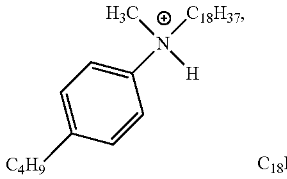

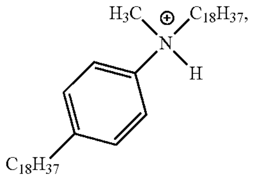

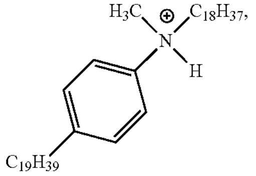

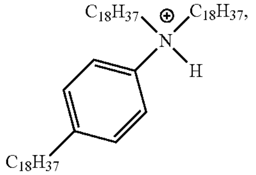

and

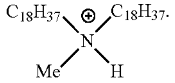

The anion component of the activators described herein includes those represented by the formula $[Mt^{k+}Q_n]^-$ wherein k is 1, 2, or 3; n is 1, 2, 3, 4, 5, or 6 (preferably 1, 2, 3, or 4), (preferably k is 3; n is 4, 5, or 6, preferably when M is B, n is 4); Mt is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the provision that in not more than 1 occurrence is Q a halide. Preferably, each Q is a fluorinated hydrocarbyl group, optionally having 1 to 20 carbon atoms, more preferably each Q is a fluorinated aryl group, and most preferably each Q is a perfluorinated aryl group. Preferably at least one Q is not substituted phenyl, such as perfluorophenyl, preferably all Q are not substituted phenyl, such as perfluorophenyl.

In one embodiment, the borate activator comprises tetrakis(heptafluoronaphth-2-yl)borate.

In one embodiment, the borate activator comprises tetrakis(pentafluorophenyl)borate.

Anions for use in the non-coordinating anion activators described herein also include those represented by Formula (7), below:

Formula (7)

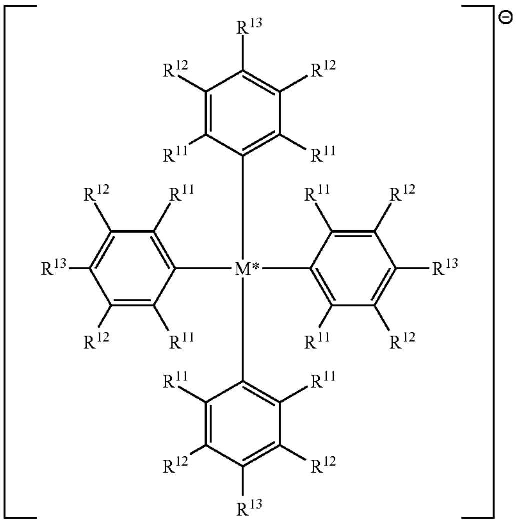

wherein:

M* is a group 13 atom, preferably B or Al, preferably B;

each $R^{11}$ is, independently, a halide, preferably a fluoride;

each $R^{12}$ is, independently, a halide, a $C_6$ to $C_{20}$ substituted aromatic hydrocarbyl group or a siloxy group of the formula —O—Si—$R^a$, where $R^a$ is a $C_1$ to $C_{20}$ hydrocarbyl or hydrocarbylsilyl group, preferably $R^{12}$ is a fluoride or a perfluorinated phenyl group;

each $R^{13}$ is a halide, a $C_6$ to $C_{20}$ substituted aromatic hydrocarbyl group or a siloxy group of the formula —O—Si—$R_a$, where $R^a$ is a $C_1$ to $C_{20}$ hydrocarbyl or hydrocarbylsilyl group, preferably $R^{13}$ is a fluoride or a $C_6$ perfluorinated aromatic hydrocarbyl group;

wherein $R^{12}$ and $R^{13}$ can form one or more saturated or unsaturated, substituted or unsubstituted rings, preferably $R^{12}$ and $R^{13}$ form a perfluorinated phenyl ring. Preferably the anion has a molecular weight of greater than 700 g/mol, and, preferably, at least three of the substituents on the M* atom each have a molecular volume of greater than 180 cubic A.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids," *Journal of Chemical Education*, v.71(11), November 1994, pp. 962-964. Molecular volume (MV), in units of cubic A, is calculated using the formula: $MV=8.3V_S$, where $V_S$ is the scaled volume. $V_S$ is the sum of the relative volumes of the constituent atoms, and is calculated from the molecular formula of the substituent using Table A below of relative volumes. For fused rings, the $V_S$ is decreased by 7.5% per fused ring. The Calculated Total MV of the anion is the sum of the MV per substituent, for example, the MV of perfluorophenyl is 183 Å$^3$, and the Calculated Total MV for tetrakis(perfluorophenyl)borate is four times 183 Å$^3$, or 732 Å$^3$.

TABLE A

| Element | Relative Volume |
|---|---|
| H | 1 |
| 1$^{st}$ short period, Li to F | 2 |
| 2$^{nd}$ short period, Na to Cl | 4 |
| 1$^{st}$ long period, K to Br | 5 |
| 2$^{nd}$ long period, Rb to I | 7.5 |
| 3$^{rd}$ long period, Cs to Bi | 9 |

Exemplary anions useful herein and their respective scaled volumes and molecular volumes are shown in Table B below. The dashed bonds indicate bonding to boron.

TABLE B

| Ion | Structure of Boron Substituents | Molecular Formula of Each Substituent | $V_S$ | MV Per subst. (Å$^3$) | Calculated Total MV (Å$^3$) |
|---|---|---|---|---|---|
| tetrakis(perfluorophenyl)borate | 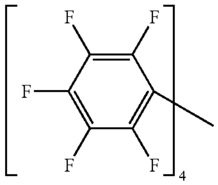 | $C_6F_5$ | 22 | 183 | 732 |
| tris(perfluorophenyl)-(perfluoronaphthalenyl)borate | 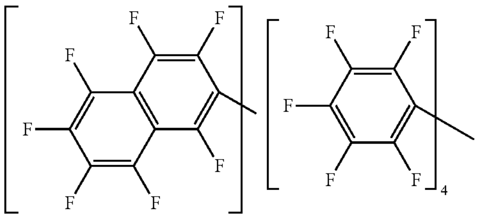 | $C_6F_5$<br>$C_{10}F_7$ | 22<br>34 | 183<br>261 | 810 |
| (perfluorophenyl)tris-(perfluoronaphthalenyl)borate | 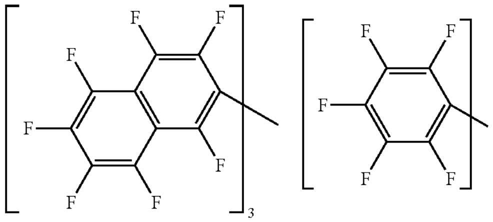 | $C_6F_5$<br>$C_{10}F_7$ | 22<br>34 | 183<br>261 | 966 |
| tetrakis(perfluoronaphthalenyl) borate | 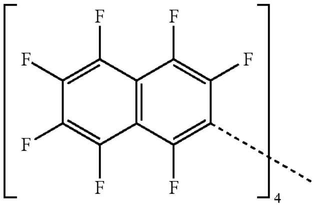 | $C_{10}F_7$ | 34 | 261 | 1044 |
| tetrakis(perfluorobiphenyl)borate | 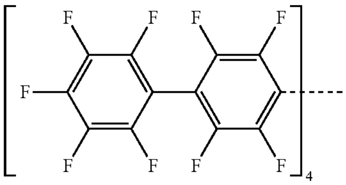 | $C_{12}F_9$ | 42 | 349 | 1396 |

TABLE B-continued

| Ion | Structure of Boron Substituents | Molecular Formula of Each Substituent | $V_S$ | MV Per subst. (Å$^3$) | Calculated Total MV (Å$^3$) |
|---|---|---|---|---|---|
| $[(C_6F_3(C_6F_5)_2)_4B]$ | 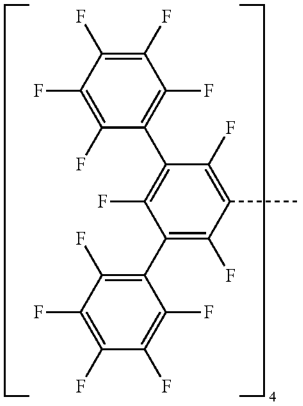 | $C_{18}F_{13}$ | 62 | 515 | 2060 |

The activators may be added to a polymerization in the form of an ion pair using, for example, [M2HTH]+ [NCA]− in which the di(hydrogenated tallow)methylamine ("M2HTH") cation reacts with a basic leaving group on the transition metal complex to form a transition metal complex cation and [NCA]−. Alternatively, the transition metal complex may be reacted with a neutral NCA precursor, such as $B(C_6F_5)_3$, which abstracts an anionic group from the complex to form an activated species. Useful activators include di(hydrogenated tallow)methylammonium[tetrakis(pentafluorophenyl)borate] (i.e., $[M_2HTH]B(C_6F_5)_4$) and di(octadecyl)tolylammonium [tetrakis(pentafluorophenyl)borate] (i.e., $[DOdTH]B(C_6F_5)_4$).

Activator compounds that are particularly useful in this invention include one or more of: N,N-di(hydrogenated tallow)methylammonium [tetrakis(perfluorophenyl) borate], N-methyl-4-nonadecyl-N-octadecylanilinium [tetrakis(perfluorophenyl)borate], N-methyl-4-hexadecyl-N-octadecylanilinium [tetrakis(perfluorophenyl)borate], N-methyl-4-tetradecyl-N-octadecylanilinium [tetrakis(perfluorophenyl) borate], N-methyl-4-dodecyl-N-octadecylanilinium [tetrakis (perfluorophenyl)borate], N-methyl-4-decyl-N-octadecylanilinium [tetrakis(perfluorophenyl)borate], N-methyl-4-octyl-N-octadecylanilinium [tetrakis(perfluorophenyl)borate], N-methyl-4-hexyl-N-octadecylanilinium [tetrakis(perfluorophenyl)borate], N-methyl-4-butyl-N-octadecylanilinium [tetrakis(perfluorophenyl)borate], N-methyl-4-octadecyl-N-decylanilinium [tetrakis(perfluorophenyl)borate], N-methyl-4-nonadecyl-N-dodecylanilinium [tetrakis(perfluorophenyl)borate], N-methyl-4-nonadecyl-N-tetradecylanilinium [tetrakis(perfluorophenyl) borate], N-methyl-4-nonadecyl-N-hexadecylanilinium [tetrakis(perfluorophenyl)borate], N-ethyl-4-nonadecyl-N-octadecylanilinium [tetrakis(perfluorophenyl)borate], N-methyl-N,N-dioctadecylammonium [tetrakis(perfluorophenyl)borate], N-methyl-N,N-dihexadecylammonium [tetrakis(perfluorophenyl)borate], N-methyl-N,N-ditetradecylammonium [tetrakis(perfluorophenyl)borate], N-methyl-N,N-didodecylammonium [tetrakis(perfluorophenyl)borate], N-methyl-N,N-didecylammonium [tetrakis(perfluorophenyl)borate], N-methyl-N,N-dioctylammonium [tetrakis(perfluorophenyl)borate], N-ethyl-N,N-dioctadecylammonium [tetrakis(perfluorophenyl)borate], N,N-di(octadecyl)tolylammonium [tetrakis(perfluorophenyl)borate], N,N-di(hexadecyl)tolylammonium [tetrakis(perfluorophenyl)borate], N,N-di(tetradecyl)tolylammonium [tetrakis(perfluorophenyl)borate], N,N-di(dodecyl)tolylammonium [tetrakis(perfluorophenyl)borate], N-octadecyl-N-hexadecyl-tolylammonium [tetrakis(perfluorophenyl)borate], N-octadecyl-N-hexadecyl-tolylammonium [tetrakis(perfluorophenyl) borate], N-octadecyl-N-tetradecyl-tolylammonium [tetrakis (perfluorophenyl)borate], N-octadecyl-N-dodecyl-tolylammonium [tetrakis(perfluorophenyl)borate], N-octadecyl-N-decyl-tolylammonium [tetrakis(perfluorophenyl)borate], N-hexadecyl-N-tetradecyl-tolylammonium [tetrakis(perfluorophenyl)borate], N-hexadecyl-N-dodecyl-tolylammonium [tetrakis(perfluorophenyl)borate], N-hexadecyl-N-decyl-tolylammonium [tetrakis(perfluorophenyl) borate], N-tetradecyl-N-dodecyl-tolylammonium [tetrakis (perfluorophenyl)borate], N-tetradecyl-N-decyl-tolylammonium [tetrakis(perfluorophenyl)borate], N-dodecyl-N-decyl-tolylammonium [tetrakis(perfluorophenyl)borate], N-methyl-N-octadecylanilinium [tetrakis(perfluorophenyl)borate], N-methyl-N-hexadecylanilinium [tetrakis(perfluorophenyl)borate], N-methyl-N-tetradecylanilinium [tetrakis(perfluorophenyl)borate], N-methyl-N-dodecylanilinium [tetrakis(perfluorophenyl) borate], N-methyl-N-decylanilinium [tetrakis(perfluorophenyl)borate], and N-methyl-N-octylanilinium [tetrakis(perfluorophenyl)borate].

Additional useful activators and the synthesis of non-aromatic-hydrocarbon soluble activators, are described in U.S. Ser. No. 16/394,166 filed Apr. 25, 2019, U.S. Ser. No. 16/394,186, filed Apr. 25, 2019, and U.S. Ser. No. 16/394, 197, filed Apr. 25, 2019, which are incorporated by reference herein.

Likewise, particularly useful activators also include dimethylaniliniumtetrakis (pentafluorophenyl) borate and dimethyl anilinium tetrakis(heptafluoro-2-naphthalenyl) borate. For a more detailed description of useful activators please see WO 2004/026921 page 72, paragraph [00119] to page 81 paragraph [00151]. A list of additionally particularly useful activators that can be used in the practice of this invention may be found at page 72, paragraph [00177] to page 74, paragraph [00178] of WO 2004/046214.

For descriptions of useful activators please see U.S. Pat. Nos. 8,658,556 and 6,211,105.

Preferred activators for use herein also include N-methyl-4-nonadecyl-N-octadecylbenzenaminium tetrakis(pentafluorophenyl)borate, N-methyl-4-nonadecyl-N-octadecylbenzenaminium tetrakis(perfluoronaphthalenyl)borate, N,N-dimethylanilinium tetrakis(perfluoronaphthalenyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthalenyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, $[Me_3NH^+][B(C_6F_5)_4^-\sim]$; 1-(4-(tris(pentafluorophenyl)borate)-2,3,5,6-tetrafluorophenyl)pyrrolidinium; and tetrakis(pentafluorophenyl)borate, 4-(tris(pentafluorophenyl)borate)-2,3,5,6-tetrafluoropyridine.

In a preferred embodiment, the activator comprises a triaryl carbenium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthalenyl)borate, triphenylcarbenium tetrakis(perfluorobiphenyl)borate, triphenylcarbenium tetrakis(3,5-bis(trifluoromethyl)phenyl)borate).

In another embodiment, the activator comprises one or more of trialkylammonium tetrakis(pentafluorophenyl)borate, N,N-dialkylanilinium tetrakis(pentafluorophenyl)borate, dioctadecylmethylammonium tetrakis(pentafluorophenyl)borate, dioctadecylmethylammonium tetrakis(perfluoronaphthalenyl)borate, N,N-dimethyl-(2,4,6-trimethylanilinium) tetrakis(pentafluorophenyl)borate, trialkylammonium tetrakis-(2,3,4,6-tetrafluorophenyl)borate, N,N-dialkylanilinium tetrakis-(2,3,4,6-tetrafluorophenyl)borate, trialkylammonium tetrakis(perfluoronaphthalenyl)borate, N,N-dialkylanilinium tetrakis(perfluoronaphthalenyl)borate, trialkylammonium tetrakis(perfluorobiphenyl)borate, N,N-dialkylanilinium tetrakis(perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl)phenyl)borate, di-(i-propyl)ammonium tetrakis(pentafluorophenyl)borate, (where alkyl is methyl, ethyl, propyl, n-butyl, sec-butyl, or t-butyl).

The typical activator-to-catalyst ratio, e.g., all NCA activators-to-catalyst ratio is about a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

It is also within the scope of the present disclosure that the catalyst compounds can be combined with combinations of alumoxanes and NCA's (see for example, U.S. Pat. Nos. 5,153,157; 5,453,410; EP 0 573 120 B1; WO 1994/007928; and WO 1995/014044 (the disclosures of which are incorporated herein by reference in their entirety) which discuss the use of an alumoxane in combination with an ionizing activator).

Particularly useful activators include dimethylaniliniumtetrakis (pentafluorophenyl) borate and dimethyl anilinium tetrakis(heptafluoro-2-naphthyl) borate. For a more detailed description of useful activators please see WO 2004/026921 page 72, paragraph [00119] to page 81 paragraph [00151]. A list of particularly useful activators that can be used in the practice of this invention may be found at page 72, paragraph [00177] to page 74, paragraph [00178] of WO 2004/046214.

Particularly useful activators include those disclosed in US 2019/0330139 and US 2019/0330392.

Optional Scavengers, Co-Activators, Chain Transfer Agents

In addition to activator compounds, scavengers or co-activators may be used. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and diethyl zinc.

A scavenger is a compound that is typically added to facilitate polymerization by scavenging impurities. Some scavengers may also act as activators and may be referred to as co-activators. A co-activator, that is not a scavenger, may also be used in conjunction with an activator in order to form an active catalyst. In some embodiments a co-activator can be pre-mixed with the transition metal compound to form an alkylated transition metal compound.

Chain transfer agents may be used in the compositions and or processes described herein. Useful chain transfer agents are typically alkylalumoxanes, a compound represented by the formula $AlR_3$, $ZnR_2$ (where each R is, independently, a $C_1$-$C_5$ aliphatic radical, preferably methyl, ethyl, propyl, butyl, penyl, hexyl octyl or an isomer thereof) or a combination thereof, such as diethyl zinc, methylalumoxane, trimethylaluminum, triisobutylaluminum, trioctylaluminum, or a combination thereof.

Supports

In any embodiment, a catalyst system suitable for use in the methods and systems disclosed herein may be disposed on a solid support. The solid support may allow a catalytic reaction, such as polymerization of an olefinic feed, to be conducted under heterogeneous conditions. In more specific embodiments, the solid support may be silica. Other suitable solid supports may include, but are not limited to, alumina, magnesium chloride, talc, inorganic oxides, or chlorides including one or more metals from Groups 2, 3, 4, 5, 13, or 14 of the Periodic Table, and polymers such as polystyrene, or functionalized and/or cross-linked polymers. Other inorganic oxides that may suitably function as solid supports include, for example, titania, zirconia, boron oxide, zinc oxide, magnesia, or any combination thereof Combinations of inorganic oxides may be suitably used as solid supports as well. Illustrative combinations of suitable inorganic oxides include, but are not limited to, silica-alumina, silica-titania, silica-zirconia, silica-boron oxide, and the like.

In any embodiment, an alumoxane or other suitable activator may be disposed on silica or another suitable solid support before being combined with the bridged metallocene compounds disclosed herein. The bridged metallocene compounds disclosed herein may be disposed upon silica or another suitable support before being combined with an alumoxane or other suitable activator. Upon combining the activator and the solid support with the bridged metallocene compounds, the resulting catalyst system may become disposed upon the solid support. Catalyst systems having different catalytic properties may be obtained depending upon whether the bridged metallocene compounds or the activator are supported on the solid support first.

In any embodiment, an alumoxane, such as MAO, may be mixed in an inert solvent such as toluene and then be slurried with a solid support, such as silica. Alumoxane deposition upon the solid support may occur at a temperature from about 60° C. to 120° C., or about 80° C. to 120° C., or about 100° C. to 120° C. Deposition occurring below 60° C., including room temperature deposition, may also be effective.

In any embodiment, solid supports suitable for use in the disclosure herein may have a surface area ranging from about 1 $m^2/g$ to about 1,000 $m^2/g$, about 5 $m^2/g$ to about 900 $m^2/g$, about 50 $m^2/g$ to about 500 $m^2/g$, or about 100 $m^2/g$ to about 400 $m^2/g$. In any embodiment, a solid support may have a pore volume ranging from about 0.01 $cm^3/g$ to about 4 $cm^3/g$, about 0.1 $cm^3/g$ to about 3 $cm^3/g$, about 0.8 $cm^3/g$ to about 3 $cm^3/g$, or about 1 $cm^3/g$ to about 2.5 $cm^3/g$. In any embodiment, a solid support may have an average particle size ranging from about 0.1 μm low of about 500 μm, about 0.3 μm to about 400 μm, about 0.5 μm to about 250 μm, about 1 μm to about 200 μm, about 5 μm to about 150 μm, or about 10 μm to about 100 μm.

Polymerization

Oligomerization methods suitable for generating vinyl-terminated PAOs are also described herein. Vinyl-terminated PAOs may be generated by providing an olefinic feed and contacting a catalyst system, as specified herein, with the olefinic feed under polymerization reaction conditions. The olefinic feed may comprise one or more alpha olefins, preferably a $C_3$-$C_{32}$ (alternately $C_4$-$C_{32}$, alternately $C_6$-$C_{30}$, alternately $C_8$-$C_{20}$,) alpha olefin, optionally in further combination with ethylene.

Polymerization processes of this invention may be carried out in any manner known in the art. Any suspension, homogeneous, bulk, solution, slurry, or gas-phase polymerization process known in the art may be used. Such processes may be run in a batch, semi-batch, or continuous mode. The term “continuous” means a system that operates without interruption or cessation. For example, a continuous process to produce a polymer or oligomer would be one where the reactants are continually introduced into one or more reactors and the polymer or oligomer product is continually withdrawn. Homogeneous polymerization processes and slurry processes are useful. A homogeneous polymerization process is defined to be a process where at least 90 wt % of the product is soluble in the reaction media. A bulk homogeneous process is particularly preferred. A bulk process is defined to be a process where monomer concentration in all feeds to the reactor is 70 vol % or more. Alternatively, no solvent or diluent is present or added in the reaction medium, (except for the small amounts used as the carrier for the catalyst system or other additives, or amounts typically found with the monomer (e.g., propane in propylene). Alternatively, the process may be a slurry process. As used herein the term “slurry polymerization process” means a polymerization process where a supported catalyst is employed and monomers are polymerized on the supported catalyst particles. At least 95 wt % of oligomer products derived from the supported catalyst are in granular form as solid particles (not dissolved in the diluent). A heterogeneous process is defined to be a process where the catalyst system is not soluble in the reaction media.

Other additives may also be used in the polymerization, as desired, such as one or more scavengers, promoters, modifiers, chain transfer agents (such as diethyl zinc), hydrogen, aluminum alkyls, or silanes. Useful chain transfer agents are typically alkylalumoxanes, a compound represented by the formula $AlR_3$, $ZnR_2$ (where each R is, independently, a $C_1$-$C_8$ aliphatic radical, preferably methyl, ethyl, propyl, butyl, pentyl, hexyl octyl or an isomer thereof) or a combination thereof, such as diethyl zinc, methylalumoxane, trimethylaluminum, triisobutylaluminum, trioctylaluminum, or a combination thereof.

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as may be found commercially (Isopar™); perhalogenated hydrocarbons, such as perfluorinated $C_{4-10}$ alkanes, chlorobenzene, and aromatic and alkyl-substituted aromatic compounds, such as benzene, toluene, mesitylene, and xylene. Suitable solvents also include liquid olefins which optionally may act as monomers or co-monomers, such as, but not limited to, ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In any embodiment, the solvent may be substantially absent any aromatic compounds. For example, aromatic compounds may be present in the solvent at less than 1 wt %, preferably less than 0.5 wt %, preferably less than 0 wt % based upon the weight of the solvents. In any embodiment, a feed stream may comprise a diluent/solvent from about 60 vol % or less, about 40 vol % or less, or 20 vol % or less, based on the total volume of the feed stream. This includes from 0 vol % to about 60 vol %, from about 0 vol % to about 40 vol %, and about 0 vol % to about 20 vol %. Typical temperatures and/or pressures include a temperature in the range of about 0° C. to about 300° C., preferably about 20° C. to about 200° C., preferably about 35° C. to about 150° C., preferably from about 40° C. to about 120° C., preferably from about 45° C. to about 80° C.; and at a pressure in the range of from about 0.35 MPa to about 10 MPa, preferably from about 0.45 MPa to about 6 MPa, or preferably from about 0.5 MPa to about 4 MPa.

In any of the polymerization reactions disclosed herein, the polymerization reaction conditions may include a reaction temperature from about 30° C. to about 200° C., or from about 50° C. to about 150° C., or from about 80° C. to about 140° C., or from about 90° C. to about 130° C. Alternatively, the polymerization reaction conditions may include a temperature ranging from about 30° C. or higher, or about 50° C. or higher, or about 100° C. or higher up to the boiling point of the solvent used in solution polymerization under the conditions present in the reactor. In the specific case of 1-decene homopolymerization, the polymerization reaction may take place at a temperature from about 80° C. to about 110° C. and a pressure of at least about 20 bar (2 MPa), or at least about 40 bar (4 MPa), or at least about 100 bar (10 MPa), or at least about 150 bar (15 MPa).

Polymerization run times may be up to about 300 minutes, for example, in the range of from about 5 minutes to about 250 minutes, which includes from about 10 minutes to about 120 minutes. For continuous polymerization processes, the run time may correspond to a residence time in the reactor.

Processing of the oligomers may take place following the polymerization reaction. Suitable processing operations may include, but are not limited to, blending, or co-extrusion with any other polymer. Non-limiting examples of other polymers include linear low-density polyethylenes, elastomers, plastomers, high-pressure low-density polyethylene, high-density polyethylenes, polypropylenes, and the like. The oligomers formed according to the present disclosure may also be blended with additives to form compositions that may then be used in articles of manufacture. Suitable additives may include antioxidants, nucleating agents, acid scavengers, plasticizers, stabilizers, anticorrosion agents, blowing agents, ultraviolet light absorbers, quenchers, antistatic agents, slip agents, phosphites, phenolics, pigments, dyes and fillers and cure agents such as peroxide.

Hydrogen may be included in the polymerization reaction conditions to provide increased activity without significantly impairing the ability of the bridged metallocene complexes to produce vinyl chain ends. Catalyst activity (calculated as g/mmol catalyst/hour) may be at least 20% higher than the same reaction without hydrogen present, which includes at least 50% higher and at least 100% higher. The activity of the catalyst may be at least 50 g/mmol/hour, at least about 500 g/mmol/hour, at least about 5,000 g/mmol/hour, or at least about 50,000 g/mmol/hour. The conversion of an olefinic feed, based upon oligomer yield and the weight of the olefin monomer entering the reaction zone, may be at least about 10%, at least about 20%, at least about 30%, at least about 50%, or at least about 80%.

Polymerization of an olefinic feed stream may be carried out in a reaction zone within a reactor. A system may include multiple reactors and/or multiple reaction zones. A reactor may be a batch reactor, a semi-batch reactor, or a continuous reactor. Examples of suitable continuous reactors include continuous stirred tanks (and trains thereof), loop-type reactors, and fluidized bed reactors. Multiple reactors may be in series or in parallel. A reactor includes at least one reaction zone comprising a bridged Group 4 metallocene compound as a polymerization catalyst. A reactor may further include at least one inlet, configured and arranged to receive a feed stream and at least one outlet, configured and arranged to receive a product stream. In any embodiment where two or more different alpha olefins are reacted, a reactor may include additional inlets for receiving a stream comprising additional monomers. A reactor may further comprise one or more additional inlets for introducing one or more of a catalyst (e.g., a bridged Group 4 metallocene compound), diluent, or any other material, for example, a hydrogen stream, and/or a catalyst poison, into the reactor. A system may also comprise conduits for conveying spent catalyst to a catalyst regeneration system. A system comprising a reactor may also comprise equipment, processors, and controls for regulating various reactor conditions including, but not limited to, pressure, temperature, and flow rate. A system comprising a reactor may also comprise equipment and plumbing to recycle un-used monomer, process gas, hydrogen, or any combination thereof, back into the system. One of ordinary skill in the art will be able to employ the catalyst systems disclosed herein to generate a product stream comprising a high yield of vinyl-terminated PAOs using reactors and equipment well known in the art without undue experimentation.

The vinyl-terminated PAOs prepared herein may be functionalized by reacting a heteroatom-containing group (e.g., amines, aldehydes, alcohols, acids, succinic acid, maleic acid, maleic anhydride) with the allyl group of the polymer, with or without a catalyst. Examples include catalytic hydrosilylation, hydroformylation, hydroboration, epoxidation, hydration, dihydroxylation, hydroamination, or maleation with or without activators such as free radical generators (e.g., peroxides). Functionalized PAOs may be used in oil additivation and many other applications, for example, additives for lubricants and/or fuels.

A vinyl-terminated PAO may also be used as a macromonomer for the preparation of polymeric materials. Processes that may be used for the preparation of these PAO products include coordinative polymerization and acid-catalyzed polymerization.

Any olefinic feed may be polymerized using the catalyst systems disclosed herein. Suitable olefinic feeds may include any $C_2$-$C_{40}$ alpha olefin, preferably a $C_3$-$C_{32}$ alpha olefin, optionally in further combination with ethylene, which may be straight chain or branched, cyclic or acyclic, optionally containing heteroatom substitution. For example, the olefinic feed may comprise one, two, three, four, five, or more of a $C_3$ alpha olefin, $C_4$ alpha olefin, $C_5$ alpha olefin, $C_6$ alpha olefin, $C_7$ alpha olefin, $C_8$ alpha olefin, $C_9$ alpha olefin, $C_{10}$ alpha olefin, $C_{11}$ alpha olefin, $C_{12}$ alpha olefin, $C_{13}$ alpha olefin, $C_{14}$ alpha olefin, $C_{15}$ alpha olefin, $C_{16}$ alpha olefin, $C_{17}$ alpha olefin, $C_{18}$ alpha olefin, $C_{19}$ alpha olefin, $C_{20}$ alpha olefin, $C_{21}$ alpha olefin, $C_{22}$ alpha olefin, $C_{23}$ alpha olefin, $C_{24}$ alpha olefin, $C_{25}$ alpha olefin, $C_{26}$ alpha olefin, $C_{27}$ alpha olefin, $C_{28}$ alpha olefin, $C_{29}$ alpha olefin, $C_{30}$ alpha olefin, $C_{31}$ alpha olefin, $C_{32}$ alpha olefin, $C_{33}$ alpha olefin, $C_{34}$ alpha olefin, $C_{35}$ alpha olefin, $C_{36}$ alpha olefin, $C_{37}$ alpha olefin, $C_{38}$ alpha olefin, $C_{39}$ alpha olefin, and a $C_{40}$ alpha olefin. In more specific embodiments, the olefinic feed may comprise a $C_2$-$C_{12}$ alpha olefin such as, for example, ethylene, propylene, 1-butene, 1-pentene, 1-hexene, 1-heptene, 1-octene, 1-nonene, 1-decene, 1-undecene, 1-dodecene, or any combination thereof. For example, combinations of propylene and 1-decene may be used. Alternatively, 1-decene may be utilized without any comonomer. The olefinic feed may comprise any single alpha olefin or any mixture of one or more of the foregoing alpha olefins. Alternately, alpha-olefin combinations absent propylene may be used.

By contacting an olefinic feed with a bridged metallocene compound as described herein, a plurality of PAOs comprising mer units derived from the alpha olefins in the olefinic feed may be produced.

For example, in any embodiment, the processes described herein may be used to produce a plurality of vinyl-terminated PAOs from a single alpha olefin (a PAO homopolymer). Examples of vinyl-terminated PAO homopolymers that may be generated include vinyl-terminated PAO homopolymers comprising a $C_2$ to $C_{40}$ alpha olefin, more preferably a $C_3$ to $C_{20}$ alpha olefin, and still more preferably an oligomer of 1-decene.

In any embodiment, the processes described herein may be used to produce a plurality of vinyl-terminated PAOs from two, three, four, or more $C_2$ to $C_{40}$ alpha olefins (a PAO copolymer). In any embodiment, suitable $C_2$ to $C_{40}$ alpha olefins include two or more of ethylene, propylene, 1-butene, 1-pentene, 1-hexene, 1-heptene, 1-octene, 1-nonene, 1-decene, 1-undecene, and 1-dodecene. Preferably, a vinyl-terminated PAO copolymer comprises propylene and 1-decene.

Accordingly, polymerization methods described herein may comprise contacting a catalyst system of the present disclosure with an olefinic feed comprising a $C_3$-$C_{32}$ (alternately $C_4$-$C_{32}$, alternately $C_6$-$C_{30}$) alpha olefin, preferably a $C_3$ to $C_{20}$ (alternately $C_4$-$C_{20}$, alternately $C_6$-$C_{20}$, alternately $C_8$-$C_{20}$) alpha olefin or any combination thereof, under polymerization reaction conditions, and obtaining a plurality of vinyl-terminated PAOs.

A vinyl-terminated PAO copolymer may comprise from about 99.0 wt % to about 80.0 wt %, about 99.0 wt % to about 85.0 wt %, about 99.0 wt % to about 87.5 wt %, about 99.0 wt % to about 90.0 wt %, about 99.0 wt % to about 92.5 wt %, 99.0 wt % to 95.0 wt %, or 99.0 wt % to 97.0 wt %, of mer units derived from a first alpha olefin (such as 1-decene or other $C_{4+}$ alpha olefin) and about 1.0 wt % to about 20.0 wt %, 1.0 wt % to about 15.0 wt %, 0.5 wt % to about 12.5 wt %, 1.0 wt % to about 10.0 wt %, 1.0 wt % to about 7.5 wt %, 1.0 wt % to about 5.0 wt %, or 1.0 wt % to about 3.0 wt % of mer units derived from one or more additional $C_3$ to $C_{20}$ alpha olefins (e.g., propylene). The additional alpha olefin may be linear or branched, and two or more comonomers may be used, if desired. Notably, catalyst systems disclosed herein may be particularly advantageous in generating a vinyl-terminated PAO absent a $C_3$-mer unit.

Particular advantages of the bridged Group 4 metallocene compounds disclosed herein are evidenced in the ability to generate a high yield of vinyl-terminated PAOs in the absence of propylene. For example, using the catalyst systems disclosed herein, at least about 62 mol % of the plurality of PAOs generated in the absence of a propylene may be vinyl-terminated. This amount of vinyl-termination includes at least about 70 mol %, at least about 80 mol %, at least about 90 mol %, or about 100 mol % may be vinyl-terminated. Particular ranges may include from about 62 mol % to about 100 mol %, from about 70 mol % to about 100 mol %, from about 80 mol % to about 100 mol %, from about 90 mol % to about 100 mol %, from about 62 mol % to about 90 mol %, from about 70 mol % to about 90 mol %, from about 80 mol % to about 90 mol %, from about 62 mol % to about 80 mol %, from about 70 mol % to about 80 mol %, and from about 62 mol % to about 70 mol %. Optionally, a plurality of PAOs generated in the absence of a $C_{3-}$ alpha olefin may comprise one or more of the following PAOs: PAOs having a trisubstituted vinylene group, PAOs having a disubstituted vinylene group, and PAOs having a vinylidene group, which may be present individually in any amount, provided that the amount of vinyl-termination falls within the above ranges.

In the presence of a propylene, at least about 80 mol % of the plurality of PAOs generated may be vinyl-terminated. For example, at least about 85 mol %, at least about 90 mol %, at least about 95 mol %, or about 100 mol % may be vinyl-terminated. Ranges include from about 80 mol % to about 100 mol %, from about 85 mol % to about 100 mol %, from about 90 mol % to about 100 mol %, from about 95 mol % to about 100 mol %, from about 80 mol % to about 95 mol %, from about 85 mol % to about 95 mol %, from about 90 mol % to about 95 mol %, from about 80 mol % to about 90 mol %, from about 85 mol % to about 90 mol %, and from about 80 mol % to about 85 mol %.

Optionally, a plurality of PAOs generated in the presence of propylene may additionally comprise one or more of the following PAOs: PAOs having a trisubstituted vinylene group, PAOs having a disubstituted vinylene group, and PAOs having a vinylidene group, which may be present individually in any amount, provided that the amount of vinyl-termination falls within the above ranges.

For example, in any embodiment, a plurality of generated PAOs may comprise from about 0 mol % to about 5 mol % of disubstituted vinylene groups based on a total molar amount of PAOs, which includes from about 0 mol % to about 4 mol %, from about 0 mol % to about 3 mol %, from about 0 mol % to about 2 mol %, from about 1 mol % to about 5 mol %, from about 1 mol % to about 4 mol %, from about 1 mol % to about 3 mol %, from about 1 mol % to about 2 mol %, from about 2 mol % to about 5 mol %, from about 2 mol % to about 4 mol %, from about 2 mol % to about 3 mol %, from about 3 mol % to about 5 mol %, from about 3 mol % to about 4 mol %, and from about 4 mol % to about 5 mol %. In any embodiment, a plurality of PAOs may comprise from about 1 mol % to about 30 mol % of trisubstituted vinylene groups based on a total molar amount of PAOs, which includes from about 1 mol % to about 25 mol %, from about 1 mol % to about 20 mol %, from about 1 mol % to about 15 mol %, from about 1 mol % to about 10 mol % from about 1 mol % to about 5 mol %, from about 5 mol % to about 30 mol %, from about 5 mol % to about 25 mol %, from about 5 mol % to about 20 mol %, from about 5 mol % to about 15 mol %, from about 5 mol % to about 10 mol %, from about 10 mol % to about 30 mol %, from about 10 mol % to about 25 mol %, from about 10 mol % to about 20 mol %, from about 10 mol % to about 15 mol %, from about 15 mol % to about 30 mol %, from about 15 mol % to about 25 mol %, from about 15 mol % to about 20 mol %, from about 20 mol % to about 30 mol %, from about 20 mol % to about 25 mol %, and from about 25 mol % to about 30 mol %. In any embodiment, a plurality of PAOs comprise about 5 mol % to about 50 mol % of vinylidene groups based on a total molar amount of PAOs, which includes from about 5 mol % to about 40 mol %, from about 5 mol % to about 30 mol %, from about 5 mol % to about 20 mol %, from about 5 mol % to about 10 mol %, from about 10 mol % to about 50 mol %, from about 10 mol % to about 40 mol %, from about 10 mol % to about 30 mol %, from about 10 mol % to about 20 mol %, from about 20 mol % to about 50 mol %, from about 20 mol % to about 40 mol %, from about 20 mol % to about 30 mol %, from about 30 mol % to about 50 mol %, from about 30 mol % to about 40 mol %, and from about 40 mol % to about 50 mol %.

Vinyl, vinylidene, disubstituted vinylene group, trisubstituted vinylene group content is determined by $^1H$ NMR (as described in the Experimental section below).

Oligomers (or polymers) produced using the bridged metallocene compounds and polymerization reactions of the present disclosure may be characterized by a range of physical property measurements, as discussed hereinafter.

In any embodiment, the catalyst systems of the present disclosure may be capable of producing a plurality of PAOs having a density, as determined by ASTM D 1505-18, ranging from about 0.86 g/cc to about 0.97 g/cc, about 0.90 g/cc to about 0.950 g/cc, about 0.905 g/cc to about 0.940 g/cc, or about 0.910 g/cc to about 0.930 g/cc.

In any embodiment, the catalyst systems of the present disclosure may be capable of producing a plurality of PAOs having a number average molecular weight (Mn), as determined by by $^1H$ NMR (as described in the Experimental section below), of at least about 500 g/mol, which includes about 500 g/mol to about 60,000 g/mol, about 500 g/mol to about 50,000 g/mol, about 500 g/mol to about 35,000 g/mol, about 500 g/mol to about 15,000 g/mol, about 500 g/mol to about 12,000 g/mol, or about 500 g/mol to about 10,000 g/mol.

In any embodiment, the catalyst systems of the present disclosure may be capable of producing a plurality of PAOs having a ratio of weight average molecular weight to number average molecular weight (Mw/Mn), as determined by $^1H$ NMR (as described in the Experimental section below), of about 1.5 to about 10, about 2.0 to about 10, about 2.2 to about 8, about 2.4 to about 7, or about 2.5 to about 6.

In any embodiment, the catalyst systems of the present disclosure may be capable of producing a plurality of PAOs having a ratio of z-average molecular weight to number average molecular weight (Mz/Mn), as determined by $^1H$ NMR (as described in the Experimental section below), of 10 or greater, which includes from about 10 to about 50, from about 12 to about 45, and from about 15 to about 40.

In any embodiment, the catalyst systems of the present disclosure may be capable of producing a plurality of PAOs having a melting point (Tm), as determined by differential scanning calorimetry (DSC), of about 100° C. to about 200° C., about 45° C. to about 135° C., about 80° C. to about 130° C., or about 115° C. to about 135° C.

Melting temperature (or melting point, Tm) is measured using Differential Scanning Calorimetry (DSC) on a commercially available instrument (e.g., TA Instruments 2920 DSC). Typically, 6 to 10 mg of polymer are sealed in an aluminum pan and loaded into the instrument at room temperature. Melting data (first heat) is acquired by heating the sample to at least 30° C. above its melting temperature at a heating rate of 10° C./min. The sample is held for at least 5 minutes at this temperature to destroy its thermal history. Crystallization data are acquired by cooling the sample from the melt to at least 50° C. below the crystallization temperature at a cooling rate of 20° C./min. The sample is held at this temperature for at least 5 minutes, and finally heated at 10° C./min to acquire additional melting data (second heat). The melting temperature is reported as the peak melting temperature from the second heat unless otherwise specified. For polymers displaying multiple peaks, the melting temperature is defined to be the peak melting temperature from the melting trace associated with the largest endothermic calorimetric response (as opposed to the peak occurring at the highest temperature).

This invention further relates to:

1. A method comprising: contacting a catalyst system with an olefinic feed comprising a $C_3$-$C_{32}$ alpha olefin (alternately $C_4$ to $C_{32}$ alpha olefin, alternately $C_6$ to $C_{30}$ alpha olefin) under polymerization reaction conditions, wherein the catalyst system comprises at least one activator and a metallocene compound represented by the formula:

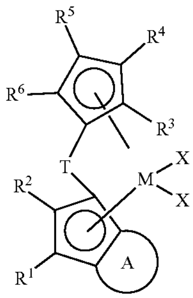

wherein:

M is a group 4 transition metal, preferably Hf or Zr;

T is a bridging group;

each X is independently a leaving group, or two Xs are joined and bound to the metal atom to form a metallocycle ring, or two Xs are joined to form a chelating ligand, a diene ligand, or an alkylidene;

$R^1$ and $R^2$ are independently hydrogen, or a $C_1$-$C_{40}$ optionally substituted hydrocarbyl group (such as halocarbyl, silylcarbyl, aminocarbyl, germylcarbyl, oxyhydrocarbyl), halide, or siloxyl group;

$R^3$, $R^4$, $R^5$ and $R^6$ are independently a $C_1$-$C_{40}$ optionally substituted hydrocarbyl, halocarbyl, silylcarbyl, aminocarbyl, or siloxyl group; and A is an aliphatic, aromatic or heteroaromatic ring, optionally bearing one or more additional fused rings which may be aliphatic, aromatic or heteroaromatic; and obtaining a plurality of vinyl-terminated polyalphaolefins (PAOs) having 30 mol % (alternately 40 mol %, alternately 50 mol %, alternately 60 mol %) or more vinyl terminated PAOs, optionally when $R^3$, $R^4$, $R^5$ and $R^6$ are Me and the cyclopentadiene and A form an indenyl group, $R^1$ is not Me, Et or nPr or the 6 membered aromatic ring of the indenyl group is substituted, and when $R^3$, $R^4$, $R^5$ and $R^6$ are Me and the cyclopentadiene and A form a benz[e]indenyl ligand, the benz[e]indenyl ligand is substituted.

2. The method of paragraph 1, wherein the metallocene compound is represented by the formula:

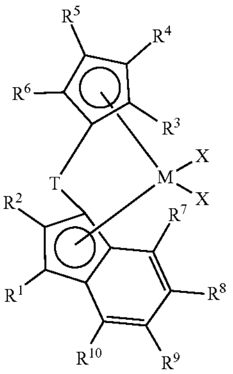

wherein $R^1$, $R^2$, $R^3$, $R^4$, $R^5$, $R^6$, M, T, and X are as defined in paragraph 1, and $R^7$, $R^8$, $R^9$ and $R^{10}$ are independently hydrogen or a $C_1$-$C_{40}$ optionally substituted hydrocarbyl, halocarbyl, silylcarbyl, aminocarbyl, germylcarbyl, oxyhydrocarbyl, halide, or siloxyl group and optionally, $R^7$ and $R^8$, or $R^8$ and $R^9$, or $R^9$ and $R^{10}$ are joined together to form a fused carbocyclic ring, and when $R^3$, $R^4$, $R^5$ and $R^6$ are Me $R^1$ is not Me, Et or nPr or at least one of $R^2$, $R^7$, $R^8$, $R^9$, or $R^{10}$ is not H.

3. The method of paragraph 1, wherein the metallocene compound is represented by the formula:

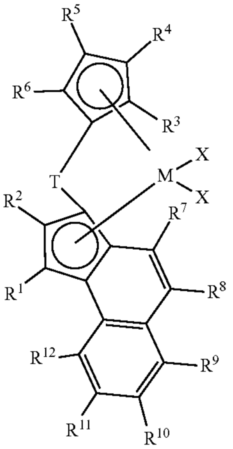

wherein $R^1$, $R^2$, $R^3$, $R^4$, $R^5$, $R^6$, M, T, and X are as defined in paragraph 1, $R^7$, $R^8$, $R^9$, $R^{10}$, $R^{11}$ and $R^{12}$ are independently hydrogen or a $C_1$-$C_{40}$ optionally substituted hydrocarbyl, halocarbyl, silylcarbyl, aminocarbyl, germylcarbyl, oxyhydrocarbyl, halide, or siloxyl group, where at least one of $R^1$, $R^2$, $R^7$, $R^8$, $R^9$, $R^{10}$, $R^{11}$ and $R^{12}$ is not H.

4. The method of paragraph 1, wherein the metallocene compound is represented by the formula:

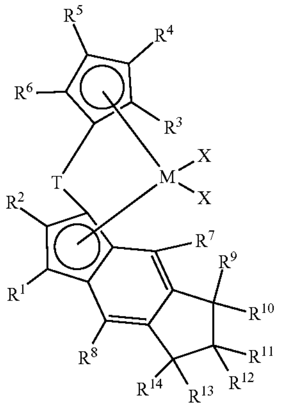

wherein $R^1$, $R^2$, $R^3$, $R^4$, $R^5$, $R^6$, M, T, and X are as defined in paragraph 1, and $R^7$, $R^8$, $R^9$, $R^{10}$, $R^{11}$, $R^{12}$, $R^{13}$, and $R^{14}$ are independently hydrogen or a $C_1$-$C_{40}$ optionally substituted hydrocarbyl group (such as halocarbyl, silylcarbyl, aminocarbyl, germylcarbyl, oxyhydrocarbyl), halide, or siloxyl group.

5. The method of paragraph 1, wherein the metallocene compound is represented by the formula:

(B)

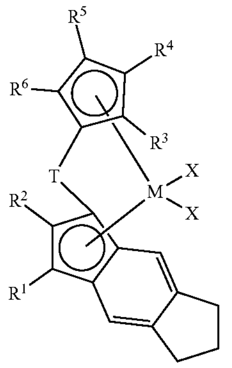

or (C)

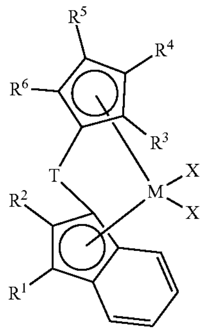

or

-continued (D)

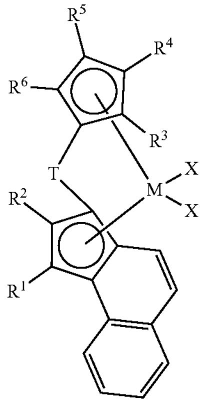

where $R^1$, $R^2$, $R^3$, $R^4$, $R^5$, $R^6$, M, T, and X are as defined in paragraph 1, where $R^1$ is methyl, ethyl, n-propyl, isopropyl, cyclopropyl, n-butyl, sec-butyl, isobutyl, tert-butyl, n-pentyl, isopentyl, neopentyl or $C_6$-$C_{40}$ hydrocarbyl group, optionally substituted hydrocarbyl group (such as halocarbyl, silylcarbyl, aminocarbyl, germylcarbyl, oxyhydrocarbyl), halide, or siloxyl group, (alternately where when $R^3$, $R^4$, $R^5$ and $R^6$ are Me in Formula (C), $R^1$ is not Me, Et, nPr, and when $R^3$, $R^4$, $R^5$ and $R^6$ are Me in Formula (D), $R^1$ is a isopropyl or $C_6$-$C_{40}$ optionally substituted hydrocarbyl group (such as halocarbyl, silylcarbyl, aminocarbyl, germylcarbyl, oxyhydrocarbyl), halide, or siloxyl group).

6. The method of any one of paragraphs 1-5, wherein $R^2$ is hydrogen.

7. The method of any preceding paragraph, wherein at least a portion of the plurality of PAOs comprises one or more of trisubstituted vinylene groups, disubstituted vinylene groups, and vinylidene groups.

8. The method of any preceding paragraph, wherein at least about 62 mol % (alternately at least about 80 mol %) of the plurality of PAOs are vinyl-terminated PAOs.

9. The method of any preceding paragraph, wherein the plurality of PAOs lack a $C_3$ alpha olefin monomer.

10. The method of any one of paragraphs 1-7, wherein the plurality of PAOs comprise a $C_3$ alpha olefin.

11. The method of any preceding paragraph, wherein the polymerization reaction conditions comprise a reaction temperature of about 80° C. or more.

12. The method of any preceding paragraph, wherein $R^1$ is hydrogen, methyl, ethyl, propyl, butyl, pentyl, hexyl, heptyl, octyl, nonyl, decyl, undecyl, dodecyl, trimethylsilylmethyl or an isomer thereof.

13. The method of any preceding paragraph, wherein $R^3$, $R^4$, $R^5$ and $R^6$ are each methyl and $R^2$ is hydrogen.

14. The method of any preceding paragraph, wherein T is $(CR^aR^b)_x$, $SiR^aR^b$, or $GeR^aR^b$; wherein x is 1 or 2, and $R^a$ and $R^b$ are independently hydrogen or an optionally substituted hydrocarbyl (such as, halocarbyl, silylcarbyl, or germylcarbyl) group, and $R^a$ and $R^b$ are optionally bonded together to form a ring structure; each X is independently selected from the group consisting of a $C_1$-$C_{20}$ hydrocarbyl group, an aryl group, a hydride, an amide, an alkoxide, a sulfide, a phosphide, a halide, an amine, a phosphine, an ether, and any combination thereof (preferably each X is independently selected from the group consisting of a $C_1$-$C_5$ alkyl group, a halide, and an aryl group).

15. The method of paragraph 1, wherein the metallocene compound is selected from the group consisting of dimethylsilyl tetramethylcyclopentadienyl (3-methylbenz[e]indenyl)$M(R)_2$; dimethylsilyl tetramethylcyclopentadienyl (3-ethylbenz[e]indenyl)$M(R)_2$; dimethylsilyl tetramethylcyclopentadienyl (3-propylbenz[e]indenyl)$M(R)_2$; dimethylsilyl tetramethylcyclopentadienyl (3-butylbenz[e]indenyl)$M(R)_2$; dimethylsilyl tetramethylcyclopentadienyl (3-pentylpropylbenz[e]indenyl)$M(R)_2$; dimethylsilyl tetramethylcyclopentadienyl (3-hexylpropylbenz[e]indenyl)$M(R)_2$; dimethylsilyl tetramethylcyclopentadienyl (3-isobutylbenz[e]indenyl)$M(R)_2$; dimethylsilyl tetramethylcyclopentadienyl (3-neopentylbenz[e]indenyl)$M(R)_2$; dimethylsilyl (tetramethylcyclopentadienyl) (1-trimethylsilylmethylbenz[e]indenyl)$M(R)_2$; dimethylsilyl tetramethylcyclopentadienyl (3-methylindenyl)$M(R)_2$; dimethylsilyl tetramethylcyclopentadienyl (3-ethylindenyl)$M(R)_2$; dimethylsilyl tetramethylcyclopentadienyl (3-propylindenyl)$M(R)_2$; dimethylsilyl tetramethylcyclopentadienyl (3-butylindenyl)$M(R)_2$; dimethylsilyl tetramethylcyclopentadienyl (3-pentylpropylindenyl)$M(R)_2$; dimethylsilyl tetramethylcyclopentadienyl (3-hexylpropylindenyl)$M(R)_2$; dimethylsilyl tetramethylcyclopentadienyl (3-isobutylindenyl)$M(R)_2$; dimethylsilyl tetramethylcyclopentadienyl (3-neopentylindenyl)$M(R)_2$; dimethylsilyl (tetramethylcyclopentadienyl) (1-trimethylsilylmethylindenyl)$M(R)_2$; dimethylsilyl tetramethylcyclopentadienyl (3-methyl-1,5,6,7-tetrahydro-s-indacenyl)$M(R)_2$; dimethylsilyl tetramethylcyclopentadienyl (3-ethyl-1,5,6,7-tetrahydro-s-indacenyl)$M(R)_2$; dimethylsilyl tetramethylcyclopentadienyl (3-propyl-1,5,6,7-tetrahydro-s-indacenyl)$M(R)_2$; dimethylsilyl tetramethylcyclopentadienyl (3-butyl-1,5,6,7-tetrahydro-s-indacenyl)$M(R)_2$; dimethylsilyl tetramethylcyclopentadienyl (3-pentyl-1,5,6,7-tetrahydro-s-indacenyl)$M(R)_2$; dimethylsilyl tetramethylcyclopentadienyl (3-hexyl-1,5,6,7-tetrahydro-s-indacenyl)$M(R)_2$; dimethylsilyl tetramethylcyclopentadienyl (3-isobutyl-1,5,6,7-tetrahydro-s-indacenyl)$M(R)_2$; dimethylsilyl tetramethylcyclopentadienyl (3-neopentyl-1,5,6,7-tetrahydro-s-indacenyl)$M(R)_2$; and dimethylsilyl(tetramethylcyclopentadienyl)(1-trimethylsilylmethyl-1,5,6,7-tetrahydro-s-indacenyl)$M(R)_2$;
   wherein M is Zr or Hf, and R is a $C_1$ to $C_{10}$ hydrocarbyl (such as alkyl or aryl), halide, or silylcarbyl group.
16. The method of any preceding paragraph, wherein the at least one activator is an alumoxane or a non-coordinating anion.
17. The method of paragraph 16, wherein the activator is represented by the formula:

$$[R^{1'}R^{2'}R^{3'}EH]_{d+}[Mt^{k+}Q_n]^{d-}$$

wherein:

E is nitrogen or phosphorous; d is 1, 2 or 3; k is 1, 2, or 3; n is 1, 2, 3, 4, 5, or 6; n−k=d;

$R^{1'}$, $R^{2'}$, and $R^{3'}$ are independently a $C_1$ to $C_{50}$ hydrocarbyl group optionally substituted with one or more alkoxy groups, silyl groups, a halogen atoms, or halogen containing groups, wherein $R^{1'}$, $R^{2'}$, and $R^{3'}$ together comprise 15 or more carbon atoms;

Mt is an element selected from group 13 of the Periodic Table of the Elements; and each Q is independently a hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical.

18. The method of any one of paragraphs 1-8 or 10-17, wherein the feed comprises a $C_3$-$C_{32}$ (alternately $C_4$-$C_{32}$, alternately $C_6$-$C_{30}$) alpha olefin selected from the group consisting of propylene, 1-butene, 1-pentene, 1-hexene, 1-heptene, 1-octene, 1-nonene, 1-decene, 1-undecene, 1-dodecene, 1-tetradecene, 1-hexadecene, isomers thereof having a terminal carbon-carbon double bond, and any combination thereof.
19. The method of any one of paragraphs 1-8 or 10-18, wherein at least a portion of the feed comprises propylene.
20. A composition comprising:
   a plurality of polyalphaolefins (PAOs) formed from at least one $C_3$-$C_{32}$ (alternately $C_4$-$C_{32}$, alternately $C_6$-$C_{30}$) alpha olefin, the plurality of PAOs comprising at least about 62 mol % vinyl chain ends if the PAOs lack a $C_3$ alpha olefin and at least about 80 mol % vinyl chain ends if the PAOs comprise a $C_3$ alpha olefin;
   wherein the plurality of PAOs optionally comprise one or more of PAOs having a trisubstituted vinylene group, PAOs having a disubstituted vinylene group, and PAOs having a vinylidene group.
21. The composition of paragraph 20, wherein the plurality of PAOs comprise a reaction product of one or more $C_4$-$C_{32}$ (alternately $C_6$-$C_{32}$, alternately $C_8$-$C_{20}$) alpha olefins.
22. The composition of paragraph 20 or 21, wherein at least about 90 mol % of the plurality of PAOs are vinyl-terminated PAOs, preferably decene oligomers.
23. The composition of paragraph 20 or paragraph 21, wherein the plurality of PAOs comprise about 0 mol % to about 5 mol % of disubstituted vinylene groups; about 1 mol % to about 30 mol % of trisubstituted vinylene groups; and about 5 mol % to about 50 mol % of vinylidene groups based on a total molar amount of PAOs.
24. The composition of any one of paragraphs 20 to 23, wherein the plurality of PAOs has an average Mn value of about 500 g/mol or above.
25. The composition of any one of paragraphs 20 to 24, wherein the plurality of PAOs is prepared by the method of paragraph 1.
26. A metallocene compound represented by the formula:

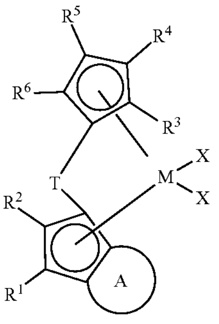

wherein:

M is a group 4 transition metal, preferably Hf or Zr;

T is a bridging group;

each X is independently a leaving group, or two Xs are joined and bound to the metal atom to form a metallocycle ring, or two Xs are joined to form a chelating ligand, a diene ligand, or an alkylidene;

$R^1$ and $R^2$ are independently hydrogen, or a $C_1$-$C_{40}$ optionally substituted hydrocarbyl group (such as halocarbyl, silylcarbyl, aminocarbyl, germylcarbyl, oxyhydrocarbyl), halide, or siloxyl group;

$R^3$, $R^4$, $R^5$ and $R^6$ are independently a $C_1$-$C_{40}$ optionally substituted hydrocarbyl, halocarbyl, silylcarbyl, aminocarbyl, or siloxyl group; and A is an aliphatic, aromatic or heteroaromatic ring, optionally bearing one or more additional fused rings which may be aliphatic, aromatic or heteroaromatic; and obtaining a plurality of vinyl-terminated polyalphaolefins (PAOs) when $R^3$, $R^4$, $R^5$ and $R^6$ are Me and the cyclopentadiene and A form an indenyl group, $R^1$ is not Me, Et, nPr, Bu, neopentyl, or the 6 membered aromatic ring of the indenyl group is substituted, and when $R^3$, $R^4$, $R^5$ and $R^6$ are Me and the cyclopentadiene and A form a benz[e]indenyl ligand, the benz[e]indenyl ligand is substituted.

27. The metallocene compound of paragraph 26, wherein the metallocene compound is represented by the formula:

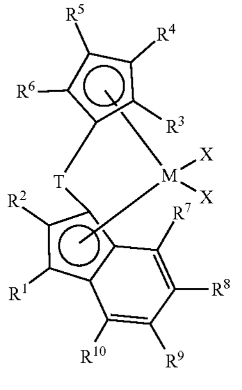

wherein $R^1$, $R^2$, $R^3$, $R^4$, $R^5$, $R^6$, M, T, and X are as defined in paragraph 26, and $R^7$, $R^8$, $R^9$ and $R^{10}$ are independently hydrogen or a $C_1$-$C_{40}$ optionally substituted hydrocarbyl, halocarbyl, silylcarbyl, aminocarbyl, germylcarbyl, oxyhydrocarbyl, halide, or siloxyl group and optionally, $R^7$ and $R^8$, or $R^8$ and $R^9$, or $R^9$ and $R^{10}$ are joined together to form a fused carbocyclic ring, and when $R^3$, $R^4$, $R^5$ and $R^6$ are Me $R^1$ is not Me, Et, nPr, Bu or neopentyl, or at least one of $R^2$, $R^7$, $R^8$, $R^9$, or $R^{10}$ is not H.

28. The metallocene compound of paragraph 26, wherein the metallocene compound is represented by the formula:

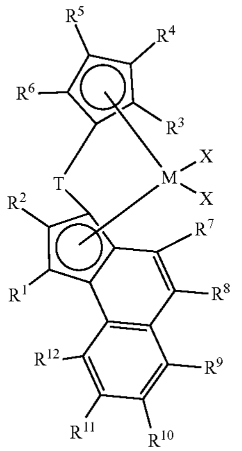

wherein $R^1$, $R^2$, $R^3$, $R^4$, $R^5$, $R^6$, M, T, and X are as defined in paragraph 26, $R^7$, $R^8$, $R^9$, $R^{10}$, $R^{11}$ and $R^{12}$ are independently hydrogen or a $C_1$-$C_{40}$ optionally substituted hydrocarbyl, halocarbyl, silylcarbyl, aminocarbyl, germylcarbyl, oxyhydrocarbyl, halide, or siloxyl group, where at least one of $R^1$, $R^{12}$, $R^7$, $R^8$, $R^9$, $R^{10}$, $R^{11}$ and $R^{12}$ is not H.

29. The metallocene compound of paragraph 26, wherein the metallocene compound is represented by the formula:

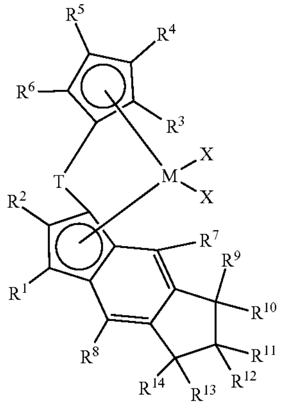

wherein $R^1$, $R^2$, $R^3$, $R^4$, $R^5$, $R^6$, M, T, and X are as defined in paragraph 26, and $R^7$, $R^8$, $R^9$, $R^{10}$, $R^{11}$, $R^{12}$, $R^{13}$, and $R^{14}$ are independently hydrogen or a $C_1$-$C_{40}$ optionally substituted hydrocarbyl group (such as halocarbyl, silylcarbyl, aminocarbyl, germylcarbyl, oxyhydrocarbyl), halide, or siloxyl group.

30. The metallocene compound of paragraph 26, wherein the metallocene compound is represented by the formula:

(B)

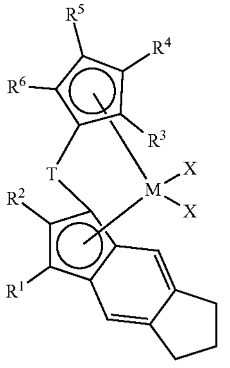

or (C)

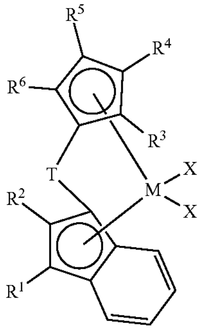

or (D)

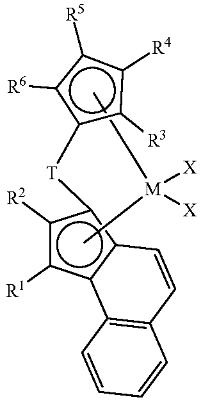

where $R^1$, $R^2$, $R^3$, $R^4$, $R^5$, $R^6$, M, T, and X are as defined in paragraph 1, where when $R^3$, $R^4$, $R^5$ and $R^6$ are Me in Formula (C), $R^1$ is not Me, Et, nPr, and when $R^3$, $R^4$, $R^5$ and $R^6$ are Me in Formula (D), $R^1$ is a isopropyl or $C_6$-$C_{40}$ optionally substituted hydrocarbyl group (such as halocarbyl, silylcarbyl, aminocarbyl, germylcarbyl, oxyhydrocarbyl), halide, or siloxyl group.

31. The metallocene compound of any of paragraphs paragraph 26 to 30, wherein $R^2$ is hydrogen.

32. The metallocene compound of any of paragraphs paragraph 26 to 31, wherein T is $(CR^aR^b)_x$, $SiR^aR^b$, or $GeR^aR^b$; wherein x is 1 or 2, and $R^a$ and $R^b$ are independently hydrogen or an optionally substituted hydrocarbyl (such as, halocarbyl, silylcarbyl, or germylcarbyl) group, and $R^a$ and $R^b$ are optionally bonded together to form a ring structure; each X is independently selected from the group consisting of a $C_1$-$C_{20}$ hydrocarbyl group, an aryl group, a hydride, an amide, an alkoxide, a sulfide, a phosphide, a halide, an amine, a phosphine, an ether, and any combination thereof (preferably each X is independently selected from the group consisting of a $C_1$-$C_5$ alkyl group, a halide, and an aryl group).

33. A metallocene compound selected from the group consisting of: dimethylsilyl tetramethylcyclopentadienyl (3-methylbenz[e]indenyl)M$(R)_2$; dimethylsilyl tetramethylcyclopentadienyl (3-ethylbenz[e]indenyl)M$(R)_2$; dimethylsilyl tetramethylcyclopentadienyl (3-propylbenz[e]indenyl)M$(R)_2$; dimethylsilyl tetramethylcyclopentadienyl (3-butylbenz[e]indenyl)M$(R)_2$; dimethylsilyl tetramethylcyclopentadienyl (3-pentylpropylbenz[e]indenyl)M$(R)_2$; dimethylsilyl tetramethylcyclopentadienyl (3-hexylpropylbenz[e]indenyl)M$(R)_2$; dimethylsilyl tetramethylcyclopentadienyl (3-isobutylbenz[e]indenyl)M$(R)_2$; dimethylsilyl tetramethylcyclopentadienyl (3-neopentylbenz[e]indenyl)M$(R)_2$; dimethylsilyl (tetramethylcyclopentadienyl) (1-trimethylsilylmethylbenz[e]indenyl)M$(R)_2$; dimethylsilyl tetramethylcyclopentadienyl (3-pentylpropylindenyl)M$(R)_2$; dimethylsilyl tetramethylcyclopentadienyl (3-hexylpropylindenyl)M$(R)_2$; dimethylsilyl tetramethylcyclopentadienyl (3-isobutylindenyl)M$(R)_2$; dimethylsilyl (tetramethylcyclopentadienyl) (1-trimethylsilylmethylindenyl)M$(R)_2$; dimethylsilyl tetramethylcyclopentadienyl (3-methyl-1,5,6,7-tetrahydro-s-indacenyl)M$(R)_2$; dimethylsilyl tetramethylcyclopentadienyl (3-ethyl-1,5,6,7-tetrahydro-s-indacenyl)M$(R)_2$; dimethylsilyl tetramethylcyclopentadienyl (3-propyl-1,5,6,7-tetrahydro-s-indacenyl)M$(R)_2$; dimethylsilyl tetramethylcyclopentadienyl (3-butyl-1,5,6,7-tetrahydro-s-indacenyl)M$(R)_2$; dimethylsilyl tetramethylcyclopentadienyl (3-pentyl-1,5,6,7-tetrahydro-s-indacenyl)M$(R)_2$; dimethylsilyl tetramethylcyclopentadienyl (3-hexyl-1,5,6,7-tetrahydro-s-indacenyl)M$(R)_2$; dimethylsilyl tetramethylcyclopentadienyl (3-isobutyl-1,5,6,7-tetrahydro-s-indacenyl)M$(R)_2$; dimethylsilyl tetramethylcyclopentadienyl (3-neopentyl-1,5,6,7-tetrahydro-s-indacenyl)M$(R)_2$; and dimethylsilyl(tetramethylcyclopentadienyl)(1-trimethylsilylmethyl-1,5,6,7-tetrahydro-s-indacenyl)M$(R)_2$;

wherein M is Zr or Hf, and R is a $C_1$ to $C_{10}$ hydrocarbyl (such as alkyl or aryl), halide, or silylcarbyl group.

34. A catalyst system comprising a metallocene compound of any of paragraphs 26 to 33 and an activator.

35. The catalyst system of paragraph 34, wherein the activator is represented by the formula:

$$[R^{1'}R^{2'}R^{3'}EH]_{d+}[Mt^{k+}Q_n]^{d-}$$

wherein:

E is nitrogen or phosphorous; d is 1, 2 or 3; k is 1, 2, or 3; n is 1, 2, 3, 4, 5, or 6; n−k=d;

$R^{1'}$, $R^{2'}$, and $R^{3'}$ are independently a $C_1$ to $C_{50}$ hydrocarbyl group optionally substituted with one or more alkoxy groups, silyl groups, a halogen atoms, or halogen containing groups, wherein $R^{1'}$, $R^{2'}$, and $R^{3'}$ together comprise 15 or more carbon atoms;

Mt is an element selected from group 13 of the Periodic Table of the Elements; and each Q is independently a hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical.

36. The catalyst system of paragraph 34, wherein the activator comprises an alumoxane.

37. The process of paragraph 1 wherein when $R^3$, $R^4$, $R^5$ and $R^6$ are Me and the cyclopentadiene and A form an indenyl group, $R^1$ is not Me, Et or nPr or the 6 membered aromatic ring of the indenyl group is substituted, and when $R^3$, $R^4$, $R^5$ and $R^6$ are Me and the cyclopentadiene and A form a benz[e]indenyl ligand, the benz[e]indenyl ligand is substituted.
38. The process of paragraph 2 wherein when $R^3$, $R^4$, $R^5$ and $R^6$ are Me $R^1$ is not Me, Et or nPr or at least one of $R^2$, $R^7$, $R^8$, $R^9$, or $R^{10}$ is not H.
39. The method of paragraph 5, where when $R^3$, $R^4$, $R^5$ and $R^6$ are Me in Formula (C), $R^1$ is not Me, Et, nPr, and when $R^3$, $R^4$, $R^5$ and $R^6$ are Me in Formula (D), $R^1$ is a isopropyl or $C_6$-$C_{40}$ optionally substituted hydrocarbyl group (such as halocarbyl, silylcarbyl, aminocarbyl, germylcarbyl, oxyhydrocarbyl), halide, or siloxyl group.

To facilitate a better understanding of the disclosure herein, the following examples of preferred or representative embodiments are given. In no way should the following examples be read to limit, or to define, the scope of the invention.

EXPERIMENTAL

All catalyst syntheses were carried out in an $N_2$ purged dry box using standard air sensitive procedures. Celite (Sigma-Aldrich) and 3 Å molecular sieves (Sigma-Aldrich or Acros) were dried in a vacuum oven at 250° C. for 3 days. Solvents were purged with $N_2$ and dried and stored over 3A molecular sieves. NMR solvents were dried and stored over 3A molecular sieves. Methylmagnesium iodide (MeMgI, 3 M in $Et_2O$, Sigma-Aldrich) and 1,2,3,5-tetrahydro-s-indacene (GLSyntech) were used as received.

Synthesis of Catalysts

Example 1: Synthesis of dimethylsilyl tetramethylcyclopentadienyl (3-methylbenz[e]indenyl)hafnium (IV) dimethyl (2A-Hf-1)

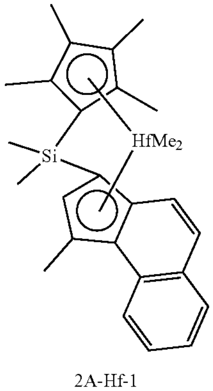

2A-Hf-1

1-methylbenz[e]indenyl lithium (0.35 g, 1.9 mmol) was dissolved in tetrahydrofuran (THF, 10 mL) and reacted with chlorodimethyl(2,3,4,5-tetramethyl-2,4-cyclopentadien-1-yl)silane ($CpMe_4HMe_2SiCl$, 0.40 g, 1.9 mmol). The reaction mixture was stirred overnight at room temperature. All volatiles were removed to yield a crude solid, which was re-slurried in pentane. The reaction mixture was filtered through diatomaceous earth (CELITER) to remove solids. All volatiles were then removed in vacuo. A clear oil (0.61 g, 1.8 mmol) was isolated and then dissolved in diethyl ether (5 mL). n-Butyllithium (11 M, 0.31 mL, 1.8 mmol) was then slowly added. The reaction mixture was stirred for 30 minutes at room temperature. All diethyl ether was removed to yield a crude solid, which was then re-slurried into pentane and agitated for 30 minutes. A white solid (0.66 g) was isolated by filtration and washed with pentane twice to yield a solid dilithiated compound (0.66 g, 1.7 mmol), which was slurried in diethyl ether (5 mL) and reacted with $HfCl_4$ (0.49 g, 1.7 mmol) for 16 hours. All diethyl ether was then removed with a stream of nitrogen to yield a crude solid, which was re-slurried into pentane and agitated for 15 minutes. A solid was collected by filtration. Hafnium dichloride (0.86 g, 1 mmol) was slurried into toluene (20 mL), methylmagnesium iodide (0.83 mL, 3 M in diethyl ether) was added, and the mixture was then combined with the solid and stirred at 70° C. for 16 hours. The reaction mixture was cooled to room temperature, after which 1,4-dioxane was added. The mixture was stirred for 15 minutes, and solids were removed by filtering the mixture through CELITE®. The filtrate was washed with diethyl ether. All volatiles were then removed in vacuo. The product ($C_{27}H_{34}HfSi$) was isolated as a solid (0.53 g), which was analyzed by $^1H$ NMR ($CD_2Cl_2$, 400 MHz): δ 8.41 (d, J=8.2 Hz, 1H), 7.80 (d, J=7.8 Hz, 1H), 7.64-7.54 (m, 1H), 7.48 (t, J=7.5 Hz, 1H), 7.30 (d, J=1.7 Hz, 2H), 5.44 (s, 1H), 2.78 (s, 3H), 1.98 (s, 3H), 1.93 (s, 3H), 1.91 (s, 3H), 1.89 (s, 3H), 1.01 (s, 3H), 0.78 (s, 3H), −0.90 (s, 3H), −2.21 (s, 3H).

Example 2: Synthesis of dimethylsilyl tetramethylcyclopentadienyl (3-propylbenz[e]indenyl)hafnium (IV) dimethyl (2A-Hf-2)

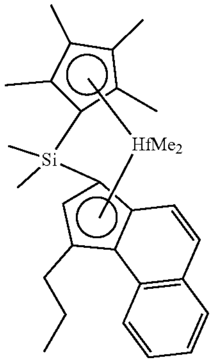

2A-Hf-2

1-propylbenz[e]indenyl Li (0.28 g, 1.26 mmol) was dissolved in THF (5 mL) and reacted with $CpMe_4HMe_2SiCl$ (0.27 g, 1.26 mmol). The reaction mixture was stirred overnight at room temperature. All volatiles were removed and the obtained crude solid was re-slurried into pentane. The solids were filtered off through CELITE®. All volatiles were then removed in vacuo. A clear oil (0.49 g, 1.26 mmol) was isolated and then dissolved in diethyl ether (5 mL). N-butyllithium (11 M, 0.23 mL, 2.5 mmol) was then slowly added, and the reaction mixture was stirred for 30 minutes at room temperature. All diethyl ether was removed and the obtained crude solid was re-slurried into pentane for 30 minutes. A white solid (0.53 g) was isolated by filtration as white solid, which was then washed with pentane. The solid dilithiated product (0.53 g, 1.1 mmol) was slurried in diethyl ether (5 ml) and reacted with $HfCl_4$ (0.36 g, 1.1 mmol) for 16 hours. All diethyl ether was then removed by a stream of nitrogen and the crude product was re-slurried into pentane for 15 minutes. The product was collected by filtration as a mixture of solids with lithium chloride. Hafnium dichloride (0.68 g, 1 mmol) was slurried into toluene (20 ml), after which methylmagnesium iodide (0.63 mL, 3 M in diethyl ether) was then added, and the reaction mixture combined with the solid and stirred at 70° C. for 16 hours. The reaction mixture was cooled to room temperature and 1,4-dioxane was added. The mixture was stirred for 15 minutes and solids were removed by filtration through CELITE® followed by washing with diethyl ether. All volatiles were then removed in vacuo. Substantially pure product ($C_{29}H_{35}HfSi$) was isolated as a solid (0.47 g), which was analyzed by $^1H$ NMR ($CD_2Cl_2$, 400 MHz): δ 8.36 (d, J=8.4 Hz, 1H), 7.80 (ddd, J=7.9, 1.5,Hz, 1H), 7.60 (ddd, J=8.5, 7.1, 1.5 Hz, 1H), 7.47 (ddd, J=7.8, 7.1, 1.2 Hz, 1H), 7.31 (s, 2H), 5.49 (s, 1H), 3.39 (ddd, J=14.9, 10.1, 4.8 Hz, 1H), 2.84 (ddd, J=15.0, 10.2, 6.3 Hz, 1H), 2.02-1.81 (m, 13H), 1.64 (dddd, J=13.6, 10.2, 7.4, 6.4 Hz, 1H), 1.11 (t, J=7.3 Hz, 3H) 1.00 (s, 3H), 0.79 (s, 3H), −0.90 (s, 3H), −2.22 (s, 3H).

Example 3: Synthesis of dimethylsilyl tetramethylcyclopentadienyl (3-isobutylbenz[e]indenyl)hafnium (IV) dimethyl (2A-Hf-3)

2A-Hf-3

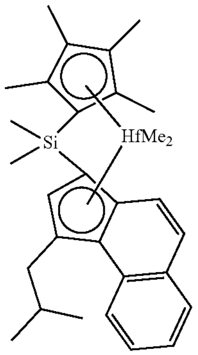

Freshly prepared i-butylmagnesium bromide (10 mmol) was added to a solution of 2,3-dihydro-1H-cyclopenta[a]naphthalen-1-one (3.0 g, 16.5 mmol) in toluene (10 mL). The reaction mixture was stirred at 70° C. overnight. The reaction mixture was then removed from the nitrogen box and quenched by saturated aqueous ammonium chloride. The organic phase was dried with magnesium sulfate, after which all solvents were removed. The crude solid was dissolved in dichloromethane (30 mL), and a catalytic amount of p-toluenesulfonic acid was added. After stirring at room temperature for 30 minutes, the reaction was quenched with saturated aqueous sodium bicarbonate, and the organic phase was dried with magnesium sulfate. All solvent was then removed to yield a solid product, which was purified by silica gel flash chromatography using 5% dichloromethane in hexane. After removing all solvent, the resulting solid (0.78 g, 4 mmol) was dissolved diethyl ether (20 mL), treated with 11 M n-butyllithium (2.2 mL, 4 mmol), and stirred for 30 minutes. All diethyl ether was then removed by a stream of nitrogen and the crude product was re-slurried into pentane for 15 minutes. Lithiated product (0.8 g) was collected by filtration as a pale green solid, which was dissolved in THF (15 mL) and reacted with $CpMe_4HMe_2SiCl$ (0.7 g, 3 mmol). The reaction mixture was stirred overnight at room temperature. All volatiles were removed and the crude product was re-slurried into pentane. The solids were filtered off through CELITE®. All volatiles were then removed in vacuo. A clear oil (1.35 g, 3 mmol) was isolated and then dissolved in diethyl ether (20 mL). N-Butyllithium (11 M, 0.61 mL, 6 mmol) was then slowly added. The reaction mixture was stirred for 1 hour at room temperature. All diethyl ether was removed, and the obtained crude solid was re-slurried into pentane for 30 minutes. A white solid (1.56 g) was isolated by filtration and washed with pentane twice during filtration. The dilithiated product (0.80 g, 2 mmol) was then mixed with hafnium tetrachloride (0.50 g, 2 mmol) in diethyl ether (30 mL) and stirred for 3 hours. All diethyl ether was then removed by a stream of nitrogen and the crude product was re-slurried into pentane for 15 minutes. The product was collected by filtration as a mixture of solids with lithium chloride. Hafnium dichloride (1.1 g, 1.3 mmol) was slurried into toluene (30 mL), methylmagnesium iodide (0.88 mL, 3 M in diethyl ether) was then added, and the reaction mixture was combined with the solid and stirred at 70° C. for 16 hours. The reaction mixture was cooled to room temperature and 1,4-dioxane (0.5 mL) was added. The mixture was stirred for 15 minutes and solids were removed by filtration through CELITE®, followed by washing with diethyl ether. All volatiles were then removed in vacuo. The crude product was then re-slurried into small amount of pentane, and was cooled to −35° C. for 1 hour. Substantially pure product crystalized from the pentane solution and was collected by filtration. The product $C_{30}H_{40}$ HfSi was isolated as a solid (0.3 g), which was analyzed by $^1H$ NMR ($CD_2Cl_2$, 400 MHz): δ 8.36-8.29 (m, 1H), 7.78 (dd, J=7.8, 1.4 Hz, 1H), 7.58 (ddd, J=8.3, 7.1, 1.5 Hz, 1H), 7.45 (ddd, J=7.9, 7.1, 1.2 Hz, 1H), 7.30 (d, J=3.9 Hz, 2H), 5.41 (s, 1H), 3.48 (dd, J=14.4, 4.3 Hz, 1H), 2.40 (dd, J=14.4, 9.9 Hz, 1H), 1.96 (s, 3H), 1.92 (s, 3H), 1.89 (s, 3H), 1.86 (s, 3H), 1.38-1.25 (m, 1H), 1.17 (d, J=6.6 Hz, 3H), 1.00 (s, 3H), 0.86 (d, J=6.6 Hz, 3H), 0.78 (s, 3H), −0.89 (s, 3H), −2.24 (s, 3H).

Example 4: Synthesis of dimethylsilyl tetramethylcyclopentadienyl (3-isobutylbenz[e]indenyl) zirconium(IV) dimethyl (2A-Zr-3)

2A-Zr-3

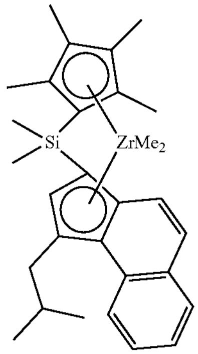

Dimethylsilyl tetramethylcyclopentadienyl (3-isobutylbenz[e]indenyl)dilithium (0.70 g, 1 mmol) was stirred with zirconium tetrachloride (0.32 g, 1 mmol) in diethyl ether (15 mL) for 3 hours. All diethyl ether was then removed by a stream of nitrogen and the obtained crude solid was re-slurried into pentane for 15 minutes. A solid was collected by filtration. Zirconium dichloride (0.77 g, 1.1 mmol) was slurried into toluene (20 mL), methylmagnesium iodide (0.79 mL, 3 M in diethyl ether) was then added, and the reaction mixture was stirred at 70° C. for 16 hours. The reaction mixture was cooled to room temperature and 1,4-dioxane was added. The mixture was stirred for 15 minutes and solids were removed by filtration through CELITE®, followed by washing with diethyl ether. All volatiles were then removed in vacuo. The crude product was then re-slurried into small amount of pentane, and was cooled to −35° C. for 1 hour. Substantially pure product was isolated by pipetting out all pentane. The product $C_{30}H_{40}ZrSi$ was isolated as a white solid (0.2 g), which was analyzed by $^1H$ NMR ($CD_2Cl_2$, 400 MHz): δ 8.35 (d, J=7.5 Hz, 1H), 7.79 (dd, J=7.9, 1.5 Hz, 1H), 7.59 (ddd, J=8.4, 7.1, 1.5 Hz, 1H), 7.46 (ddd, J=7.8, 7.1, 1.2 Hz, 1H), 7.31 (d, J=1.4 Hz, 2H), 5.44 (s, 1H), 3.52 (dd, J=14.4, 4.2 Hz, 1H), 2.52-2.35 (m, 1H), 2.22-2.09 (m, 1H), 1.96 (s, 3H), 1.90 (s, 3H), 1.84 (s, 4H), 1.83 (s, 3H), 1.18 (d, J=6.6 Hz, 3H), 0.99 (s, 3H), 0.88 (d, J=6.6 Hz, 3H), 0.76 (s, 3H), −0.70 (s, 3H), −2.08 (s, 3H).

Example 5: Synthesis of dimethylsilyl tetramethylcyclopentadienyl (3-neopentylbenz[e]indenyl)hafnium(IV) dimethyl (2A-Hf-4)

2A-Hf-4

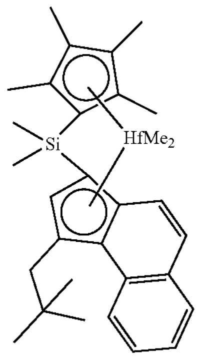

Freshly prepared neopentyl magnesium bromide (5.7 mmol) was added to a solution of 2,3-dihydro-1H-cyclopenta[a]naphthalen-1-one (0.83 g, 4.6 mmol) in toluene (10 mL). The reaction mixture was stirred at 70° C. overnight and then removed from the nitrogen box, followed by quenching with saturated aqueous ammonium chloride. The organic phase was dried with magnesium sulfate and all solvents were then removed. The crude solid was dissolved in dichloromethane (30 mL), and a catalytic amount of p-toluenesulfonic acid was added. After stirring at room temperature for 30 minutes, the reaction was quenched by saturated aqueous sodium bicarbonate. The organic phase was then dried with magnesium sulfate and solvent was then removed. The product was purified by silica gel flash chromatograph with 5% dichloromethane in hexane. After removing all solvents, the obtained solid (0.5 g, 2 mmol) was dissolved diethyl ether (5 mL) and treated with 11 M n-butyllithium (0.2 mL, 2 mmol) and stirred for 30 minutes. All diethyl ether was then removed by a stream of nitrogen and the crude product was re-slurried into pentane for 15 minutes. Lithiated product (0.16 g, 0.68 mmol) was collected as a solid by filtration, which was then dissolved in THF (5 mL) and reacted with $CpMe_4HMe_2SiCl$ (0.15 g, 0.68 mmol). The reaction mixture was stirred overnight at room temperature. All volatiles were removed and the crude product was re-slurried into pentane. The solids were filtered off through CELITE®. All volatiles were then removed in vacuo. A clear oil (0.27 g, 0.66 mmol) was isolated and then dissolved in diethyl ether (5 mL). 11 M N-butyllithium (0.51 mL, 6 mmol) was then slowly added. The reaction mixture was stirred for 30 minutes at room temperature. All diethyl ether was removed, and the crude solid was re-slurried in pentane for 30 minutes. Product was isolated by filtration as white solid (0.3 g), which was washed by pentane twice during filtration. The solid dilithiated product (0.3 g, 0.6 mmol) was slurried in diethyl ether (5 mL) and reacted with $HfCl_4$ (0.19 g, 0.6 mmol) for 16 hours. All diethyl ether was then removed with a stream of nitrogen and the crude product was re-slurried into pentane for 15 minutes. The product was collected by filtration as a mixture of solids with lithium chloride. Hafnium dichloride (0.34 g, 0.46 mmol) was slurried into toluene (20 mL), methylmagnesium iodide (0.30 mL, 3 M in diethyl ether) was then added, and the mixture was then combined with the solid stirred at 70° C. for 16 hours. The reaction mixture was cooled to room temperature and 1,4-dioxane was added. The mixture was stirred for 15 minutes and solids were removed by filtration on CELITE® and was washed by diethyl ether. All volatiles were then removed in vacuo. The crude product was then re-slurried into small amount of pentane, and was cooled to −35° C. for 1 hour. Substantially pure product was collected by filtration. The product ($C_{31}H_{42}HfSi$) was isolated as a solid (0.05 g), which was analyzed by $^1H$ NMR ($CD_2Cl_2$, 400 MHz): δ 8.56 (dd, J=8.4, 1.2 Hz, 1H), 7.76 (dd, J=7.8, 1.5 Hz, 1H), 7.54 (ddd, J=8.4, 7.1, 1.5 Hz, 1H), 7.43 (ddd, J=8.1, 7.1, 1.2 Hz, 1H), 7.34-7.24 (m, 2H), 5.39 (s, 1H), 3.62 (d, J=14.4 Hz, 1H), 2.47 (d, J=14.5 Hz, 1H), 1.94 (s, 3H), 1.92 (s, 3H), 1.89 (s, 3H), 1.84 (s, 3H), 1.00 (s, 3H), 0.99 (s, 9H), 0.78 (s, 3H), −0.90 (s, 3H), −2.26 (s, 3H).

Example 6: Synthesis of dimethylsilyl(tetramethylcyclopentadienyl)(1-trimethylsilylmethylbenz[e]indenyl) hafnium dimethyl (2A-Hf-5)

2A-Hf-5

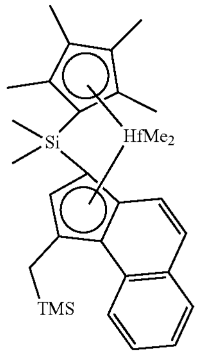

Benz[e]indenyl lithium (0.7 g, 4.07 mmol) was reacted with trimethylsilylmethyl trifluoromethanesulfonate (0.94 g, 4.0 mmol) in THF (8 mL) and stirred at room temperature overnight. All THF was removed in vacuo and the obtained crude solid was re-slurried into pentane. All solids were removed by filtration on a silica pad. Then all solvents were removed by a stream of nitrogen to yield a crude red oil (ratio of 1:0.9 for 1-substituted vs 3-substituted). 11 M n-butyllithium (0.34 mL) was slowly added to a solution of the red oil (0.97 g, 3.8 mmol) in diethyl ether (20 mL). The reaction mixture was stirred at room temperature for 30 minutes. All diethyl ether was removed by a stream of nitrogen. The crude product was re-slurried into pentane for 10 minutes. The lithiated product was collected by filtration as a solid and was used with no further purification. The lithiated product was dissolved in THF (20 mL) and reacted with $CpMe_4HMe_2SiCl$ (0.81 g, 3.8 mmol). The reaction mixture was stirred overnight at room temperature. All volatiles were removed and the crude product was re-slurried into pentane. The solids were filtered off through CELITE®. All volatiles were then removed in vacuo. The product was isolated as clear oil (1.47 g, 3.5 mmol) and was dissolved in diethyl ether (5 mL). N-Butyllithium (11 M, 0.62 mL, 7.0 mmol) was then slowly added. The reaction mixture was stirred for 30 minutes at room temperature. All diethyl ether was removed, and the crude solid was re-slurried in pentane for 30 minutes. Product was isolated by filtration as white solid (1.46 g), which was washed by pentane twice during filtration. The solid dilithiated product (1.46 g, 3 mmol) was slurried in diethyl ether (5 mL) and reacted with hafnium tetrachloride (1.06 g, 3 mmol) for 16 hours. Lithium chloride was removed by filtration. The crude diethyl ether solution was cooled to −35° C. for 3 hours then filtered to collect a precipitated solid, which was then slurried into toluene (2 mL). The slurry was then heated until all solids dissolved. Then, the solution was slowly cooled to −35° C. over the course of 16 hours. All precipitated solid was collected by filtration, which was slurried into toluene (5 mL), after which methylmagnesium iodide (0.14 mL, 3 M in diethyl ether) was added and the reaction mixture stirred at 70° C. for 16 hours. The reaction mixture was cooled to room temperature and 1,4-dioxane (0.2 mL) was added. The mixture was stirred for 15 minutes and solids were removed by filtration on CELITE® followed by washing with diethyl ether. All volatiles were then removed in vacuo. Substantially pure product ($C_{30}H_{42}HfSi_2$) was isolated as a solid (0.13 g), which was analyzed by $^1H$ NMR ($CD_2Cl_2$, 400 MHz): δ 8.38 (d, J=8.2 Hz, 1H), 7.73 (d, J=8.3 Hz, 1H), 7.51 (t, J=7.7 Hz, 1H), 7.40 (t, J=7.8 Hz, 1H), 7.24 (q, J=9.1 Hz, 2H), 5.19 (s, 1H), 2.99 (d, J=14.7 Hz, 1H), 2.13 (d, J=14.7 Hz, 1H), 1.94 (s, 3H), 1.87 (s, 6H), 1.84 (s, 3H), 0.97 (s, 3H), 0.73 (s, 3H), −0.03 (s, 9H), −0.91 (s, 3H), −2.27 (s, 3H).

Example 7: Synthesis of dimethylsilyl tetramethylcyclopentadienyl (3-isobutylindenyl) hafnium (IV) dimethyl (3A-Hf-3)

3A-Hf-3

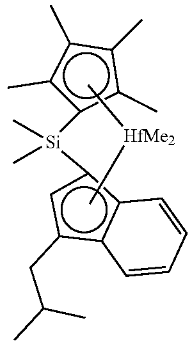

Indenyl lithium (1.0 g, 8.2 mmol) was mixed with isobutyl bromide (1.2, 8.2 mmol) in THF (15 mL) and stirred at room temperature for 16 hours. All solvents were removed in vacuo, and the crude product was re-slurried into pentane. All solids were removed by filtration through CELITE® and all solvent was removed by a stream of nitrogen to yield a clear oil. N-butyllithium (0.61 mL) was slowly added to a solution of the oil (1.16 g, 7 mmol) in diethyl ether (10 mL) and the mixture was stirred at room temperature for 30 minutes. Most diethyl ether was then removed by a stream of nitrogen. Hexane was added and the mixture was stirred for 10 minutes. The lithiated product was collected by filtration as a solid (0.56 g) and was used with no further purification. The solid was dissolved in THF (15 mL) and reacted with $CpMe_4HMe_2SiCl$ (0.68 g, 3 mmol). The reaction mixture was stirred overnight at room temperature. All volatiles were removed and the crude product was re-slurried into hexane. The solids were filtered off through CELITE®. All volatiles were then removed in vacuo. Product was isolated as clear oil (1.1 g, 3 mmol) and was dissolved in diethyl ether (10 mL). 11 M N-butyllithium (0.57 mL) was then slowly added. The reaction mixture was stirred for 30 minutes at room temperature. Most diethyl ether was removed, and the crude solid was re-slurried into hexane for 30 minutes. Product was isolated by filtration as a solid (1.36 g), which was washed by hexane twice during filtration. The solid dilithiated product (1.36 g, 3 mmol) was slurried in diethyl ether (30 mL) and reacted with $HfCl_4$ (0.91 g, 3 mmol) for 3 hours. All diethyl ether was removed, and the crude solid was slurried into hexane for 15 minutes. All solids were collected by filtration, which was re-slurried into dichloromethane (DCM). Lithium chloride was carefully filtered off on CELITE®. After solvent removal, substantially pure hafnium dichloride (1.38 g, 2 mmol) was isolated as a yellow solid, which was then slurried into toluene (20 mL). Methylmagnesium iodide (1.54 mL, 3 M in diethyl ether) was then added and the reaction mixture was stirred at 70° C. overnight. The reaction mixture was cooled to room temperature and 1,4-dioxane was added. The mixture was stirred for 15 minutes and solids were removed by filtration on CELITE®, followed by washing with diethyl ether. All volatiles were then removed in vacuo to afford product. Pure product ($C_{26}H_{38}HfSi$) was isolated as a solid (1.25 g), which was analyzed by $^1H$ NMR ($CD_2Cl_2$, 400 MHz): δ 7.59 (dt, J=8.6, 1.1 Hz, 1H), 7.33 (d, J=8.7 Hz, 1H), 7.21 (ddd, J=8.6, 6.6, 1.0 Hz, 1H), 6.95 (ddd, J=8.7, 6.6, 1.1 Hz, 1H), 5.40 (s, 1H), 2.89 (dd, J=14.0, 6.5 Hz, 1H), 2.34 (dd, J=14.0, 7.7 Hz, 1H), 1.92 (s, 3H), 1.91 (s, 3H), 1.85 (s, 3H), 1.83 (s, 3H), 0.96 (d, J=6.7 Hz, 3H), 0.94 (s, 3H), 0.90 (d, J=6.6 Hz, 3H), 0.73 (s, 3H), −0.97 (s, 3H), −2.11 (s, 3H).

Example 8: Synthesis of dimethylsilyl tetramethylcyclopentadienyl (3-neopentylindenyl) hafnium (IV) dimethyl (3A-Hf-4)

3A-Hf-4

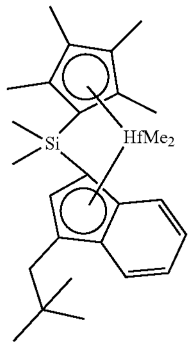

Indenyl lithium (0.81 g, 6.6 mmol) was mixed with neo-pentyl bromide (1.0 g, 6.6 mmol) in THF (10 mL) and stirred at 70° C. for 4 days. All THF was removed in vacuo and the obtained crude product was re-slurried into hexane. All solids were removed by filtration on a silica pad. Then all solvents were removed in vacuo, making sure all unreacted neo-pentyl bromide was removed. The crude product was isolated as a clear oil. To a solution of the clear oil (0.67 g, 3.6 mmol) in diethyl ether (5 mL) was slowly added 11 M n-butyllithium (0.33 mL), and the reaction was stirred at room temperature for 30 minutes. Most diethyl ether was removed by a stream of nitrogen. Hexane was then added and the mixture was stirred for 20 minutes. The hexane solution was then cooled to −35° C. to help solid precipitation. The lithiated product was collected by filtration as a solid (0.41 g, 2 mmol) and was used with no further purification. The solid was dissolved in THF (15 mL) and reacted with $CpMe_4HMe_2SiCl$ (0.45 g, 2 mmol). The reaction mixture was stirred overnight at room temperature. All volatiles were removed and the crude product was re-slurried into hexane. The solids were filtered off through CELITE®. All volatiles were then removed in vacuo and the product was isolated as clear oil (0.75 g, 2 mmol), which was dissolved in diethyl ether (10 mL). N-Butyllithium (11 M, 0.37 mL) was then slowly added. The reaction mixture was stirred for 30 minutes at room temperature. Most diethyl ether was removed, and the crude solid was re-slurried into hexane for 30 minutes. The product was isolated as a solid by filtration (0.96 g), and then was washed by hexane twice during filtration. The solid dilithiated product (0.5 g, 1 mmol) was slurried in diethyl ether (20 mL) and reacted with hafnium tetrachloride (0.32 g, 1 mmol) for 16 hours. All diethyl ether was removed and the crude solid was re-slurried in hexane for 15 minutes. All solids were collected by filtration and then washed by a small amount of dichloromethane. A mixture of hafnium dichloride and lithium chloride (0.36 g, 0.6 mmol) was slurried into toluene (10 mL), methylmagnesium iodide (0.39 mL, 3 M in diethyl ether) was added, and the reaction mixture was stirred at 60° C. for 2 days. The reaction mixture was cooled to room temperature and 1,4-dioxane was added. The mixture was stirred for 15 minutes and solids were removed by filtration through CELITE® followed by washing with diethyl ether. All volatiles were then removed in vacuo. Substantially pure product ($C_{27}H_{40}HfSi$) was isolated as a solid (0.26 g), which was analyzed by $^1H$ NMR ($C_6D6$, 400 MHz): δ 7.52 (dt, J=8.7, 1.0 Hz, 1H), 7.31 (d, J=8.7 Hz, 1H), 7.20-7.16 (m, 1H), 6.90 (ddd, J=8.6, 6.6, 1.1 Hz, 1H), 5.44 (s, 1H), 2.99 (d, J=13.9 Hz, 1H), 2.49 (d, J=13.9 Hz, 1H), 1.88 (s, 3H), 1.87 (s, 3H), 1.80 (s, 3H), 1.73 (s, 3H), 0.96 (s, 9H), 0.71 (s, 3H), 0.54 (s, 3H), −0.52 (s, 3H), −1.55 (s, 3H).

Example 9: Synthesis of dimethylsilyl tetramethylcyclopentadienyl (3-isobutyl-1,5,6,7-tetrahydro-s-indacenyl)hafnium(IV) dimethyl (4A-Hf-3)

4A-Hf-3

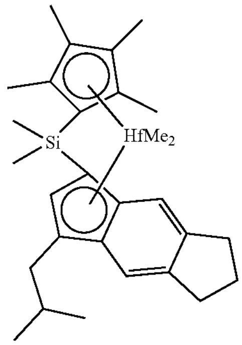

3-isobutyl-1,5,6,7-tetrahydro-s-indacenyl lithium (0.61 g, 2.79 mmol) was dissolved in THF (10 mL) and reacted with $CpMe_4HMe_2SiCl$ (0.6 g, 2.79 mmol). The reaction mixture was stirred overnight at room temperature. All volatiles were removed and the crude product was re-slurried into hexane. The solids were filtered off through CELITE®, and volatiles were then removed in vacuo. The product was isolated as a clear oil (1.1 g, 3 mmol) and then dissolved in diethyl ether (20 mL). N-Butyllithium (0.51 mL, 6 mmol) was then slowly added. The reaction mixture was stirred for 1 hour at room temperature. All diethyl ether was removed and the crude solid was re-slurried in pentane for 30 minutes. Product was isolated as white solid by filtration (1.12 g), which was washed by pentane twice during filtration. The solid dilithiated product (0.55 g, 1 mmol) was slurried in diethyl ether (10 mL) and reacted with hafnium tetrachloride (0.39 g, 1 mmol). After stirring overnight, diethyl ether was removed and the crude product was slurried into hexane for 1 hour. The product (0.56 g) was collected by filtration as a mixture with lithium chloride and was then re-slurried in toluene (15 mL) and reacted with methylmagnesium iodide (0.52 mL, 3 M in diethyl ether). The reaction mixture was stirred at 70° C. for 16 hours. The reaction mixture was cooled to room temperature and 1,4 dioxane (0.2 mL) was added. The mixture was stirred for 20 minutes and the all solids were removed by filtration and washed by diethyl ether. After removal of all solvents, the crude product was re-slurried into small amount of cold hexane. Substantially pure product was isolated by precipitation. The product $C_{29}H_{42}HfSi$ was analyzed by $^1H$ NMR ($CD_2Cl_2$, 400 MHz): δ 7.44 (s, 1H), 7.18 (s, 1H), 5.32 (s, 1H), 3.02 (qd, J=6.3, 5.4, 3.2 Hz, 2H), 2.94-2.77 (m, 3H), 2.32 (dd, J=14.0, 7.9 Hz, 1H), 2.08 (p, J=7.3 Hz, 2H), 1.98-1.90 (m, 7H), 1.87 (d, J=3.2 Hz, 6H), 1.01 (d, J=6.7 Hz, 3H), 0.98 (s, 3H), 0.93 (d, J=6.6 Hz, 3H), 0.75 (s, 3H), −0.96 (s, 3H), −2.06 (s, 3H).

Example 10: Synthesis of dimethylsilyl tetramethylcyclopentadienyl (3-isoButyl-1,5,6,7-tetrahydro-s-indacenyl)zirconium(IV) dimethyl (4A-Zr-3)

4A-Zr-3

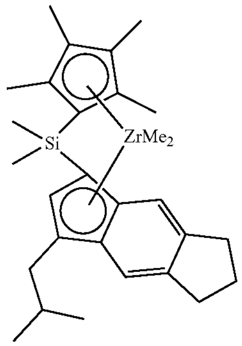

The solid dilithiated product (0.60 g, 1 mmol) was prepared as in Example 9 and slurried in diethyl ether (10 mL) and reacted with zirconium tetrachloride (0.31 g, 1 mmol). After stirring overnight, diethyl ether was removed and the crude product was slurried into hexane for 1 hour. The product (0.52 g, 0.82 mmol) was collected by filtration as a mixture of lithium chloride and was then re-slurried in toluene (15 mL) and reacted with methylmagnesium iodide (0.55 mL, 3 M in diethyl ether). The reaction mixture was stirred at 70° C. for 16 hours. The reaction mixture was cooled to room temperature and 1,4-dioxane (0.2 mL) was added. The mixture was stirred for 20 minutes and all solids were removed by filtration followed by washing with diethyl ether. After removal of all solvents, the crude product was re-slurried into small amount of cold pentane, which was then pipetted out. The product was isolated as an off white solid (0.2 g). The product $C_{29}H_{42}ZrSi$ was analyzed by $^1H$ NMR ($CD_2Cl_2$, 400 MHz): δ 7.44 (d, J=1.4 Hz, 1H), 7.15 (d, J=1.3 Hz, 1H), 5.33 (s, 1H), 3.06-2.71 (m, 5H), 2.35 (dd, J=14.0, 7.9 Hz, 1H), 2.12-2.00 (m, 2H), 1.98-1.87 (m, 7H), 1.83 (s, 3H), 1.75 (s, 3H), 1.01 (d, J=6.7 Hz, 3H), 0.95 (s, 3H), 0.92 (d, J=6.6 Hz, 3H), 0.71 (s, 3H), −0.80 (s, 3H), −1.91 (s, 3H).

Example 11: Polymerization Reaction Testing

High-throughput polymerization reactions of 1-decene and an optional propylene co-monomer were carried out as specified further below. Comparative testing against Group 4 metallocene complexes represented by Formulas (8) and (9) below was also performed.

Formula (8)

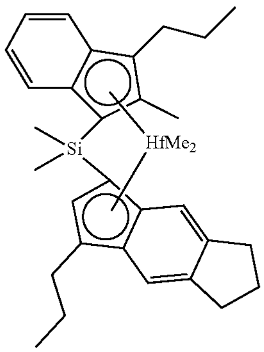

Formula (9)

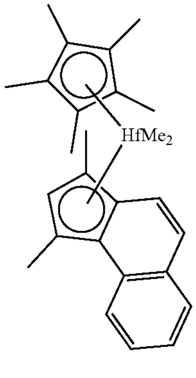

Solvents, polymerization grade toluene and/or isohexanes were supplied by ExxonMobil Chemical Co. and were purified by passing through a series of columns: two 500 cc OxiClear™ cylinders in series from Labclear (Oakland, Calif.), followed by two 500 cc columns in series packed with dried 3 Å molecular sieves (8-12 mesh; Aldrich Chemical Company), and two 500 cc columns in series packed with dried 5 Å molecular sieves (8-12 mesh; Aldrich Chemical Company).

1-Decene monomer was purchased from Sigma Aldrich and is purified by passing through a basic alumina column and dried over 3 Å molecular sieves before use. N,N-dimethylanilinium tetrakisperfluoronaphthylborate was purchased from Albemarle Corporation. All complexes and activators were added to the reactor as dilute solutions in toluene. The concentrations of the solutions of activator, scavenger, and complexes that were added to the reactor were chosen so that the volume of solution added to the reactor could be 40-200 microliters to ensure accurate measurement.

Reactor Description and Preparation. Polymerizations were conducted in an inert atmosphere ($N_2$) dry box using autoclaves equipped with an external heater for temperature control, glass inserts (internal volume of reactor=23.5 mL), septum inlets, regulated supply of nitrogen, and equipped with disposable polyether ether ketone mechanical stirrers (800 RPM). The autoclaves were prepared by purging with dry nitrogen at 110° C. or 115° C. for 5 hours and then at 25° C. for 5 hours.

Typical polymerizations. The reactor was prepared as described above. Isohexane (enough to bring the total solution volume to 5.0 mL) and 1-decene (2.0 mL) were added via syringe at room temperature and atmospheric pressure. The reactor was then brought to process temperature (85° C.) and charged with propylene to process pressure while stirring at 800 RPM. A scavenger solution (e.g., tri-n-octylaluminum (TNOA)) was then added via syringe to the reactor at process conditions. Activator solution was added via syringe to the reactor at process conditions, followed by the pre-catalyst (e.g., metallocene) solution via syringe to the reactor at process conditions. Reactor temperature was monitored and typically maintained within +/−1° C. Polymerizations were halted by addition of approximately 50 psi $O_2$/Ar (5 mol % $O_2$) gas mixture to the autoclaves for approximately 30 seconds. The polymerizations were quenched after 60 minutes polymerization time. The reactors were cooled and vented. The final polyalphaolefin (PAO) was isolated after the solvent, unreacted monomers, and other volatiles were removed in vacuo. Yields reported include total weight of the non-volatile PAO and residual catalyst. Catalyst activity is reported as grams of PAO per mol transition metal compound per second of reaction time (g/s·mol) and is based on the weight of the isolated PAO.

Characterization of Isolated PAO

The reaction mixture was flashed under vacuum to remove the residual solvent, unreacted monomer, and volatile compound, leaving an unsaturated PAO product, which is weighed to determine the isolated yield. The unsaturated PAO product was analyzed (as follows) to determine the distributions of vinylidenes ("Vd"), di-substituted vinylenes ("Di"), tri-substituted vinylenes ("Tri"), and vinyls ("Vi"), the catalyst activity level, and physical properties such as number average molecular weight. Conversion percentages of the reactions were calculated from the isolated yield of products and the amount of alpha-olefin used in the reaction. Specifically, conversion=grams isolated PAO/grams alpha-olefin used (when reported as a %, conversion=(grams isolated PAO/grams alpha-olefin used)×100).

Proton NMR ($^1H$ NMR) was used to determine the number average molecular weight of the unsaturated PAO and the quantitative breakdown of the olefinic structure types (e.g., vinyl, vinylene, di-substituted vinylene, tri-substituted vinylene, and vinylidene).

Specifically, an NMR instrument of 500 MHz is run under the following conditions: a ~30° flip angle RF pulse, 128 scans, with a relaxation delay of ~5 s between pulses; sample (60-100 mg) dissolved in $CDCl_3$ (deuterated chloroform) in a 5 mm NMR tube; and signal collection temperature at −25° C. The following approach is taken in determining the concentrations of the various olefins among all of the olefins from an NMR spectrum. First, peaks corresponding to different types of hydrogen atoms in vinyls ($T_1$), vinylidenes ($T_2$), di-substituted vinylenes ($T_3$), and tri-substituted vinylenes ($T_4$) are identified at the peak regions in Table 1 below. Second, areas of each of the above peaks ($A_1$, $A_2$, $A_3$, and $A_4$, respectively) are then integrated. Third, quantities of each type of olefins ($Q_1$, $Q_2$, $Q_3$, and $Q_4$, respectively) in moles are calculated (as $A_1/2$, $A_2/2$, $A_3/2$, and $A_4$, respectively). Fourth, the total quantity of all olefins ($Q_t$) in moles is calculated as the sum total of all four types ($Q_t=Q_1+Q_2+Q_3+Q_4$). Finally, the molar concentrations ($C_1$, $C_2$, $C_3$, and $C_4$, respectively, in mol %) of each type of olefin, based on the total molar quantity of all of the olefins, is then calculated (in each case, $C_i=100*Q_i/Q_t$).

TABLE 1

| Hydrogen Atoms | | Peak | | Number of | | Concentration |
|---|---|---|---|---|---|---|
| Type No. | Olefin Structure | Region (ppm) | Peak Area | Hydrogen Atoms | Quantity of Olefin (mol) | of Olefin (mol %) |
| $T_1$ | $CH_2{=}CH{-}R^1$ | 4.95-5.10 | $A_1$ | 2 | $Q_1 = A_1/2$ | $C_1$ |
| $T_2$ | $CH_2{=}CR^1R^2$ | 4.65-4.84 | $A_2$ | 2 | $Q_2 = A_2/2$ | $C_2$ |
| $T_3$ | $CHR^1{=}CHR^2$ | 5.31-5.55 | $A_3$ | 2 | $Q_3 = A_3/2$ | $C_3$ |
| $T_4$ | $CR^1R^2{=}CHR^3$ | 5.11-5.30 | $A_4$ | 1 | $Q_4 = A_4$ | $C_4$ |

The number average molecular weight was determined by Equation 1 below:

$$Mn = \frac{\text{saturated}}{\text{vinylene} + \text{vinylidene} + \text{vinyl} + \text{trisubstituted} \times 2} \times 14 + 27 \quad \text{(Equation 1)}$$

In this equation, "saturated," "vinylene," "vinyl," and "tri-substituted" refer to peak area integration for each type of olefin.

The types of olefinic unsaturation in the PAO fluids produced by the catalyst systems disclosed herein are unique, as confirmed by $^1H$ and $^{13}C$ NMR. They contain a very high amount of vinyl-terminated olefins. The results of the polymerization experiments using various embodiments of the bridged Group 4 metallocene compounds as a polymerization catalyst are reported below in Table 2. Each experiment was run in duplicate, and average results are also reported. In each experiment, 0.04 μmol catalyst (0.8 mmol/L in toluene), 0.04 μmol N,N-dimethylanilinium tetrakis(perfluoronaphthyl)borate as an activator (0.8 mmol/L in toluene), about 0.6 μmol of tri-n-octylaluminum (0.01 mol/L in isohexane), and 2 mL 1-decene were reacted in isohexane solvent for 1 hour.

In Table 2, the following catalyst abbreviations are used:

Formula 2A-Hf-1: M=hafnium and $R^1$ is methyl
Formula 2A-Hf-2: M=hafnium and $R^1$ is n-Pr
Formula 2A-Hf-3: M=hafnium and $R^1$ is $CH_2$i-Pr
Formula 2A-Hf-4: M=hafnium and $R^1$ is $CH_2$t-Bu
Formula 2A-Hf-5: M=hafnium and $R^1$ is $CH_2SiMe_3$
Formula 2A-Zr-3: M=zirconium and $R^1$ is $CH_2$i-Pr
Formula 3A-Hf-3: M=hafnium and $R^1$ is $CH_2$i-Pr
Formula 3A-Hf-4: M=hafnium and $R^1$ is $CH_2$t-Bu
Formula 4A-Hf-3: M=hafnium and $R^1$ is $CH_2$i-Pr

TABLE 2

| Entry | Catalyst | [$C_3$] (mmol) | Yield (g) | Catalyst Activity (g/s · mol) | $M_n$ | Tri-sub. vinylene (mol %) | Di-sub. vinylene (mol %) | Vinylidene (mol %) | Vinyl (mol %) |
|---|---|---|---|---|---|---|---|---|---|
| 1a | 2A-Hf-1 | 0.00 | 0.3586 | 2490 | 4476 | 20.0 | 2.2 | 22.2 | 55.6 |
| 1b | 2A-Hf-1 | 0.00 | 0.3882 | 2695 | 4309 | 18.8 | 1.2 | 21.2 | 58.8 |
| Avg. | | | | 2593 | 4393 | | | | 57.2 |
| 2a | 2A-Hf-1 | 2.39 | 0.4966 | 3448 | 2027 | 6.7 | 0.0 | 9.2 | 84.0 |
| 2b | 2A-Hf-1 | 2.39 | 0.603 | 4187 | 2024 | 8.2 | 0.0 | 9.8 | 82.0 |
| Avg. | | | | 3817 | 2025 | | | | 83.0 |
| 3a | 2A-Hf-1 | 4.78 | 0.6963 | 4835 | 1527 | 6.1 | 0.0 | 6.1 | 87.8 |
| 3b | 2A-Hf-1 | 4.78 | 0.7633 | 5300 | 1472 | 5.3 | 0.0 | 5.7 | 89.0 |
| Avg. | | | | 5067 | 1499 | | | | 88.4 |
| 4a | 2A-Hf-3 | 0.00 | 0.1669 | 1159 | 3716 | 15.6 | 1.6 | 22.8 | 60.0 |
| 4b | 2A-Hf-3 | 0.00 | 0.1547 | 1074 | 3131 | 15.3 | 1.6 | 19.2 | 63.9 |
| Avg. | | | | 1117 | 3424 | | | | 62.0 |
| 5a | 2A-Hf-3 | 2.39 | 0.2483 | 1724 | 1901 | 8.3 | 0.0 | 9.1 | 82.6 |
| 5b | 2A-Hf-3 | 2.39 | 0.3875 | 2691 | 1763 | 8.3 | 0.0 | 9.1 | 82.6 |
| Avg. | | | | 2207 | 1832 | | | | 82.6 |
| 6a | 2A-Hf-3 | 4.78 | 0.3026 | 2101 | 1449 | 4.6 | 0.0 | 7.9 | 87.6 |
| 6b | 2A-Hf-3 | 4.78 | 0.3785 | 2628 | 1439 | 6.1 | 0.0 | 6.1 | 87.7 |
| Avg. | | | | 2365 | 1444 | | | | 87.6 |
| 7a | 2A-Hf-4 | 0.00 | 0.1436 | 997 | 1989 | 11.6 | 1.2 | 14.5 | 72.6 |
| 7b | 2A-Hf-4 | 0.00 | 0.1517 | 1053 | 2450 | 12.0 | 0.7 | 15.7 | 71.5 |
| Avg. | | | | 1025 | 2220 | | | | 72.1 |

TABLE 2-continued

| Entry | Catalyst | $[C_3]$ (mmol) | Yield (g) | Catalyst Activity (g/s · mol) | $M_n$ | Tri-sub. vinylene (mol %) | Di-sub. vinylene (mol %) | Vinylidene (mol %) | Vinyl (mol %) |
|---|---|---|---|---|---|---|---|---|---|
| 8a | 2A-Hf-4 | 2.39 | 0.2538 | 1762 | 1378 | 5.6 | 0.0 | 7.5 | 87.0 |
| 8b | 2A-Hf-4 | 2.39 | 0.2955 | 2051 | 1446 | 7.1 | 0.0 | 8.4 | 84.5 |
| Avg. | | | | 1907 | 1412 | | | | 85.7 |
| 9a | 2A-Hf-4 | 4.78 | 0.3289 | 2284 | 1122 | 3.6 | 0.0 | 5.5 | 90.9 |
| 9b | 2A-Hf-4 | 4.78 | 0.4235 | 2940 | 1083 | 3.6 | 0.0 | 5.5 | 90.9 |
| Avg. | | | | 2612 | 1102 | | | | 90.9 |
| 10a | 2A-Hf-5 | 0.00 | 0.1433 | 995 | 4014 | 16.5 | 1.3 | 19.0 | 63.3 |
| 10b | 2A-Hf-5 | 0.00 | 0.1237 | 859 | 3351 | 18.4 | 1.8 | 18.4 | 61.3 |
| Avg. | | | | 927 | 3683 | | | | 62.3 |
| 11a | 2A-Hf-5 | 2.39 | 0.0597 | 414 | 1975 | 8.3 | 0.0 | 8.3 | 83.3 |
| 11b | 2A-Hf-5 | 2.39 | 0.066 | 458 | 1920 | 6.6 | 0.0 | 11.5 | 82.0 |
| Avg. | | | | 436 | 1948 | | | | 82.7 |
| 12a | 2A-Hf-5 | 4.78 | 0.0805 | 559 | 1513 | 5.3 | 0.0 | 7.0 | 87.7 |
| 12b | 2A-Hf-5 | 4.78 | 0.0934 | 648 | 1464 | 5.2 | 0.0 | 7.8 | 87.0 |
| Avg. | | | | 604 | 1488 | | | | 87.3 |
| 13a | 3A-Hf-3 | 0.00 | 0.2056 | 1428 | 4045 | 19.9 | 1.3 | 35.5 | 43.3 |
| 13b | 3A-Hf-3 | 0.00 | 0.2209 | 1534 | 4050 | 20.0 | 1.3 | 35.2 | 43.5 |
| Avg. | | | | 1481 | 4048 | | | | 43.4 |
| 14a | 3A-Hf-3 | 2.39 | 0.4409 | 3061 | 2165 | 7.8 | 0.0 | 14.7 | 77.5 |
| 14b | 3A-Hf-3 | 2.39 | 0.4336 | 3010 | 2078 | 9.3 | 0.0 | 13.2 | 77.5 |
| Avg. | | | | 3035 | 2122 | | | | 77.5 |
| 15a | 3A-Hf-3 | 4.78 | 0.6532 | 4536 | 1762 | 5.1 | 0.0 | 9.4 | 85.5 |
| 15b | 3A-Hf-3 | 4.78 | 0.6673 | 4633 | 1679 | 8.2 | 0.0 | 9.8 | 82.0 |
| Avg. | | | | 4584 | 1721 | | | | 83.7 |
| 16a | 3A-Hf-4 | 0.00 | 0.1712 | 1189 | 3476 | 18.5 | 0.0 | 32.7 | 48.8 |
| 16b | 3A-Hf-4 | 0.00 | 0.162 | 1125 | 3429 | 19.3 | 0.0 | 32.4 | 48.3 |
| Avg. | | | | 1157 | 3452 | | | | 48.5 |
| 17a | 3A-Hf-4 | 2.39 | 0.2643 | 1835 | 2377 | 12.6 | 0.0 | 17.5 | 69.9 |
| 17b | 3A-Hf-4 | 2.39 | 0.3771 | 2618 | 1415 | 6.7 | 0.0 | 9.2 | 84.0 |
| Avg. | | | | 2227 | 1896 | | | | 77.0 |
| 18a | 3A-Hf-4 | 4.78 | 0.5687 | 3949 | 1216 | 3.6 | 0.0 | 7.1 | 89.3 |
| 18b | 3A-Hf-4 | 4.78 | 0.6612 | 4591 | 1200 | 3.6 | 0.0 | 6.3 | 90.1 |
| Avg. | | | | 4270 | 1208 | | | | 89.7 |
| 19a | 4A-Hf-3 | 0.00 | 0.1233 | 856 | 3301 | 19.2 | 1.7 | 42.4 | 36.8 |
| 19b | 4A-Hf-3 | 0.00 | 0.132 | 916 | 3629 | 20.1 | 1.9 | 40.7 | 37.3 |
| Avg. | | | | 886 | 3465 | | | | 37.1 |
| 20a | 4A-Hf-3 | 2.39 | 0.2769 | 1922 | 1378 | 5.6 | 0.0 | 11.6 | 82.8 |
| 20b | 4A-Hf-3 | 2.39 | 0.2745 | 1906 | 1223 | 6.1 | 0.0 | 8.5 | 85.3 |
| Avg. | | | | 1914 | 1301 | | | | 84.1 |
| 21a | 4A-Hf-3 | 4.78 | 0.3743 | 2599 | 1137 | 5.3 | 0.0 | 6.0 | 88.7 |
| 21b | 4A-Hf-3 | 4.78 | 0.4129 | 2866 | 1176 | 5.3 | 0.0 | 5.9 | 88.7 |
| Avg. | | | | 2732 | 1156 | | | | 88.7 |
| 22a | 2A-Zr-3 | 0.00 | 0.1574 | 1093 | 3104 | 29.0 | 4.5 | 36.3 | 30.2 |
| 22b | 2A-Zr-3 | 0.00 | 0.1636 | 1136 | 3206 | 28.0 | 4.6 | 37.1 | 30.4 |
| Avg. | | | | 1114 | 3155 | | | | 30.3 |
| 23a | 2A-Zr-3 | 2.39 | 0.4088 | 2838 | 2361 | 16.6 | 2.4 | 21.9 | 59.2 |
| 23b | 2A-Zr-3 | 2.39 | 0.4234 | 2939 | 2392 | 18.5 | 2.9 | 20.8 | 57.8 |
| Avg. | | | | 2889 | 2377 | | | | 58.5 |
| 24a | 2A-Zr-3 | 4.78 | 0.7213 | 5009 | 2277 | 11.0 | 1.4 | 18.6 | 69.0 |
| 24b | 2A-Zr-3 | 4.78 | 0.7516 | 5219 | 2272 | 11.3 | 1.4 | 16.3 | 70.9 |
| Avg. | | | | 5114 | 2274 | | | | 69.9 |
| 25a | 8 | 0.00 | 0.2725 | 1892 | 3143 | 19.7 | 0.0 | 22.5 | 57.8 |
| 25b | 8 | 0.00 | 0.2255 | 1566 | 2651 | 19.2 | 0.0 | 21.0 | 59.9 |
| Avg. | | | | 1729 | 2897 | | | | 58.8 |
| 26a | 8 | 2.39 | 0.4783 | 3321 | 2238 | 12.4 | 0.0 | 12.7 | 74.9 |
| 26b | 8 | 2.39 | 0.67 | 4652 | 2147 | 10.2 | 0.0 | 13.7 | 76.1 |
| Avg. | | | | 3986 | 2193 | | | | 75.5 |
| 27a | 8 | 4.78 | 0.8627 | 5990 | 1886 | 7.6 | 0.0 | 8.4 | 84.0 |
| 27b | 8 | 4.78 | 0.9287 | 6448 | 1934 | 7.0 | 0.0 | 10.0 | 83.1 |
| Avg. | | | | 6219 | 1910 | | | | 83.5 |
| 28a | 9 | 0.00 | 0.5602 | 3889 | 1333 | 5.3 | 0.9 | 46.9 | 46.9 |
| 28b | 9 | 0.00 | 0.414 | 2875 | 1493 | 5.5 | 1.2 | 47.8 | 45.5 |
| Avg. | | | | 3382 | 1413 | | | | 46.2 |
| 29a | 9 | 2.39 | 0.5246 | 3642 | 802 | 2.7 | 0.0 | 18.8 | 78.5 |
| 29b | 9 | 2.39 | 0.6991 | 4854 | 780 | 3.0 | 0.0 | 19.4 | 77.6 |
| Avg. | | | | 4248 | 791 | | | | 78.1 |
| 30a | 9 | 4.78 | 0.4505 | 3128 | 626 | 1.9 | 0.0 | 11.3 | 86.8 |
| 30b | 9 | 4.78 | 0.5841 | 4055 | 620 | 2.2 | 0.0 | 11.2 | 86.5 |
| Avg. | | | | 3592 | 623 | | | | 86.7 |

FIG. 1 compares the yield of vinyl-terminated 1-decene oligomers in the absence of propylene and in the presence of propylene using catalyst compounds 2A-Hf-1, 2A-Hf-3, and 2A-Hf-4 as reported in Table 2 to the yield generated using known catalysts 8 and 9 (as reported in Table 4). As shown, the amount of vinyl termination was higher when propylene was present. Both with and without propylene, the amount of vinyl termination was higher than catalyst 8 and 9.

Figure 2:
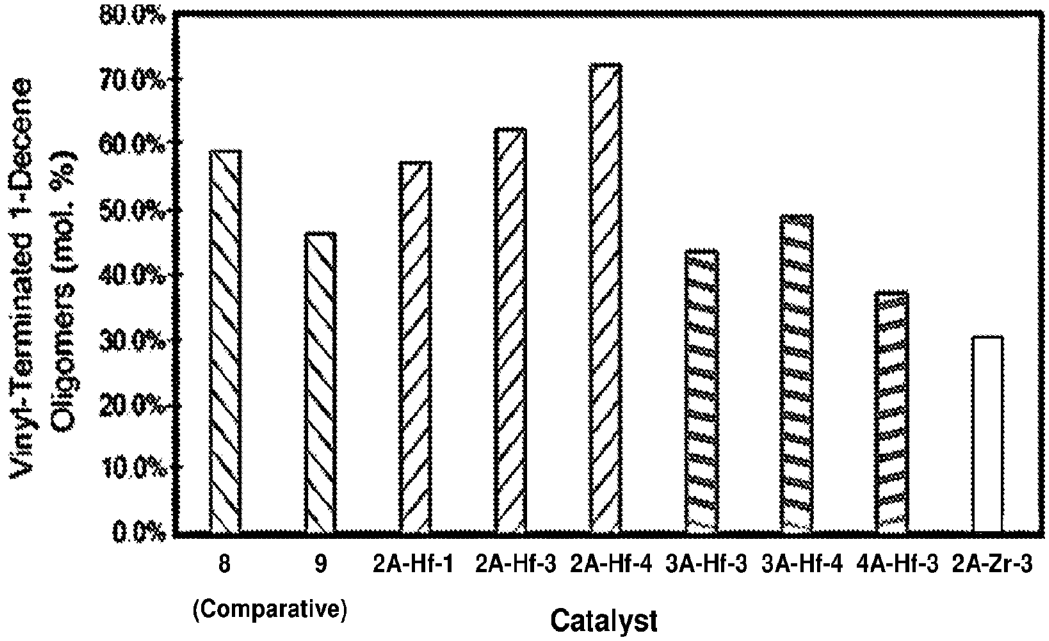
FIG. 2: shows a graph of the percentage of vinyl-terminated decene oligomers generated from a feed stream comprising 1-decene in the presence of the catalyst systems described herein.

FIG. 2 compares the yield of vinyl-terminated 1-decene homooligomers (in the absence of propylene) of each bridged Group 4 metallocene complexes 2A-Hf-1, 2A-Hf-3, 2A-Hf-4, 3A-Hf-3, 3A-Hf-4, 4A-Hf-3, and 2A-Zr-3 compared to yields generated using known catalysts 8 and 9. In particular, replacing the benz[e]indenyl group in catalyst compound 2A-Hf-3 and 2A-Hf-4 with a tetrahydro-s-indacenyl group to generate catalyst compound 3A-Hf-3 and 3A-Hf-4, respectively, appeared to reduce the yield of vinyl-terminated oligomers. Similarly, replacing the benz[e] indenyl group in catalyst compound 2A-Hf-3 with an indenyl group to generate catalyst compound 4A-Hf-3 also appeared to reduce the yield of vinyl-terminated oligomers. Changing hafnium (Hf) in catalyst compound 2A-Hf-3 to zirconium (Zr) to generate catalyst compound 2A-Zr-3 also appeared to significantly reduce the yield of vinyl-terminated oligomers.

All documents described herein are incorporated by reference herein for purposes of all jurisdictions where such practice is allowed, including any priority documents and/or testing procedures to the extent that they are not inconsistent with this text. As is apparent from the foregoing general description and the specific embodiments, while forms of the disclosure have been illustrated and described, various modifications may be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

What is claimed is:

1. A method comprising:

contacting a catalyst system with an olefinic feed comprising a $C_3$-$C_{32}$ alpha olefin under polymerization reaction conditions, wherein the catalyst system comprises at least one activator and a metallocene compound represented by the formula:

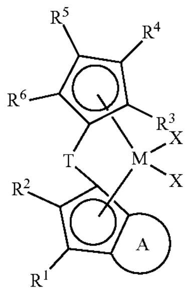

wherein:

M is a group 4 transition metal;

T is a bridging group;

each X is independently a leaving group, or two Xs are joined and bound to the metal atom to form a metallocycle ring, or two Xs are joined to form a chelating ligand, a diene ligand, or an alkylidene;

$R^1$ and $R^2$ are independently hydrogen, or a $C_1$-$C_{40}$ optionally substituted hydrocarbyl group, halide, or siloxyl group;

$R^3$, $R^4$, $R^5$ and $R^6$ are independently a $C_1$-$C_{40}$ optionally substituted hydrocarbyl, halocarbyl, silylcarbyl, aminocarbyl, or siloxyl group; and A is an aliphatic, aromatic or heteroaromatic ring, optionally bearing one or more additional fused rings which may be aliphatic, aromatic or heteroaromatic; and obtaining a plurality of polyalphaolefins (PAOs) having at least 30 mol % vinyl-terminated PAOs, the vinyl-terminated PAOs having a terminal —CH═$CH_2$ group.

2. The method of claim 1, wherein at least a portion of the plurality of PAOs comprises one or more of trisubstituted vinylene groups, disubstituted vinylene groups, and vinylidene groups.

3. The method of claim 1, wherein at least 62 mol % of the PAOs are vinyl-terminated PAOs.

4. The method of claim 1, wherein the plurality of PAOs lacks a $C_3$ alpha olefin monomer.

5. The method of claim 1, wherein the plurality of PAOs comprises a $C_3$ alpha olefin, wherein the polymerization reaction conditions comprise a reaction temperature of about 80° C. or more.

6. The method of claim 1, wherein $R^1$ is hydrogen, methyl, ethyl, propyl, butyl, pentyl, hexyl, heptyl, octyl, nonyl, decyl, undecyl, dodecyl, trimethylsilylmethyl or an isomer thereof, and wherein $R^3$, $R^4$, $R^5$ and $R^6$ are each methyl and $R^2$ is hydrogen.

7. The method of claim 1, wherein the feed comprises a $C_3$-$C_{32}$ alpha olefin selected from the group consisting of propylene, 1-butene, 1-pentene, 1-hexene, 1-heptene, 1-octene, 1-nonene, 1-decene, 1-undecene, 1-dodecene, 1-tetradecene, 1-hexadecene, or isomers thereof having a terminal carbon-carbon double bond, and any combination thereof.

8. The method of claim 1, wherein when $R^3$, $R^4$, $R^5$ and $R^6$ are Me and the cyclopentadiene and A form an indenyl group, $R^1$ is not Me, Et or nPr or the 6 membered aromatic ring of the indenyl group is substituted, and when $R^3$, $R^4$, $R^5$ and $R^6$ are Me and the cyclopentadiene and A form a benz[e]indenyl ligand, the benz[e]indenyl ligand is substituted.

9. The method of claim 1, wherein $R^2$ is hydrogen.

10. The method of claim 1, wherein the metallocene compound is represented by the formula:

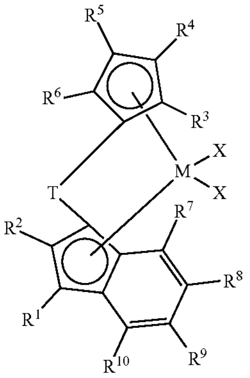

wherein $R^7$, $R^8$, $R^9$, and $R^{10}$ are independently hydrogen or a $C_1$-$C_{40}$ optionally substituted hydrocarbyl, halocarbyl, silylcarbyl, aminocarbyl, germylcarbyl, oxyhydrocarbyl, halide, or siloxyl group and optionally, $R^7$ and $R^8$, or $R^8$ and $R^9$, or $R^9$ and $R^{10}$ are joined together to form a fused carbocyclic ring.

11. The method of claim 10, wherein when $R^3$, $R^4$, $R^5$ and $R^6$ are Me, $R^1$ is not Me, Et, or nPr or at least one of $R^2$, $R^7$, $R^8$, $R^9$, or $R^{10}$ is not H.

12. The method of claim 10, wherein $R^2$ is hydrogen.

13. The method of claim 1, wherein the metallocene compound is represented by the formula:

(B)

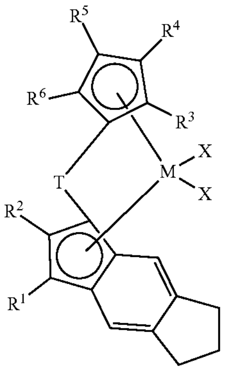

or (C)

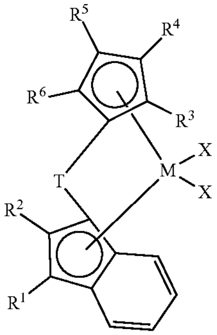

or (D)

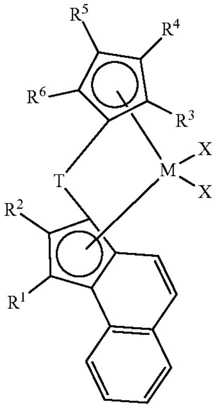

wherein $R^1$ is methyl, ethyl, n-propyl, isopropyl, cyclopropyl, n-butyl, sec-butyl, isobutyl, tert-butyl, n-pentyl, isopentyl, neopentyl or $C_6$-$C_{40}$ hydrocarbyl group, optionally substituted hydrocarbyl, halide, or siloxyl group.

14. The method of claim 13, wherein $R^2$ is hydrogen.

15. The method of claim 1, wherein at least 43.3 mol % of the PAOs are vinyl-terminated PAOs.

16. A method comprising:

contacting a catalyst system with an olefinic feed comprising a $C_3$-$C_{32}$ alpha olefin under polymerization reaction conditions, wherein the catalyst system comprises at least one activator and a metallocene compound represented by the formula:

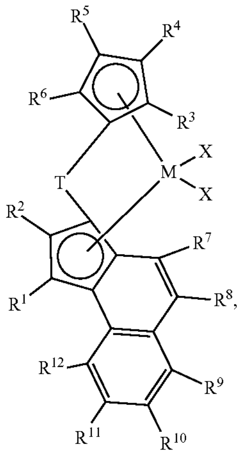

wherein:

M is a group 4 transition metal;

T is a bridging group;

each X is independently a leaving group, or two Xs are joined and bound to the metal atom to form a metallocycle ring, or two Xs are joined to form a chelating ligand, a diene ligand, or an alkylidene;

$R^1$ and $R^2$ are independently hydrogen, or a $C_1$-$C_{40}$ optionally substituted hydrocarbyl group, halide, or siloxyl group;

$R^3$, $R^4$, $R^5$ and $R^6$ are independently a $C_1$-$C_{40}$ optionally substituted hydrocarbyl, halocarbyl, silylcarbyl, aminocarbyl, or siloxyl group; and $R^7$, $R^8$, $R^9$, $R^{10}$, $R^{11}$, and $R^{12}$ are independently hydrogen or a $C_1$-$C_{40}$ optionally substituted hydrocarbyl, halocarbyl, silylcarbyl, aminocarbyl, germylcarbyl, oxyhydrocarbyl, halide, or siloxyl group, where at least one of $R^1$, $R^2$, $R^7$, $R^8$, $R^9$, $R^{10}$, $R^{11}$, and $R^{12}$ is not H; and obtaining a plurality of polyalphaolefins (PAOs) having at least 30 mol % vinyl-terminated PAOs, the vinyl-terminated PAOs having a terminal —CH═CH$_2$ group.

17. The method of claim 16, wherein $R^2$ is hydrogen.

18. A method comprising:

contacting a catalyst system with an olefinic feed comprising a $C_3$-$C_{32}$ alpha olefin under polymerization reaction conditions, wherein the catalyst system comprises at least one activator and a metallocene compound represented by the formula:

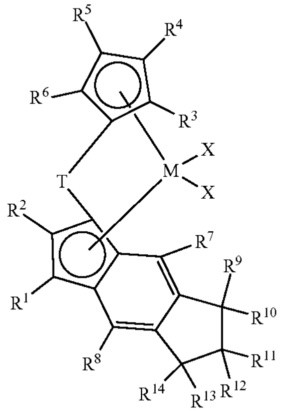

wherein:

M is a group 4 transition metal;

T is a bridging group;

each X is independently a leaving group, or two Xs are joined and bound to the metal atom to form a metallocycle ring, or two Xs are joined to form a chelating ligand, a diene ligand, or an alkylidene;

$R^1$ and $R^2$ are independently hydrogen, or a $C_1$-$C_{40}$ optionally substituted hydrocarbyl group, halide, or siloxyl group;

$R^3$, $R^4$, $R^5$ and $R^6$ are independently a $C_1$-$C_{40}$ optionally substituted hydrocarbyl, halocarbyl, silylcarbyl, aminocarbyl, or siloxyl group; and $R^7$, $R^8$, $R^9$, $R^{10}$, $R^{11}$, $R^{12}$, $R^{13}$, and $R^{14}$ are independently hydrogen or a $C_1$-$C_{40}$ optionally substituted hydrocarbyl, halide, or siloxyl group; and obtaining a plurality of vinyl terminated polyalphaolefins (PAOs) having at least 30 mol % vinyl-terminated PAOs, the vinyl-terminated PAOs having a terminal —CH═CH$_2$ group.

19. The method of claim 18, wherein $R^2$ is hydrogen.

* * * * *